(12) United States Patent
Pandya

(10) Patent No.: US 7,376,755 B2
(45) Date of Patent: May 20, 2008

(54) TCP/IP PROCESSOR AND ENGINE USING RDMA

(76) Inventor: Ashish A. Pandya, 4318 Lafayette Dr., El Dorado Hills, CA (US) 95762

(*) Notice: Subject to any disclaimer, the term of this patent is extended or adjusted under 35 U.S.C. 154(b) by 976 days.

(21) Appl. No.: 10/459,349

(22) Filed: Jun. 10, 2003

(65) Prior Publication Data

US 2004/0037319 A1   Feb. 26, 2004

Related U.S. Application Data

(60) Provisional application No. 60/388,407, filed on Jun. 11, 2002.

(51) Int. Cl.
  *G06F 15/16* (2006.01)
  *G06F 15/167* (2006.01)
  *H04H 11/00* (2006.01)

(52) U.S. Cl. .............. 709/250; 709/250; 709/212; 370/386; 711/5

(58) Field of Classification Search ................ 709/250, 709/212; 370/386, 388; 711/5; 707/1
  See application file for complete search history.

(56) References Cited

U.S. PATENT DOCUMENTS

| | | | |
|---|---|---|---|
| 5,968,176 | A | 10/1999 | Nessett et al. |
| 6,304,973 | B1 | 10/2001 | Williams |
| 6,675,200 | B1 | 1/2004 | Cheriton et al. |
| 6,839,346 | B1 | 1/2005 | Kametani |
| 6,986,061 | B1 | 1/2006 | Kunzinger |
| 7,024,479 | B2 | 4/2006 | Shah et al. |
| 7,047,561 | B1 | 5/2006 | Lee |
| 7,124,198 | B2 | 10/2006 | Pinkerton |
| 2001/0051994 | A1 | 12/2001 | Serizawa et al. |
| 2002/0085562 | A1 | 7/2002 | Hufferd et al. |
| 2002/0141585 | A1 | 10/2002 | Carr |
| 2003/0005331 | A1 | 1/2003 | Williams |
| 2003/0009432 | A1 | 1/2003 | Sugahara et al. |
| 2003/0043794 | A1 | 3/2003 | Cayton et al. |

(Continued)

OTHER PUBLICATIONS

Paper entitled *The Case for RDMA* by Jim Pinkerton dated May 29, 2002.

(Continued)

*Primary Examiner*—Ario Etienne
*Assistant Examiner*—Sahera Halim
(74) *Attorney, Agent, or Firm*—Armstrong Teasdale LLP

(57) ABSTRACT

A TCP/IP processor and data processing engines for use in the TCP/IP processor is disclosed. The TCP/IP processor can transport data payloads of Internet Protocol (IP) data packets using an architecture that provides capabilities to transport and process Internet Protocol (IP) packets from Layer 2 through transport protocol layer and may also provide packet inspection through Layer 7. The engines may perform pass-through packet classification, policy processing and/or security processing enabling packet streaming through the architecture at nearly the full line rate. A scheduler schedules packets to packet processors for processing. An internal memory or local session database cache stores a TCP/IP session information database and may also store a storage information session database for a certain number of active sessions. The session information that is not in the internal memory is stored and retrieved to/from an additional memory. An application running on an initiator or target can in certain instantiations register a region of memory, which is made available to its peer(s) for access directly without substantial host intervention through RDMA data transfer.

20 Claims, 52 Drawing Sheets

U.S. PATENT DOCUMENTS

| | | |
|---|---|---|
| 2003/0046474 A1 | 3/2003 | Craddock et al. |
| 2003/0050990 A1 | 3/2003 | Craddock et al. |
| 2003/0061296 A1 | 3/2003 | Craddock et al. |
| 2003/0097518 A1 | 5/2003 | Kohn et al. |
| 2003/0131228 A1 | 7/2003 | Twomey |
| 2003/0145230 A1 | 7/2003 | Chiu et al. |
| 2003/0223361 A1 | 12/2003 | Hussain et al. |
| 2004/0098600 A1 | 5/2004 | Eldeeb |
| 2004/0165588 A1 | 8/2004 | Pandya |
| 2006/0031568 A1 | 2/2006 | Eydelman et al. |

OTHER PUBLICATIONS

Industry Leaders Form RDMA Consortium to Address Growing Memory Bandwidth, CPU Processing Demands, Curry, Brent, May 31, 2002, on www.rdmaconsortium.org, 2 pgs.

RDMA Consortium Complete Protocol Specifications, Curry Brent, Oct. 30, 2002, on www.rdmaconsortium.org, 2 pgs.

RDMA Consortium Complete Verbal Specifications, Alejandro, John, Apr. 29, 2003, on www.rdmaconsortium.org, 2 pgs.

RDMA Consortium Complete All Planned Specifications, Plant, Alex, Oct. 31, 2003, on www.rdmaconsortium.org, 2 pgs.

RDMA Consortium FAQs, Apr. 29, 2003, on www.rdmaconsortium.org, 3 pgs.

Sockets Direct Protocol v1.0 RDMA Consortium, Pinkerton, Jim, Oct. 24, 2003, on www.rdmaconsortium.org, 3 pgs.

SDP Frequently Asked Questions, Oct. 31, 2003, on www.rdmaconsortium.org, 2 pgs.

Sockets Direct Protocol (SDP) for iWARP over TCP (v1.0), Pinkerton, James, Oct. 31, 2003, on www.rdmaconsortium.org, 106 pgs.

Technical Overview of iSCSI Extensions for RDMA (iSER) & Datamover Architecture for iSCSI (DA), Ko, Mike, Jul. 21, 2003, on www.rdmaconsortium.org, 35 pgs.

iSER and DA Frequently Asked Questions, date unknown, on www.rdmaconsortium.org, 4 pgs.

iSCSI Extensions for RDMA Specification (Version 1.0), Ko, Mike, et al., Jul. 21, 2003, on www.rdmaconsortium.org, 76 pgs.

Datamover Architecture for iSCSI (DA) (Version 1.0), Chadalapaka, Mallikarjun, Jul. 21, 2003, on www.rdmaconsortium.org; 58 pgs.

RDMA Protocl Verbs Specification (Version 1.0), Hilland, Jeff, et al., Apr. 25, 2003, on www.rdmaconsortium.org; 243 pgs.

An RDMA Protocol Specification (Version 1.0), Recio, R. et al., Oct. 22, 2002, on www.rdmaconsortium.org, 60 pgs.

Direct Data Placement over Reliable Transports (Version 1.0) Shah, Hemal, et al., Oct. 21, 2002, on www.rdmaconsortium.org, 35 pgs.

Marker PDU Aligned Framing for TCP Specification (Version1.0), Culley, P. et al., Oct. 25, 2002, on www.rdmaconsortium.org, 32 pgs.

RDMA enabled NIC (RNIC) Verbs Overview, Recio, Renato, Apr. 29, 2003,on www.rdmaconsortium.org, 28 pgs.

PCT International Search Report and Written Opinion of the International Searching Authority mailed on Jul. 13, 2007 regarding PCT/US2005/43469 filed on Dec. 2, 2005 (Dec. 2, 2005), (10 pgs.).

PCT International Search Report and Written Opinion of the International Searching Authority mailed on Sep. 6, 2005 regarding PCT/US2005/05159 filed on Feb. 18, 2005 (Feb. 18, 2005), (8 pgs.).

Storage Networking Industry Association (SNIA), The Emerging FCIP Standard for Storage Area Network Connectivity Across TCP/IP Networks, Jun. 2001 (7 pgs.).

Office action mailed from the USPTO Jun. 20, 2007 in U.S. Appl. No. 11/004,742, (12 pgs.).

Office action mailed from the USPTO Mar. 30, 2007 in U.S. Appl. No. 10/459,350, (10 pgs.).

Office action mailed from the USPTO May 4, 2007 in U.S. Appl. No. 10/458,844, (20 pgs.).

Office action mailed from the USPTO Jan. 12, 2007 in U.S. Appl. No. 10/783,890, (7 pgs.).

Office action mailed from the USPTO Jun. 26, 2006 in U.S. Appl. No. 10/783,890, (9 pgs.).

Office action mailed from the USPTO May 24, 2005 in U.S. Appl. No. 10/783,890, (7 pgs.).

Restriction requirement mailed from the USPTO Mar. 26, 2007 in U.S. Appl. No. 10/459,019, (5 pgs.).

Restriction requirement mailed from the USPTO Jun. 28, 2007 in U.S. Appl. No. 10/458,855, (9 pgs.).

Restriction requirement mailed from the USPTO Apr. 3, 2007 in U.S. Appl. No. 10/459,297, (5 pgs.).

Office Action mailed from the USPTO Aug. 9, 2007 in U.S. Appl. No. 10/783,890, (11 pgs.).

PCT International Preliminary Report on Patentability and Written Opinion of the International Searching Authority mailed on Aug. 9, 2007 regarding PCT/US2005/43469 filed on Dec. 2, 2005 (Dec. 2, 2005), (8 pgs.).

Office Action mailed from the USPTO Aug. 15, 2007 in U.S. Appl. No. 10/458,855, (20 pgs.).

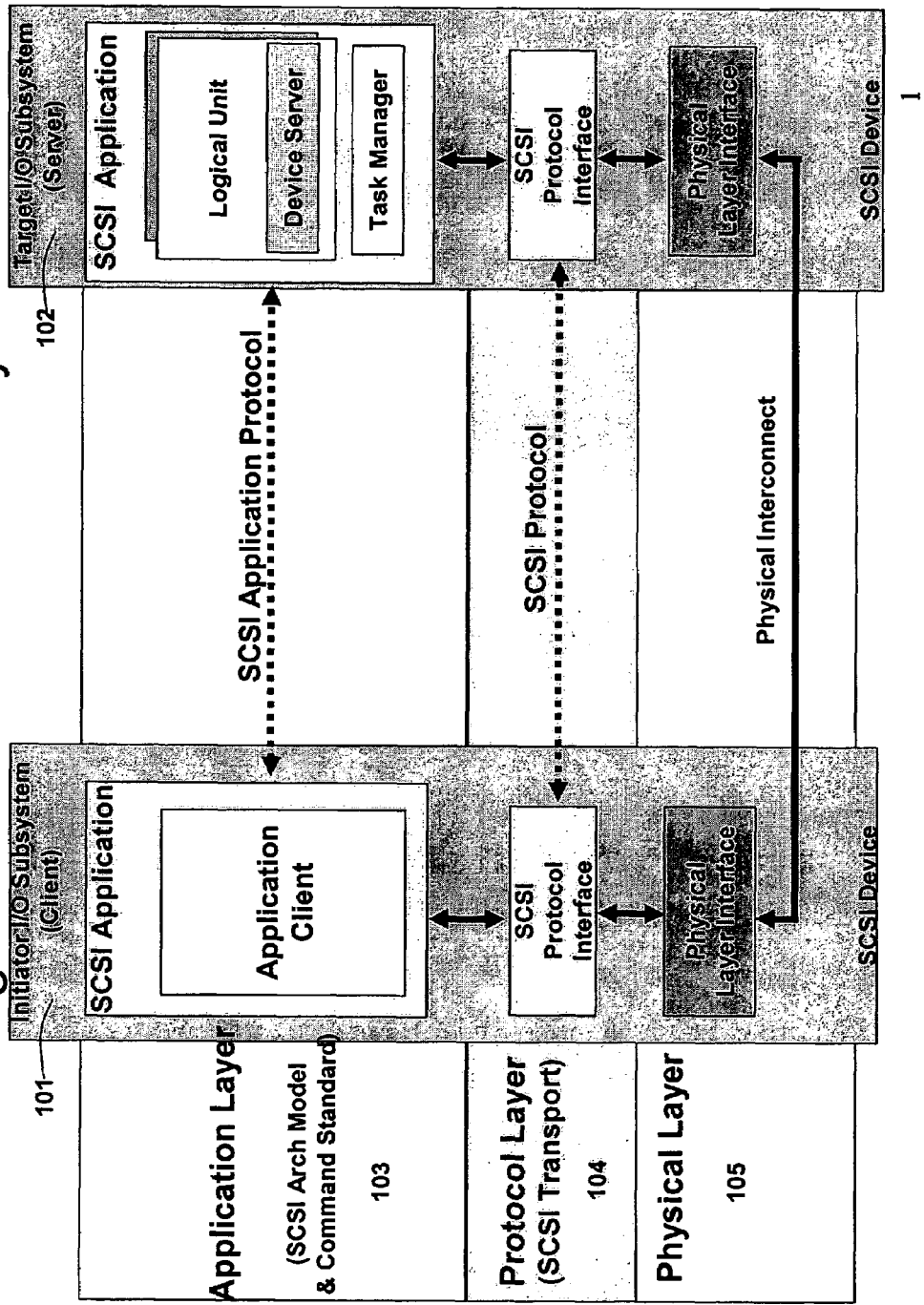
Fig. 1 SCSI Architecture Layers

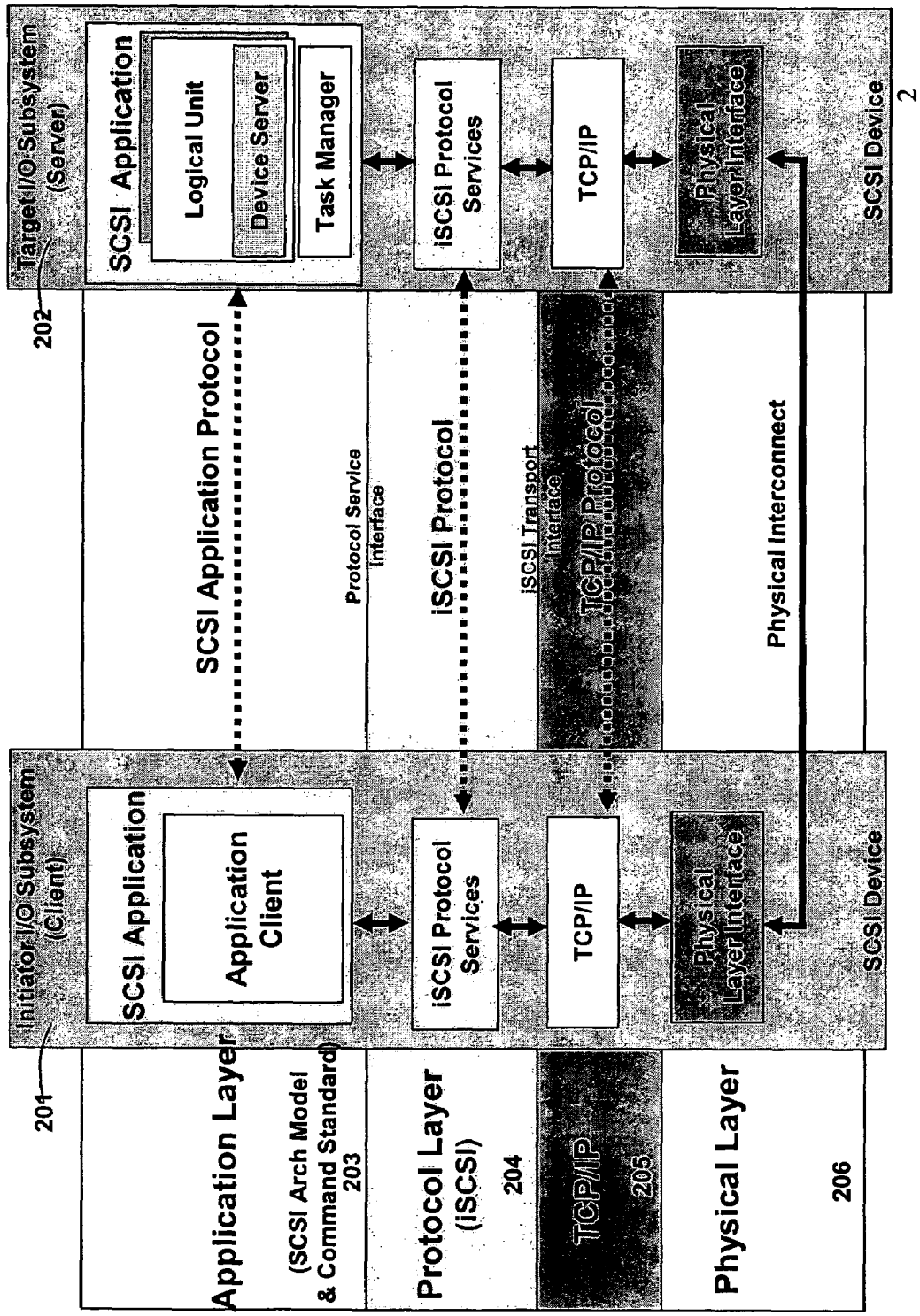
Fig. 2 SCSI Architecture Layers on iSCSI

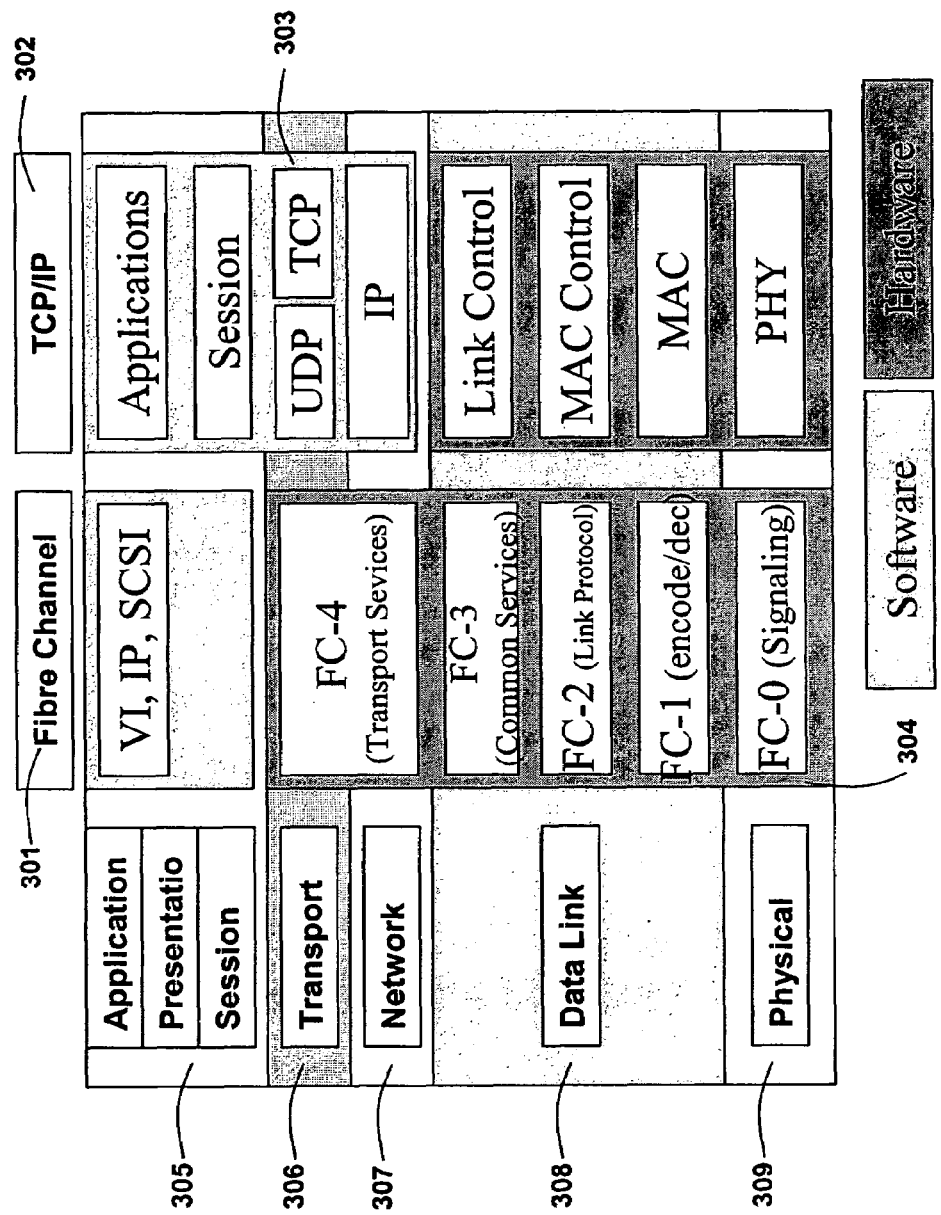
Fig. 3 OSI Stack

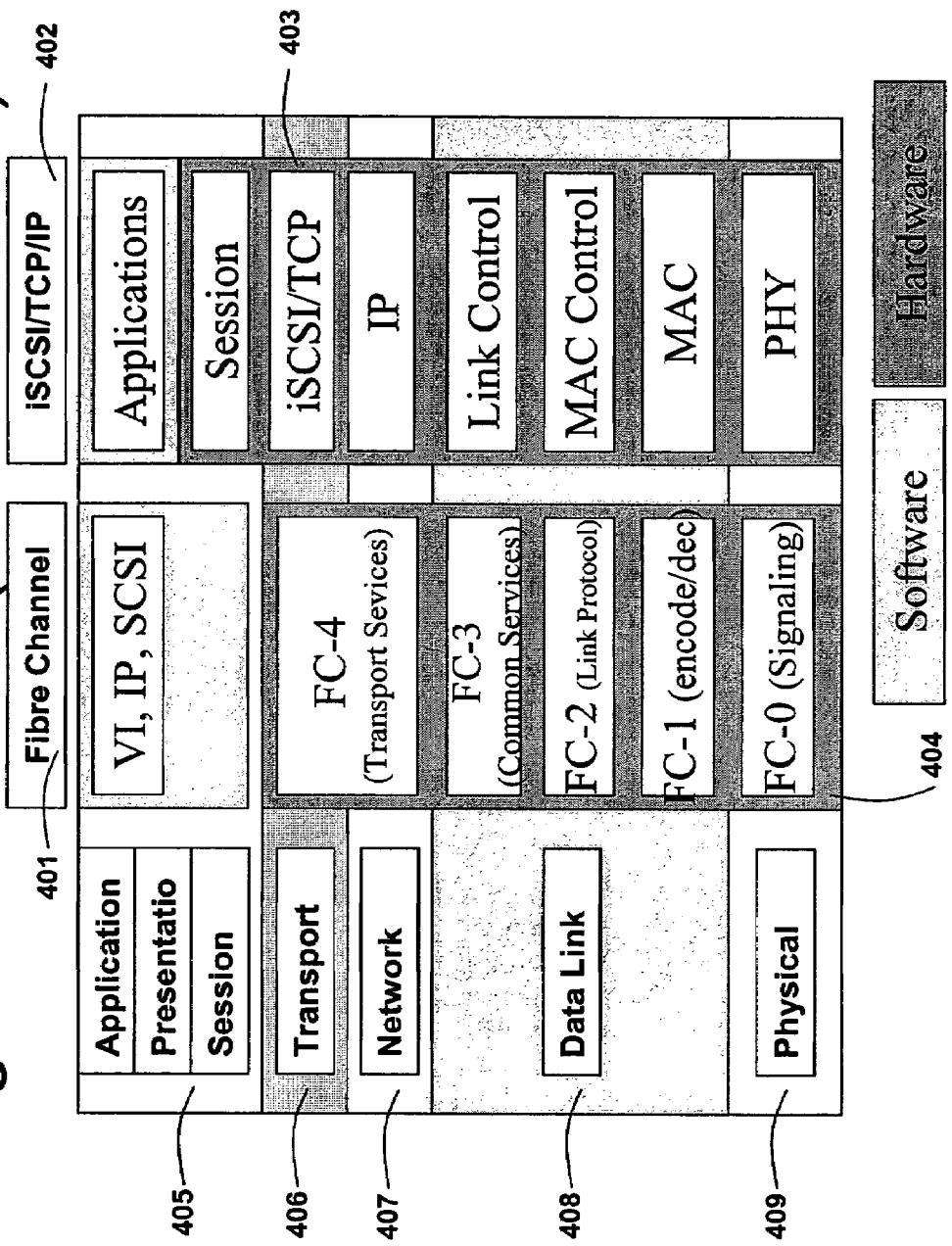
Fig. 4 OSI Stack (w/ HW TCP/IP)

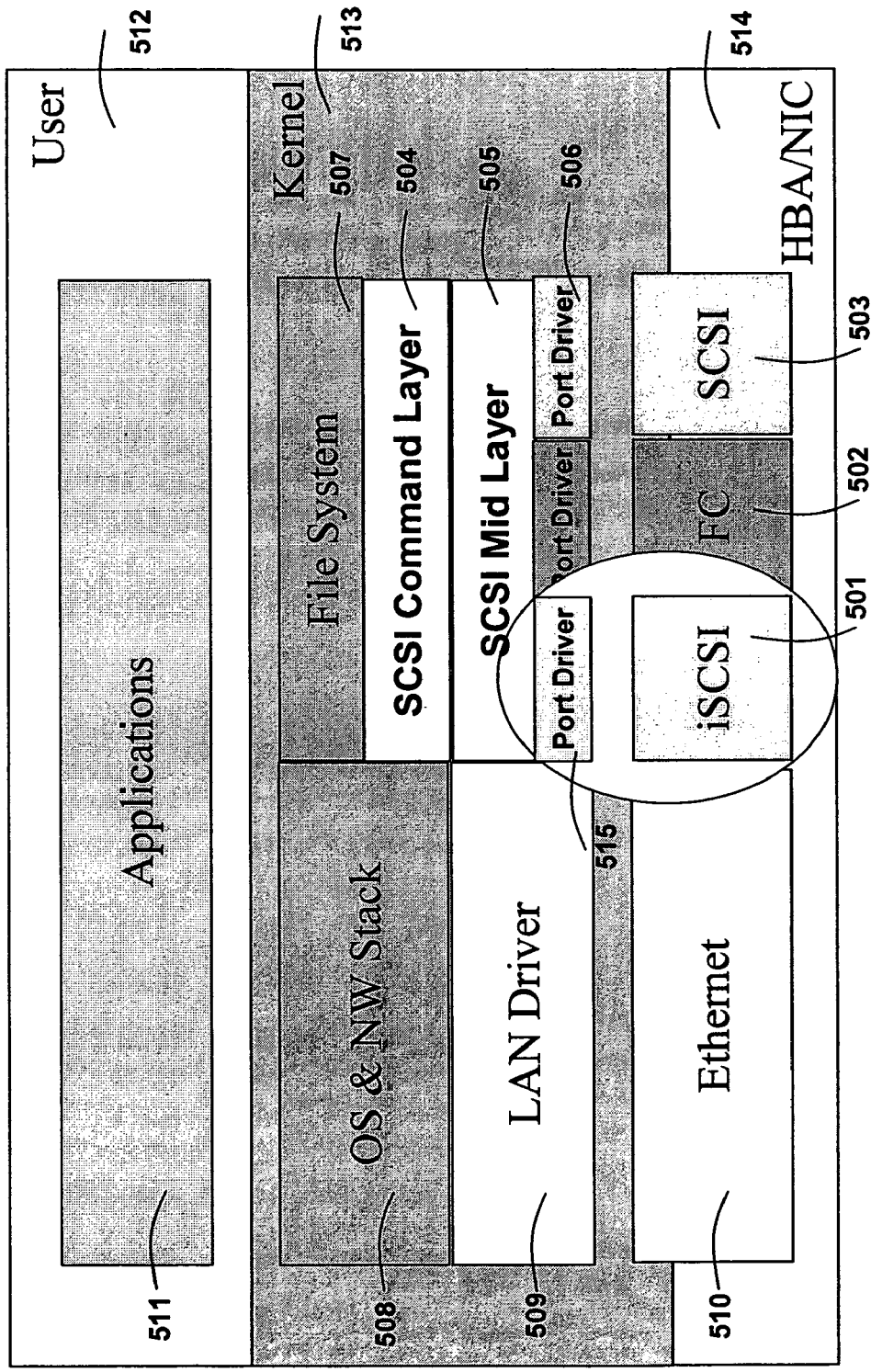
Fig. 5 Host Software Stack (iSCSI)

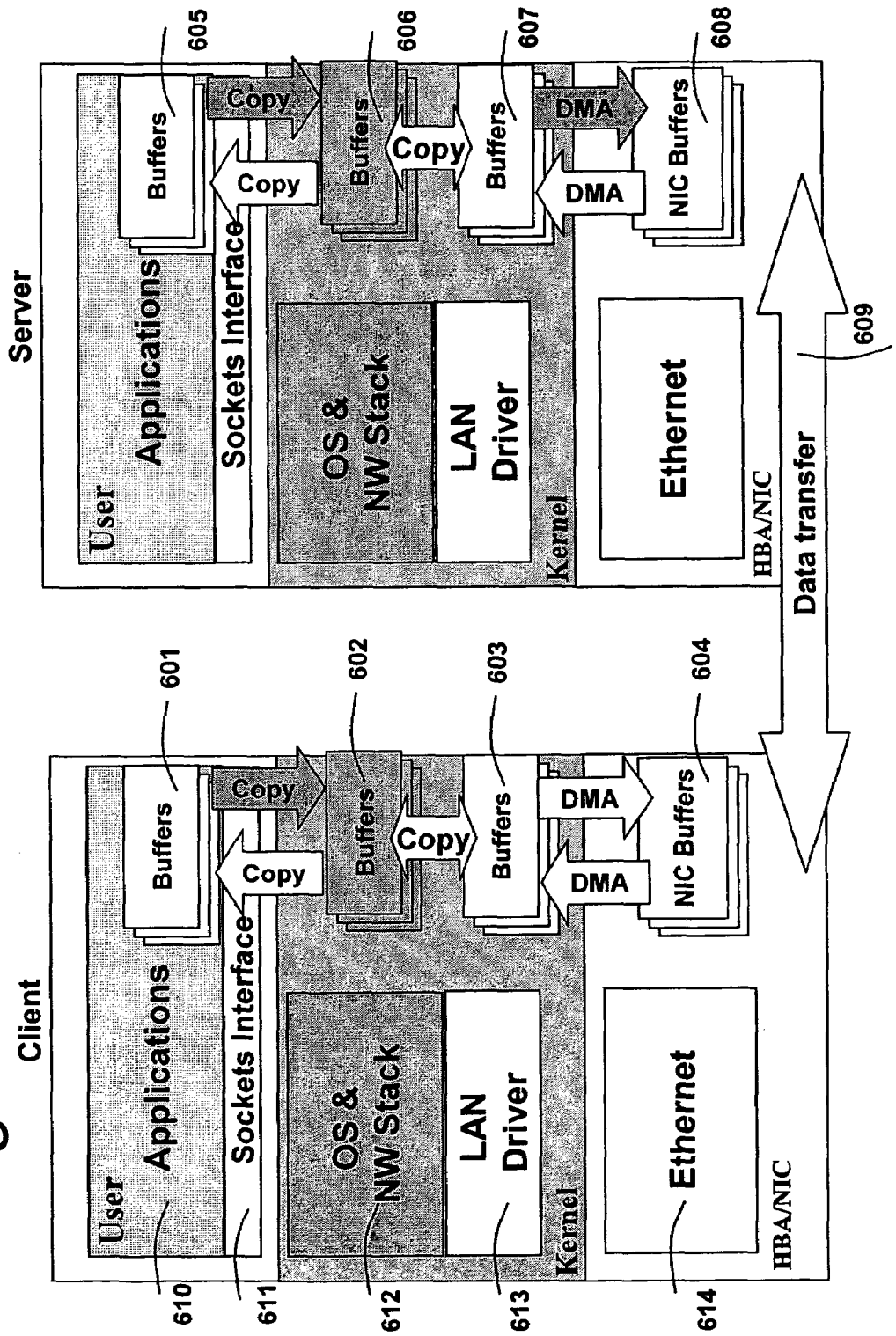
Fig. 6 S/W TCP Stack Data Transfer

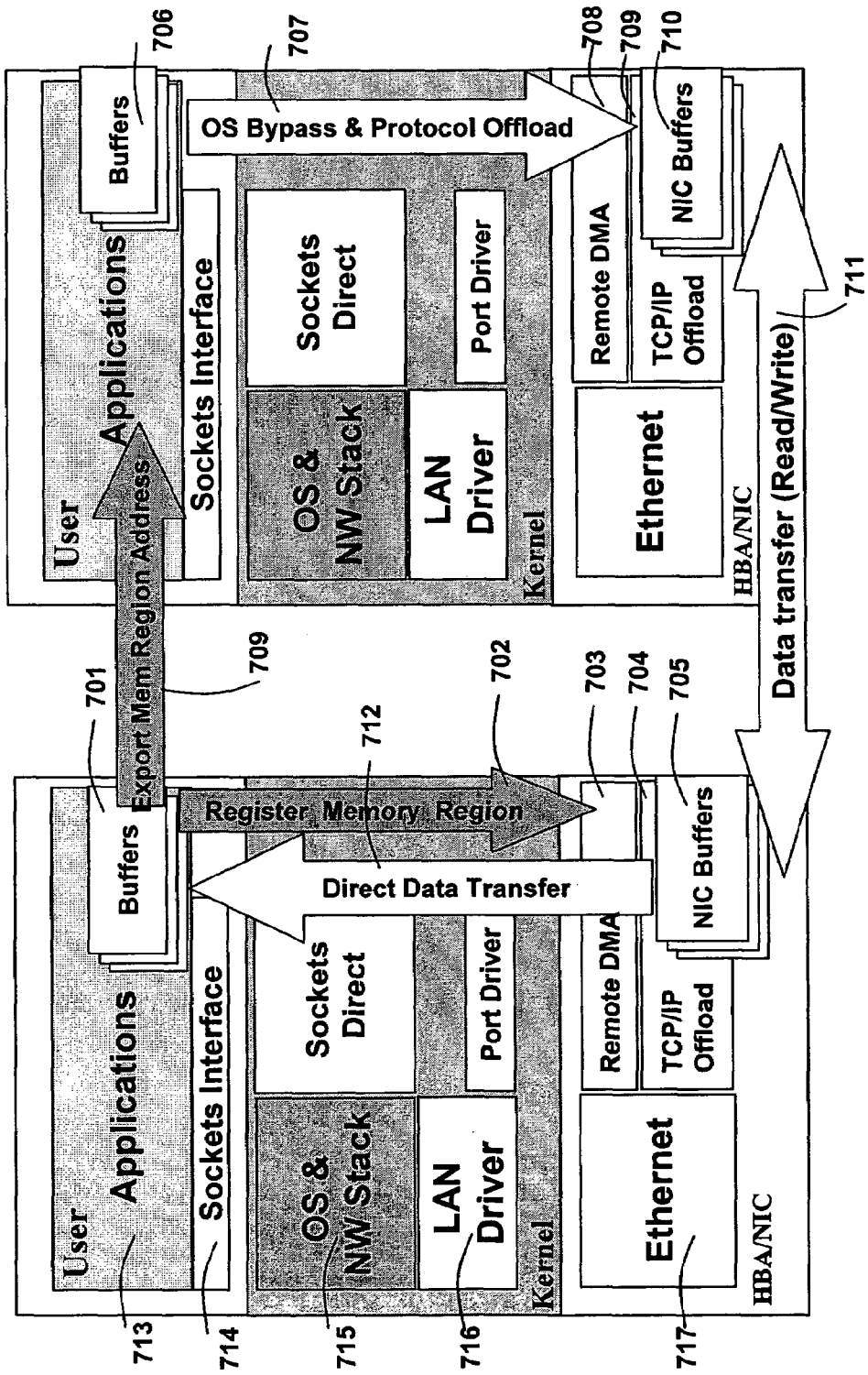
Fig. 7 Remote Direct Memory Access

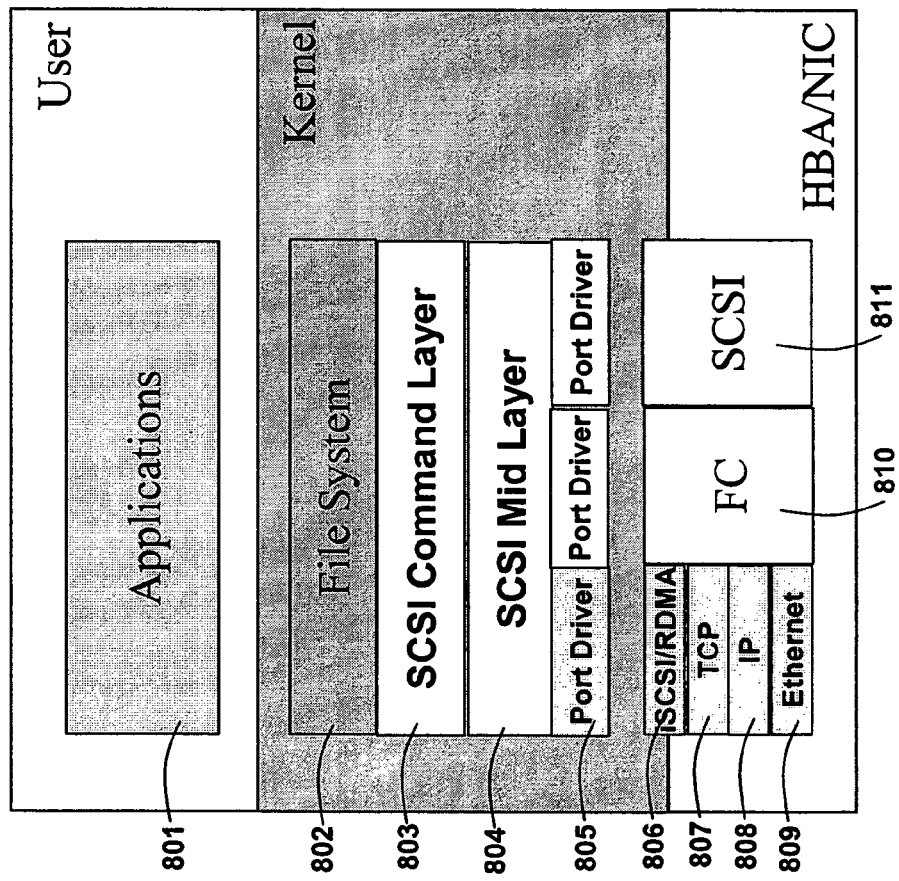
Fig. 8 Host Software Stack (SCSI)

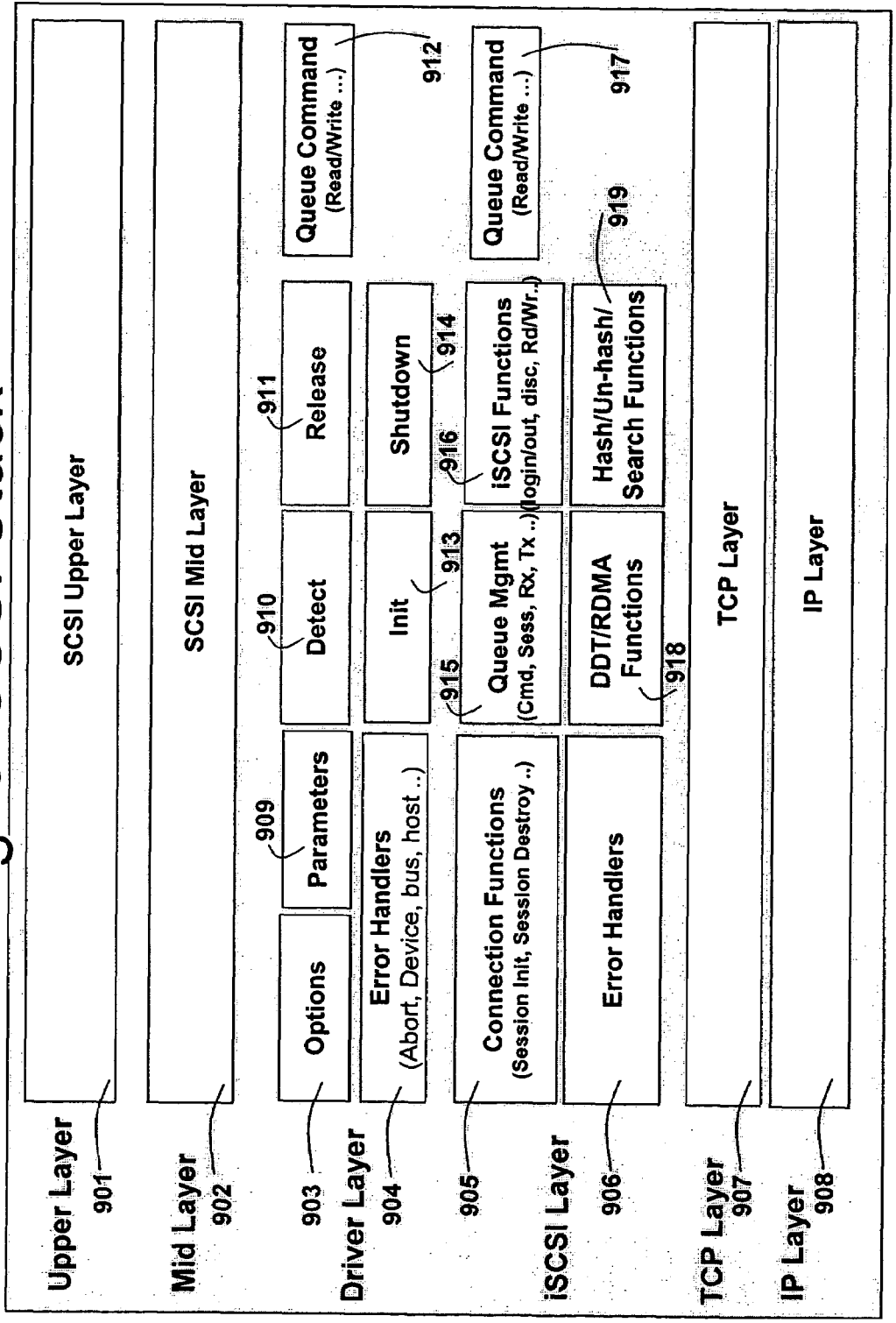
Fig. 9 iSCSI Stack

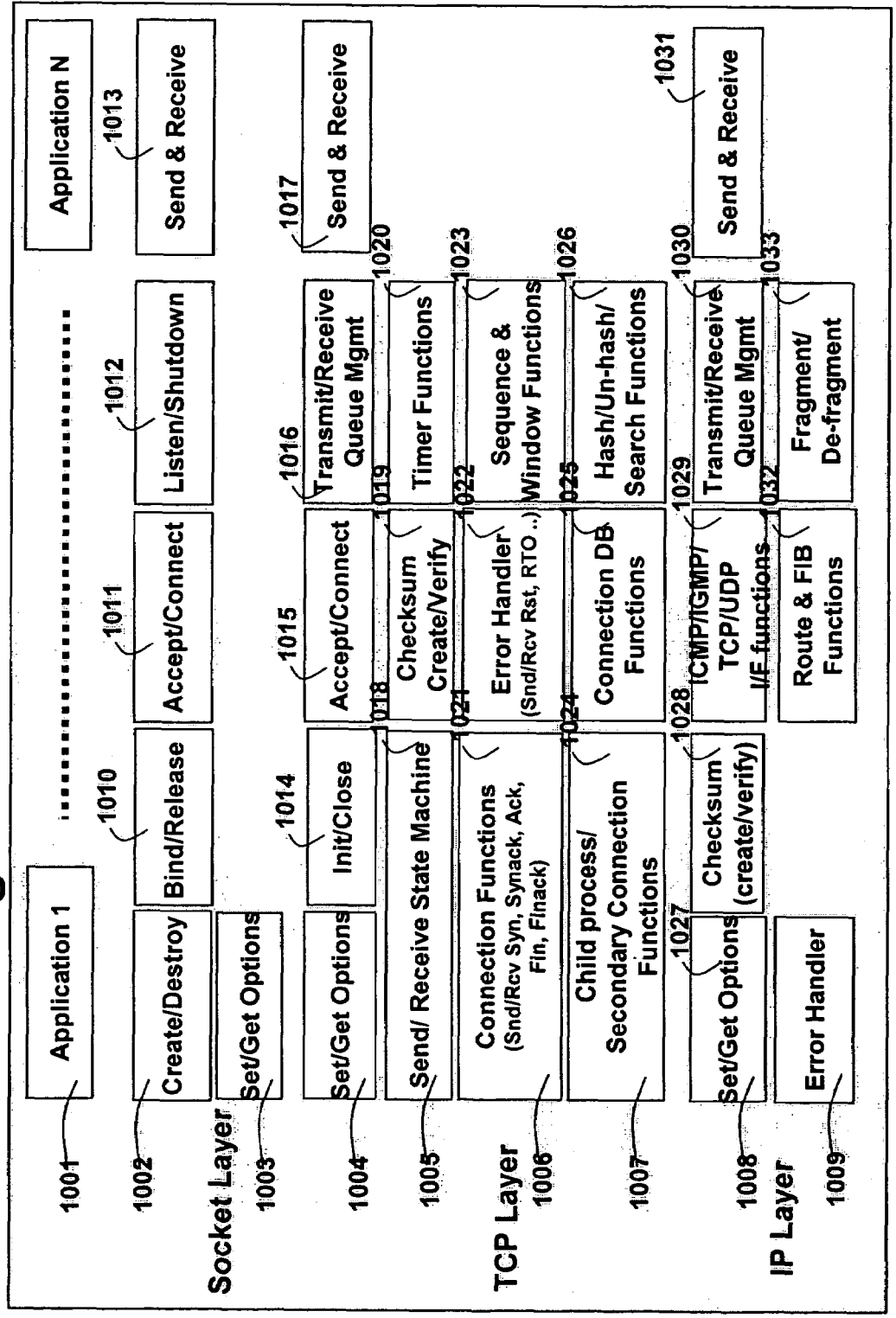
Fig. 10 TCP/IP Stack

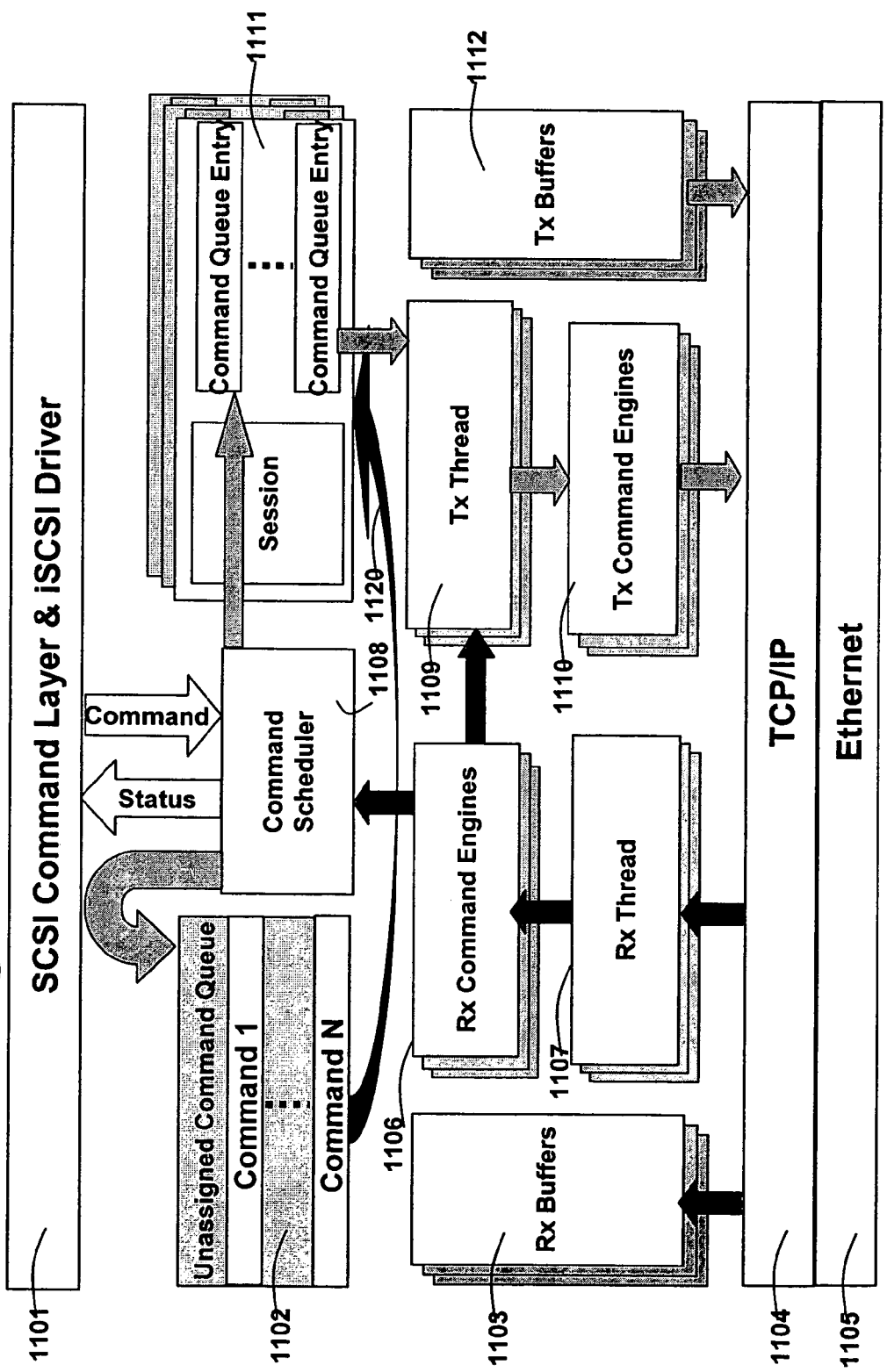

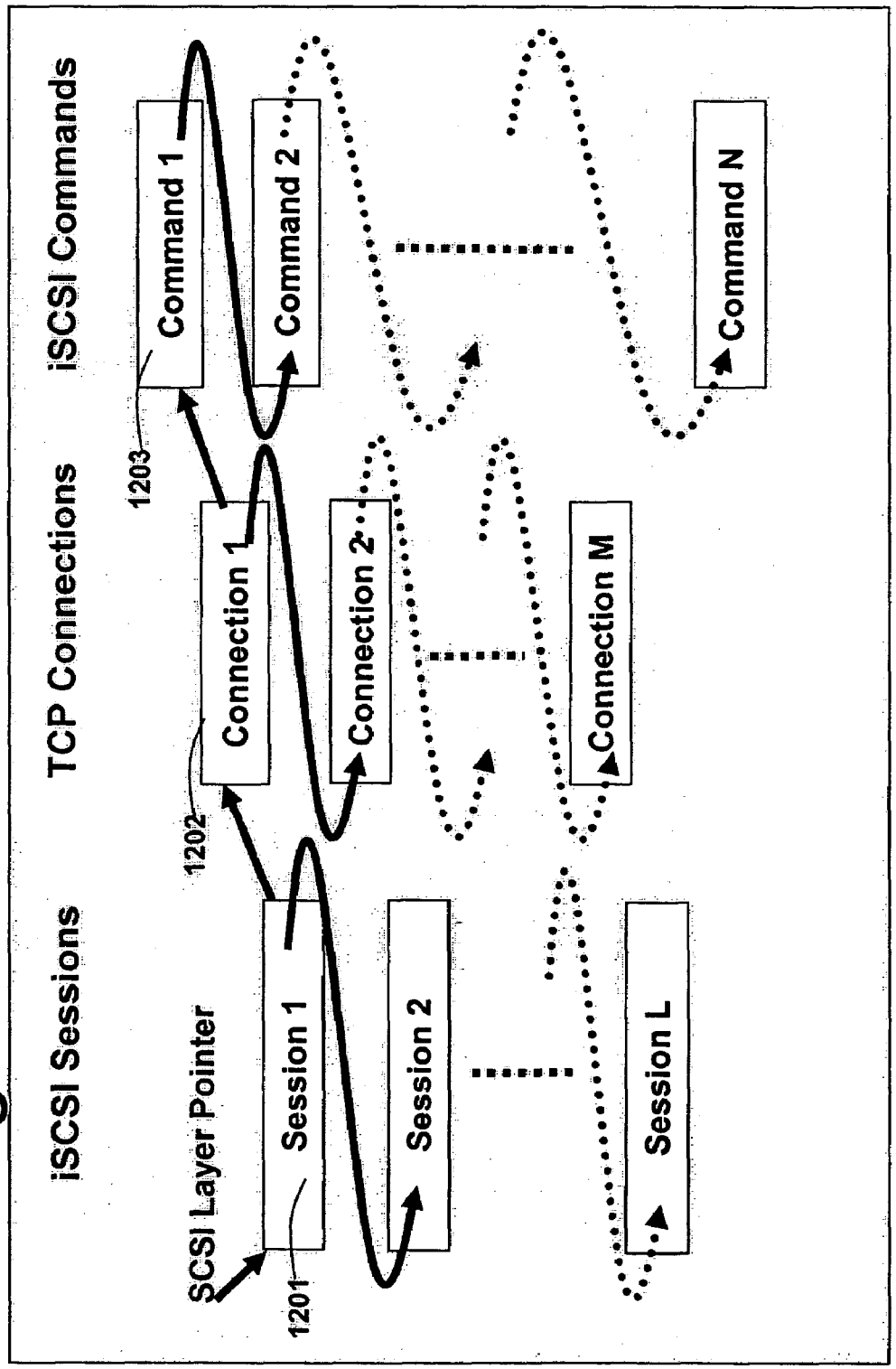

Fig. 13 TCP/IP Session DB Entry

| Source_IP | Destination_IP | Source_Port | Destination_Port | Protocol |
|---|---|---|---|---|
| Connection_ID | TCP_Window_PTR | Window_Size | Sender MSS/MTU | Expected_SQN |
| TCP_State | TCP_SND_SEQ# | TCP_SEQ# | TCP_ACK# | TCP_RCV_SEQ# |
| Fragment_PTR | Packet_send_PTR (byte granular) | Packet_Start_Time | Last_PKT_Time | TCP_Parameters (slow start, retransmit ...) |
| Packets_Count | Congestion Window | SSThresh | Receiver MSS | Other Fields |
| Frame_key | Out of Order PTR | Other Frame Fields | | |
| Hash_Key | NXT_H_Match_PTR | Valid/Invalid | | |

Fig. 14 iSCSI Session DB Entry

| iSCSI_State | Data_SEQ# | Command_SEQ# | Task_TAG | R2T_SEQ# |
|---|---|---|---|---|
| Status_SEQ# | EXP_Status_SEQ# | EXP_CMD_SEQ# | TARGET_MODE (Solicited or not) | Target_Parameters (First burst, max PDU ...) |
| ISID | TSID | Portal Group Tag | Transfer Direction | Other fields |
| Connection_ID | Command ID | RDMA enabled | RDMA Keys | Other RDMA Param |
| MDL_List_Pointer | Mem Descriptor | Block size | No. of Blocks (xmited or rcv'ed) | ULP_Pointers |
| Hash_Key | NXT_H_Match_PTR | Valid/Invalid | | |

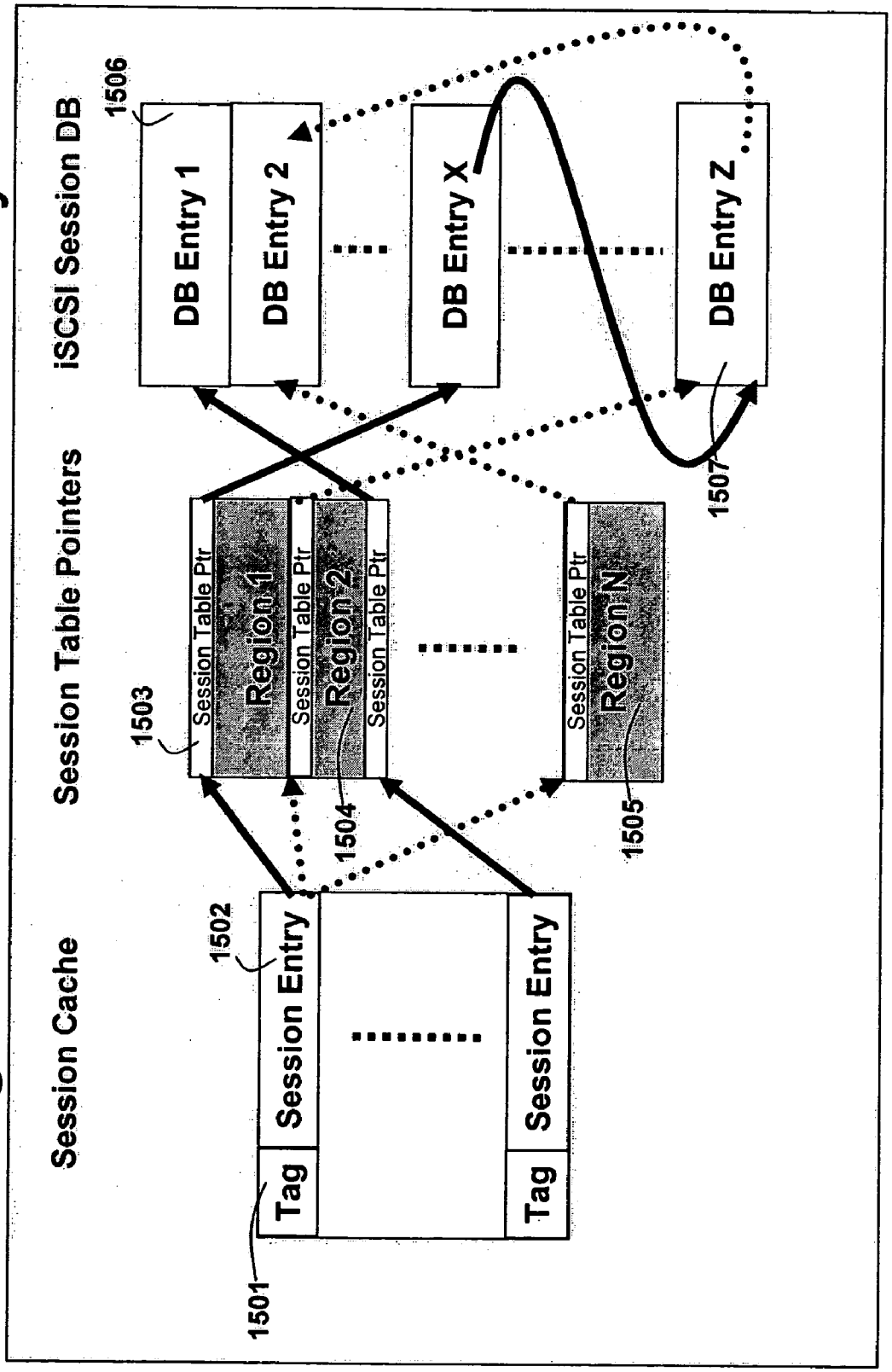
Fig. 15 iSCSI Session Memory

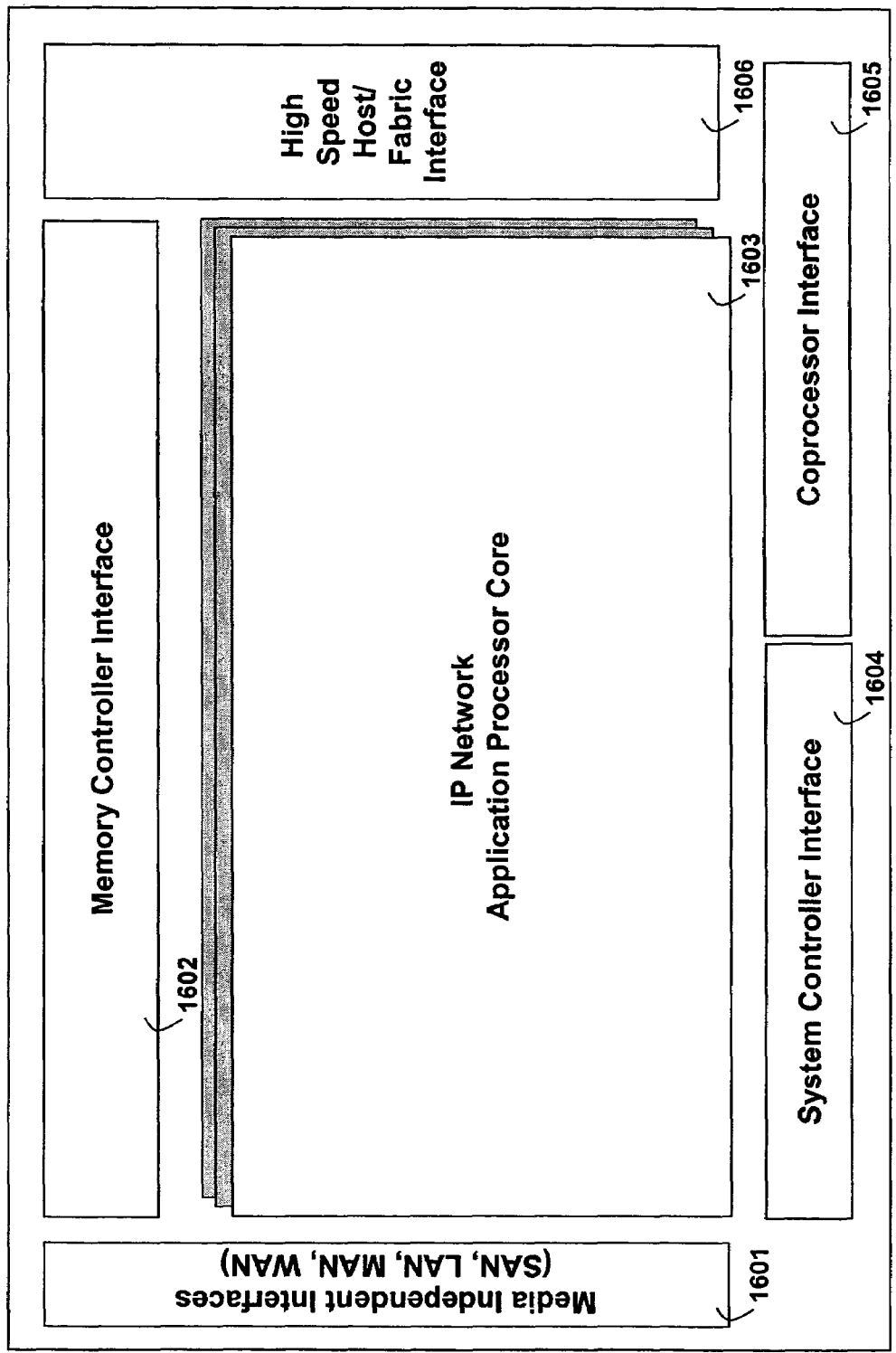
Fig. 16 IP Network Application Processor

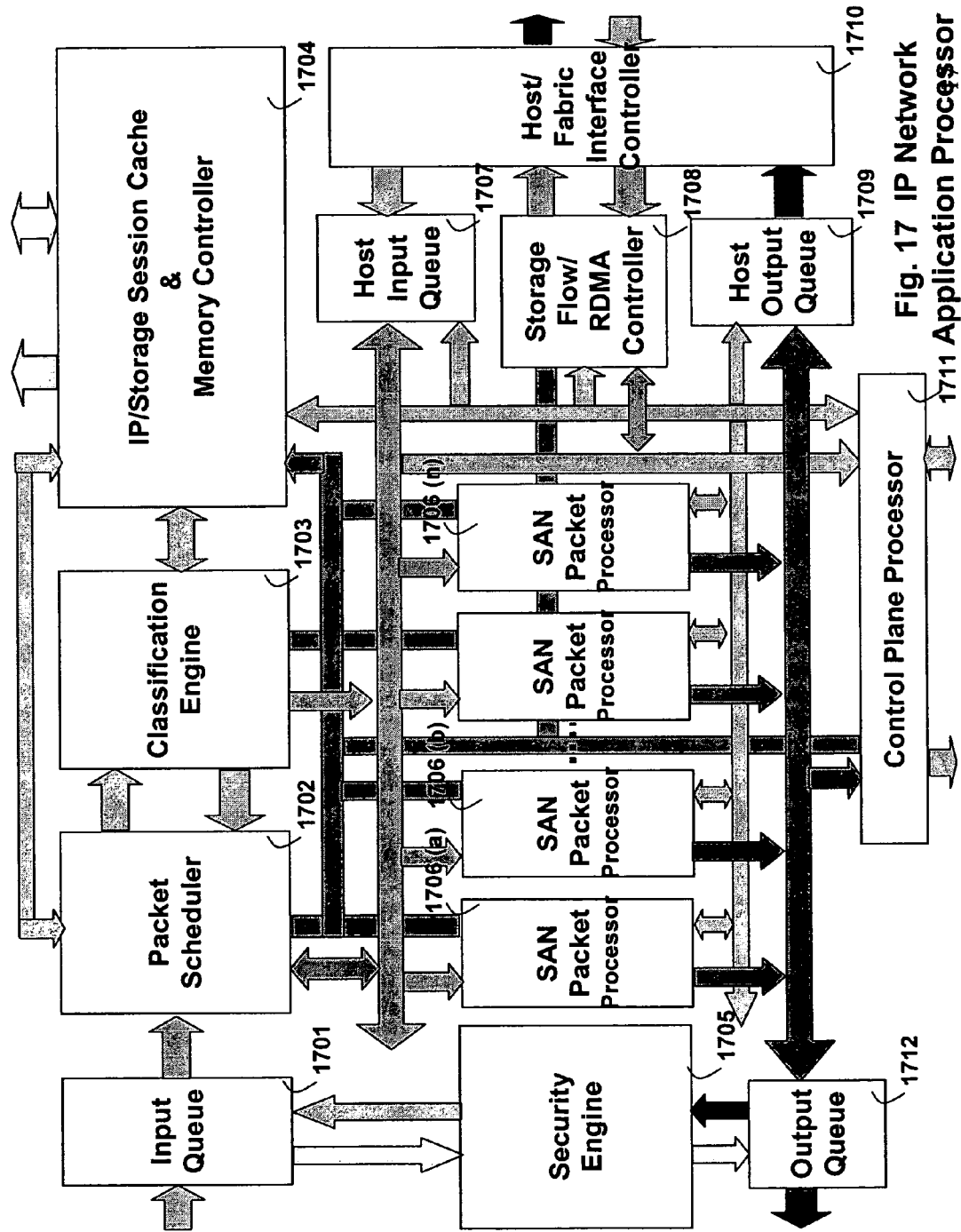
Fig. 17 IP Network Application Processor

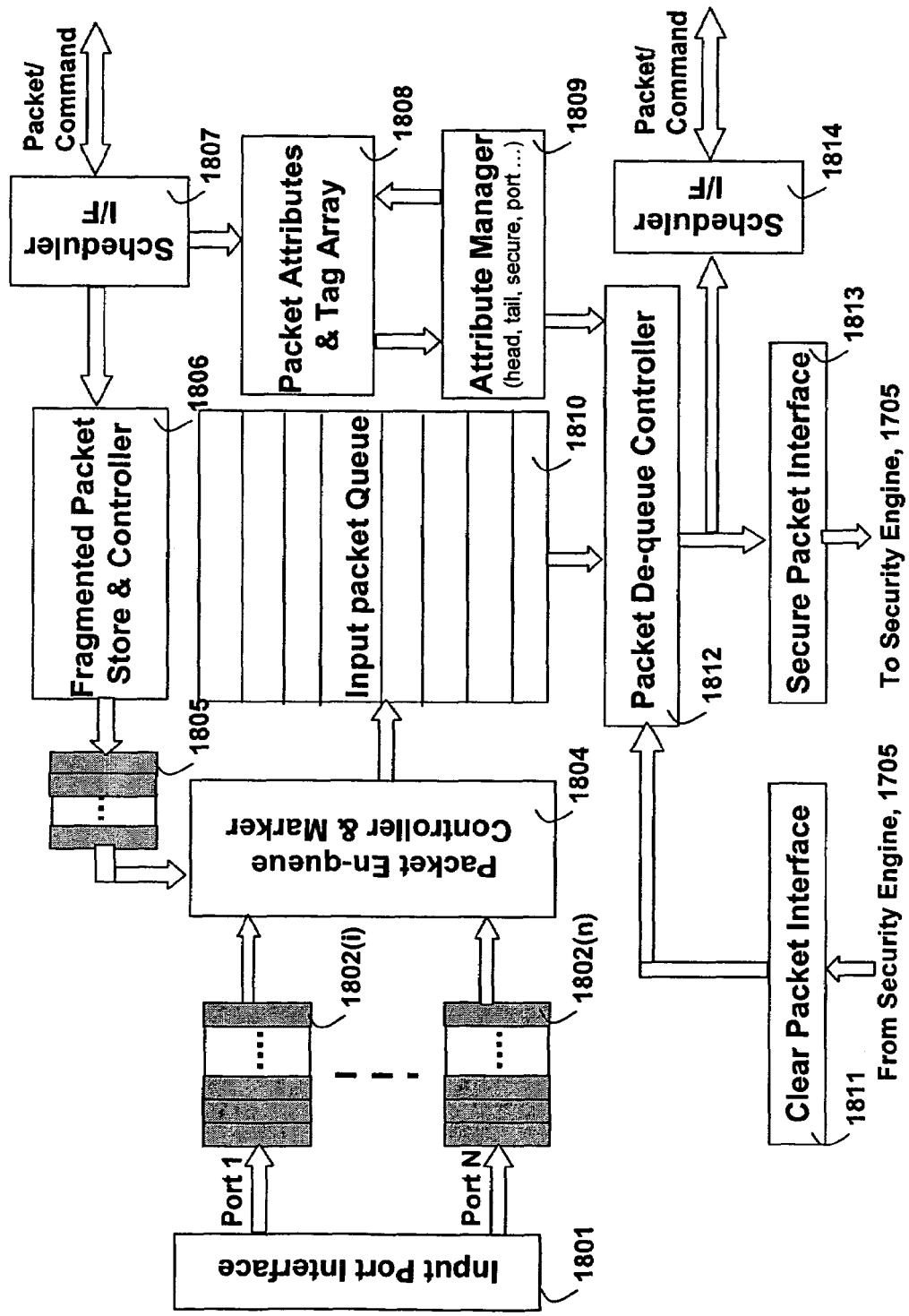
Fig. 18 Input Queue & Controller

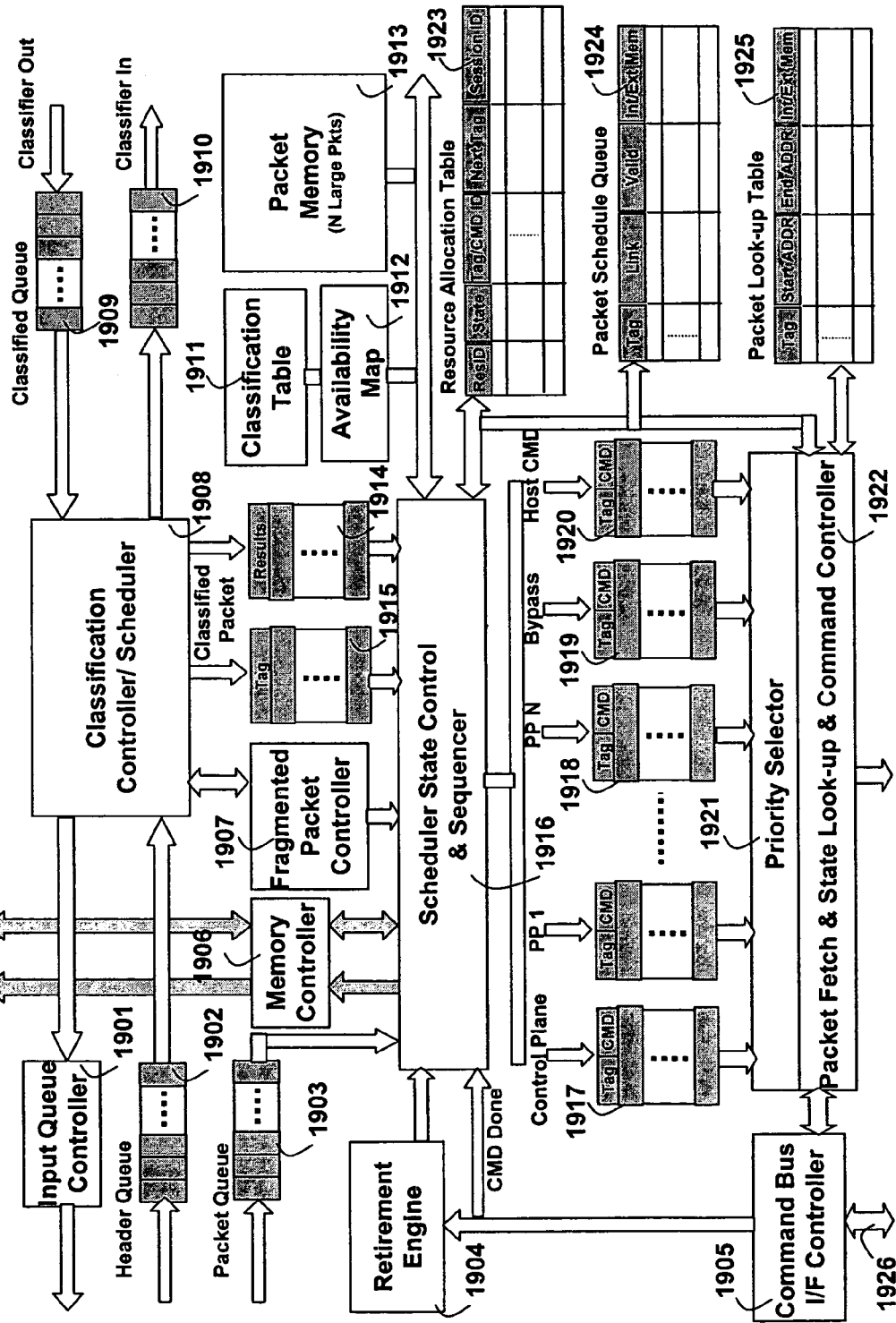
Fig. 19 Packet Scheduler & Sequencer

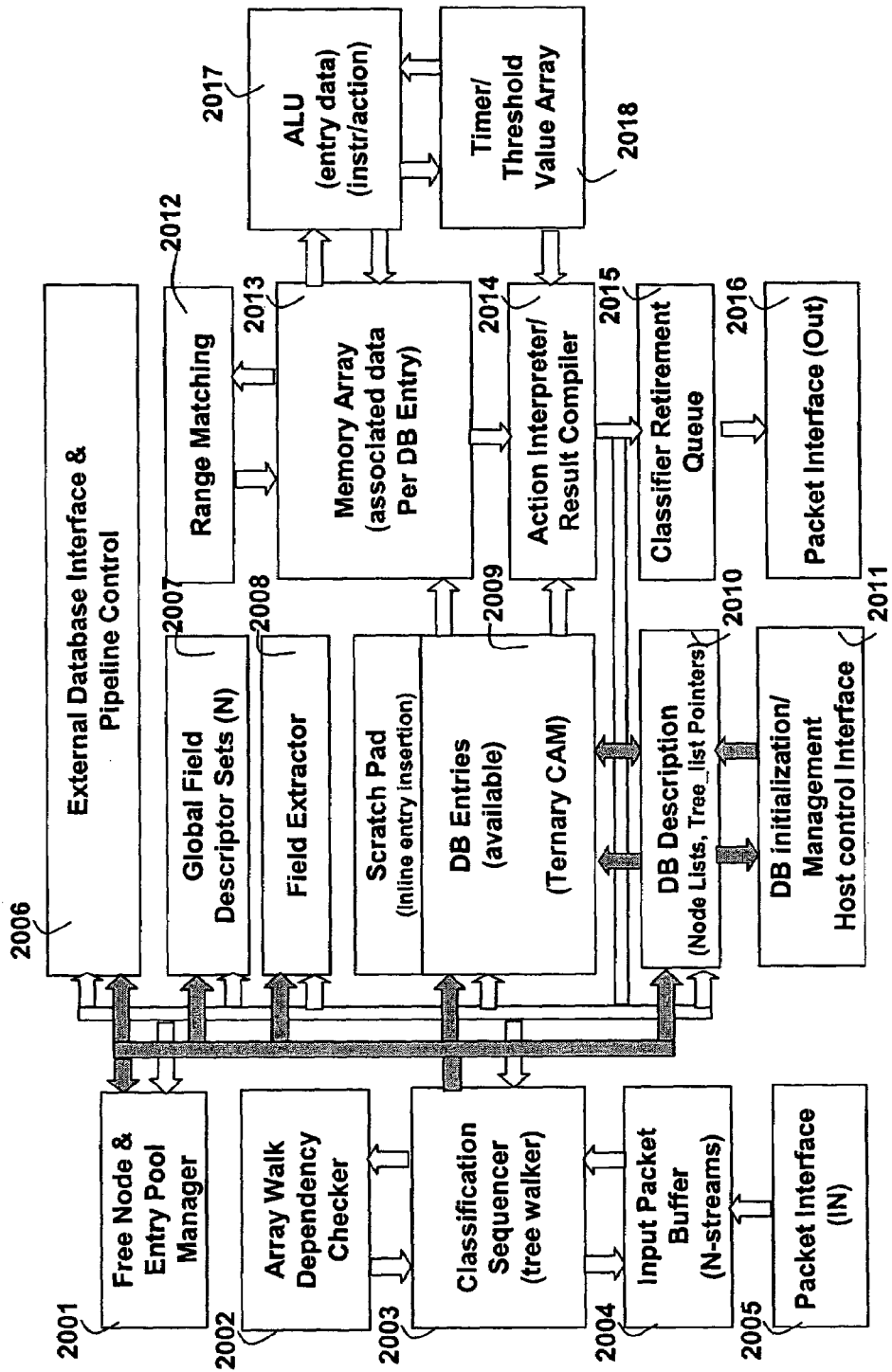
Fig. 20 Packet Classification/Policy Engine

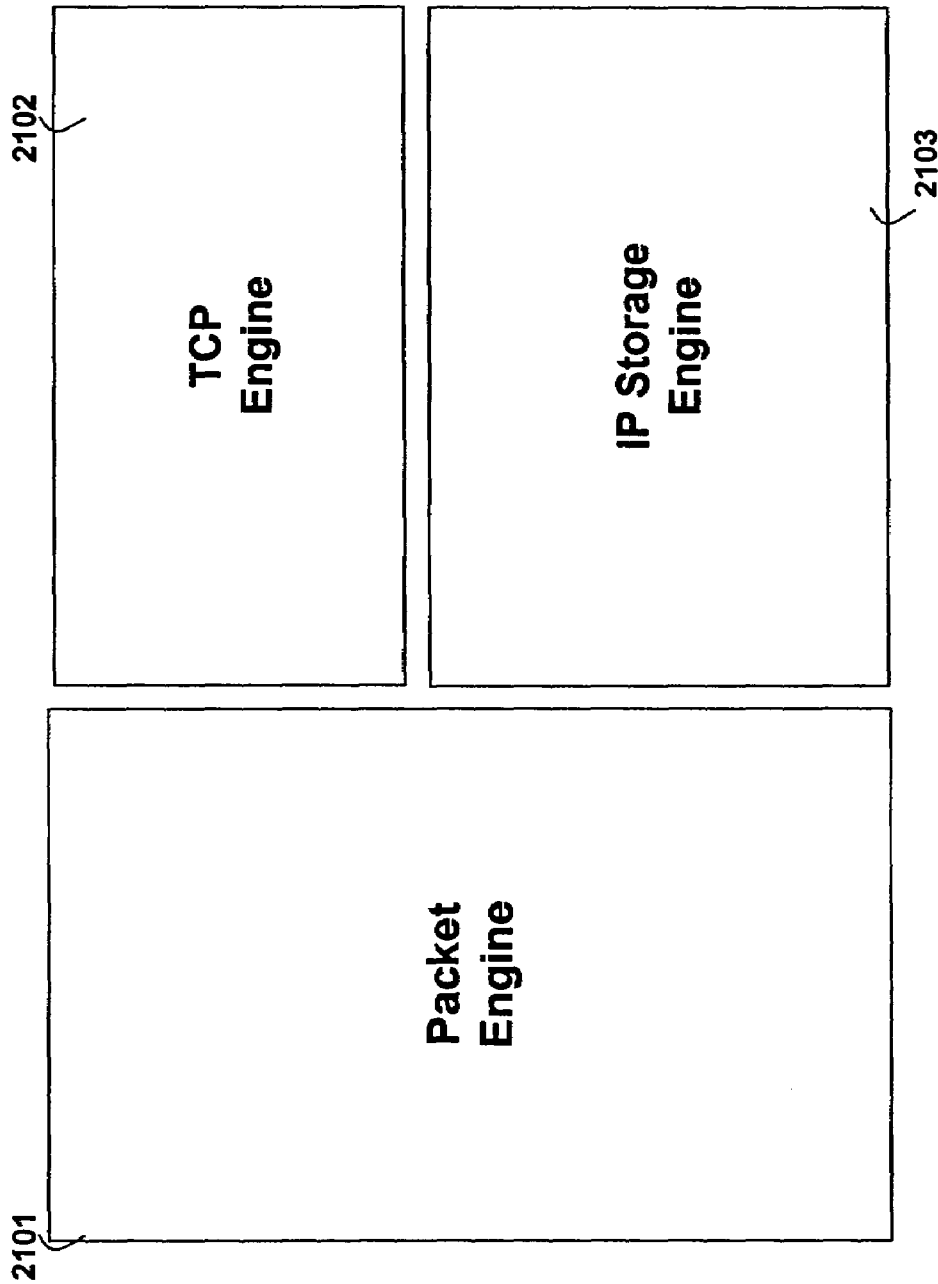
Fig. 21 SAN Packet Processor

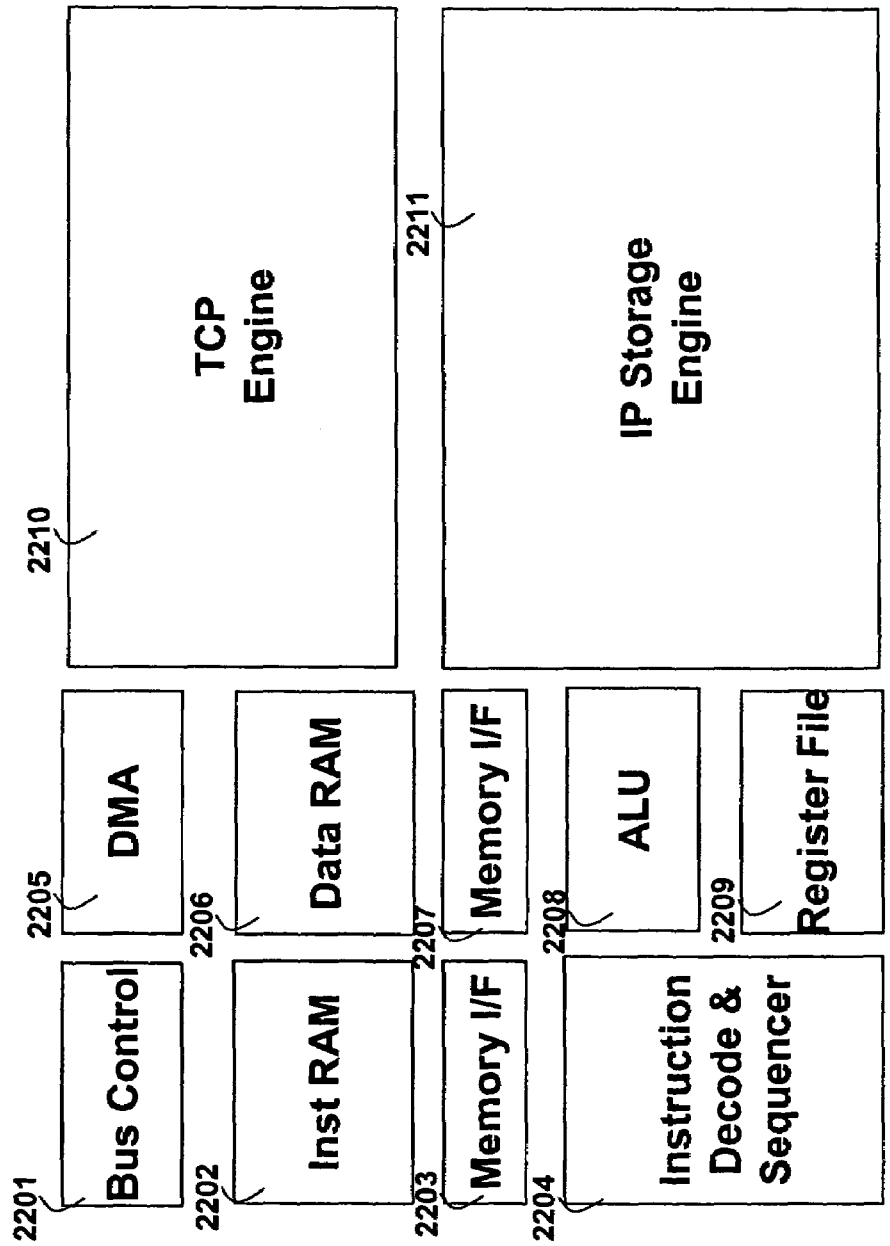
Fig. 22 SAN Packet Processor

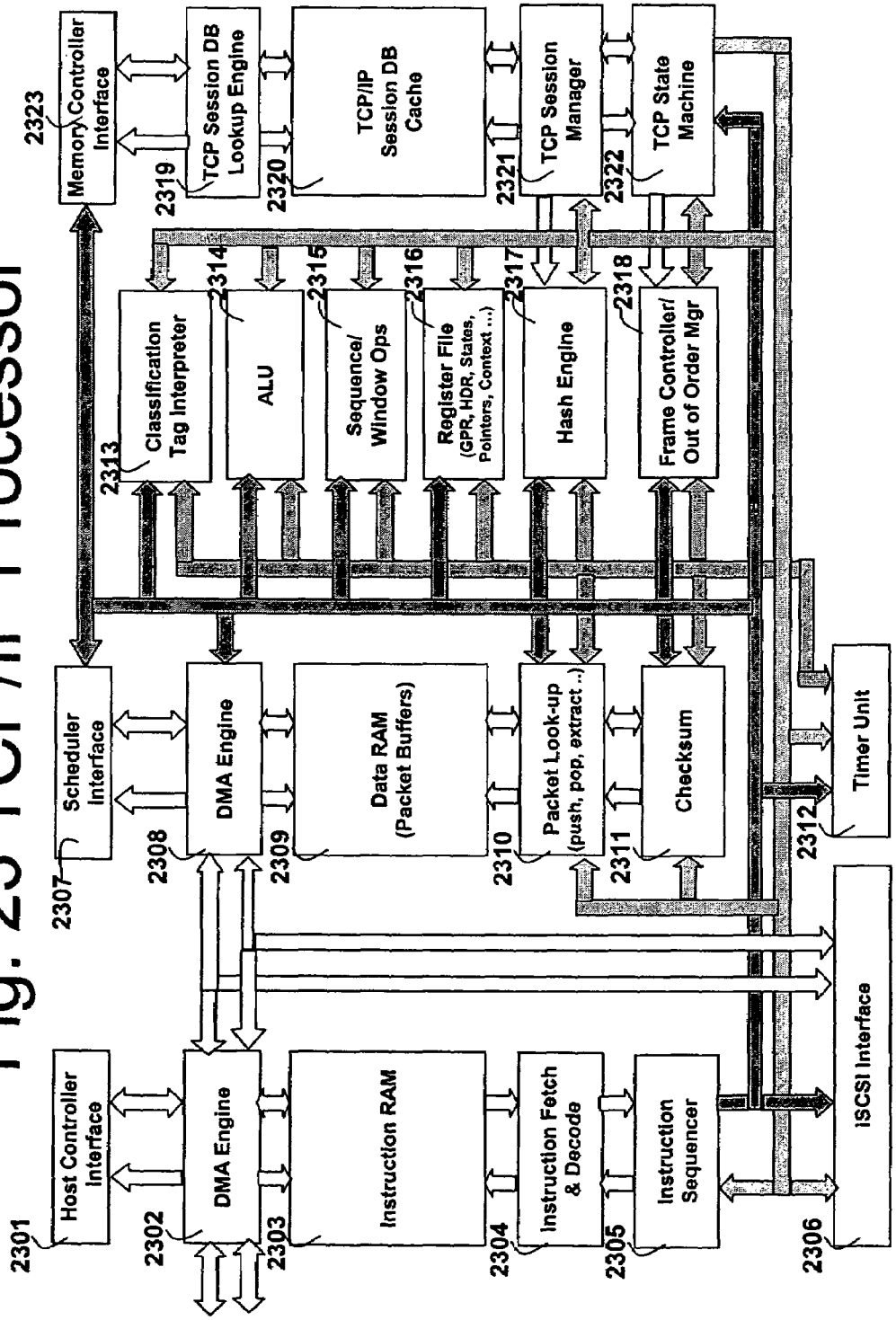
Fig. 23 TCP/IP Processor

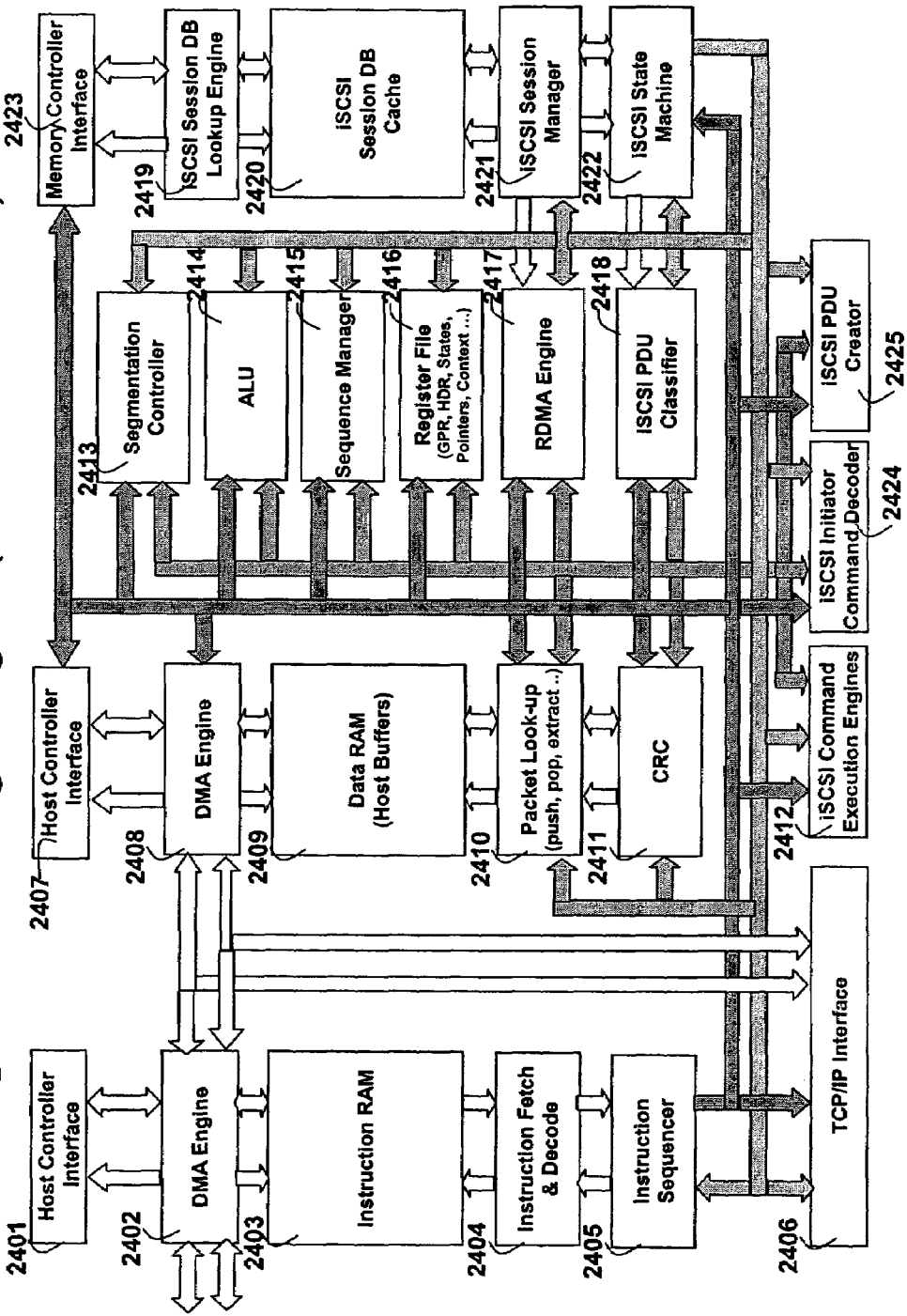
Fig. 24 IP Storage Engine (iSCSI Processor)

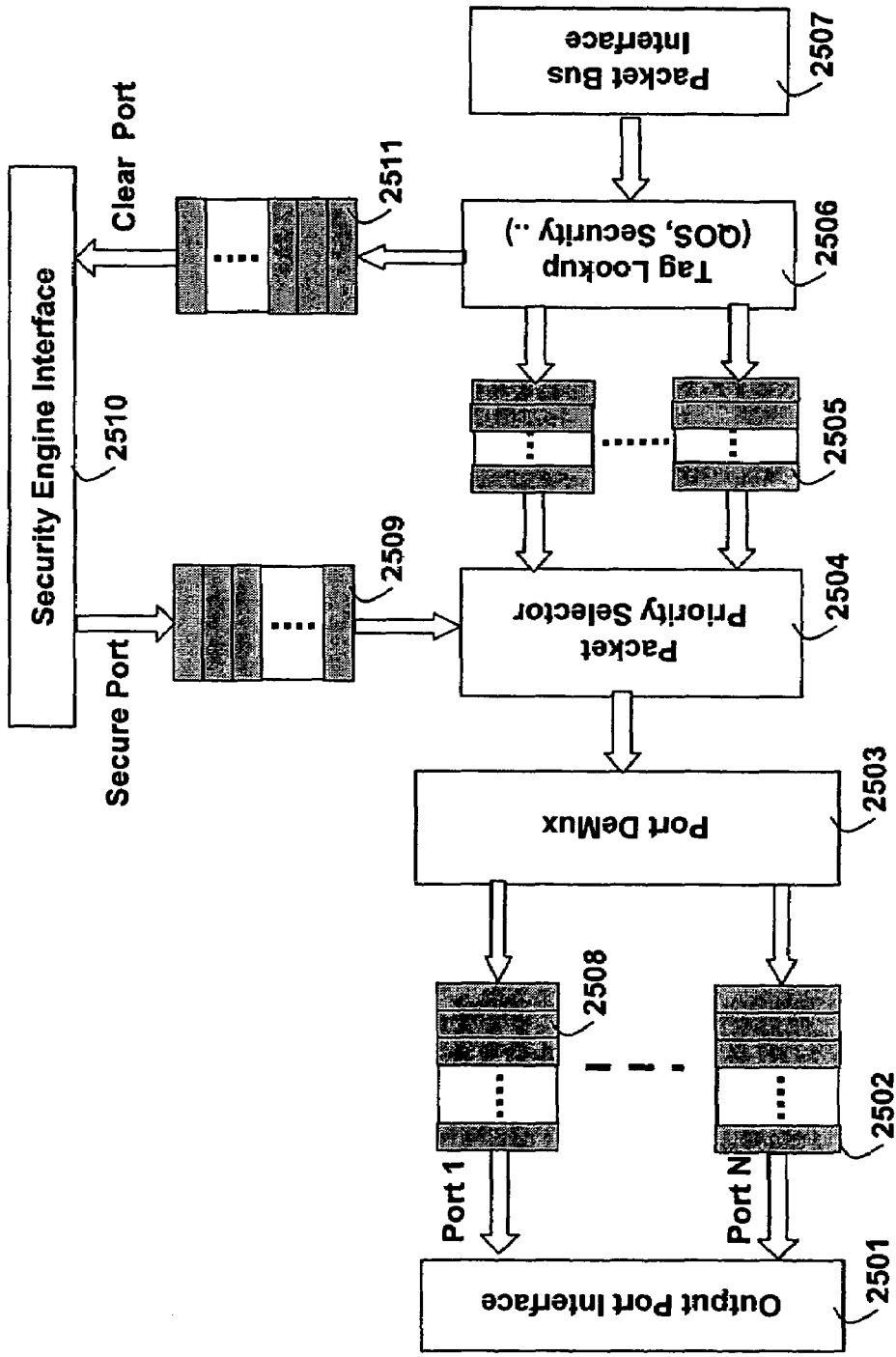
Fig. 25 Output Queue

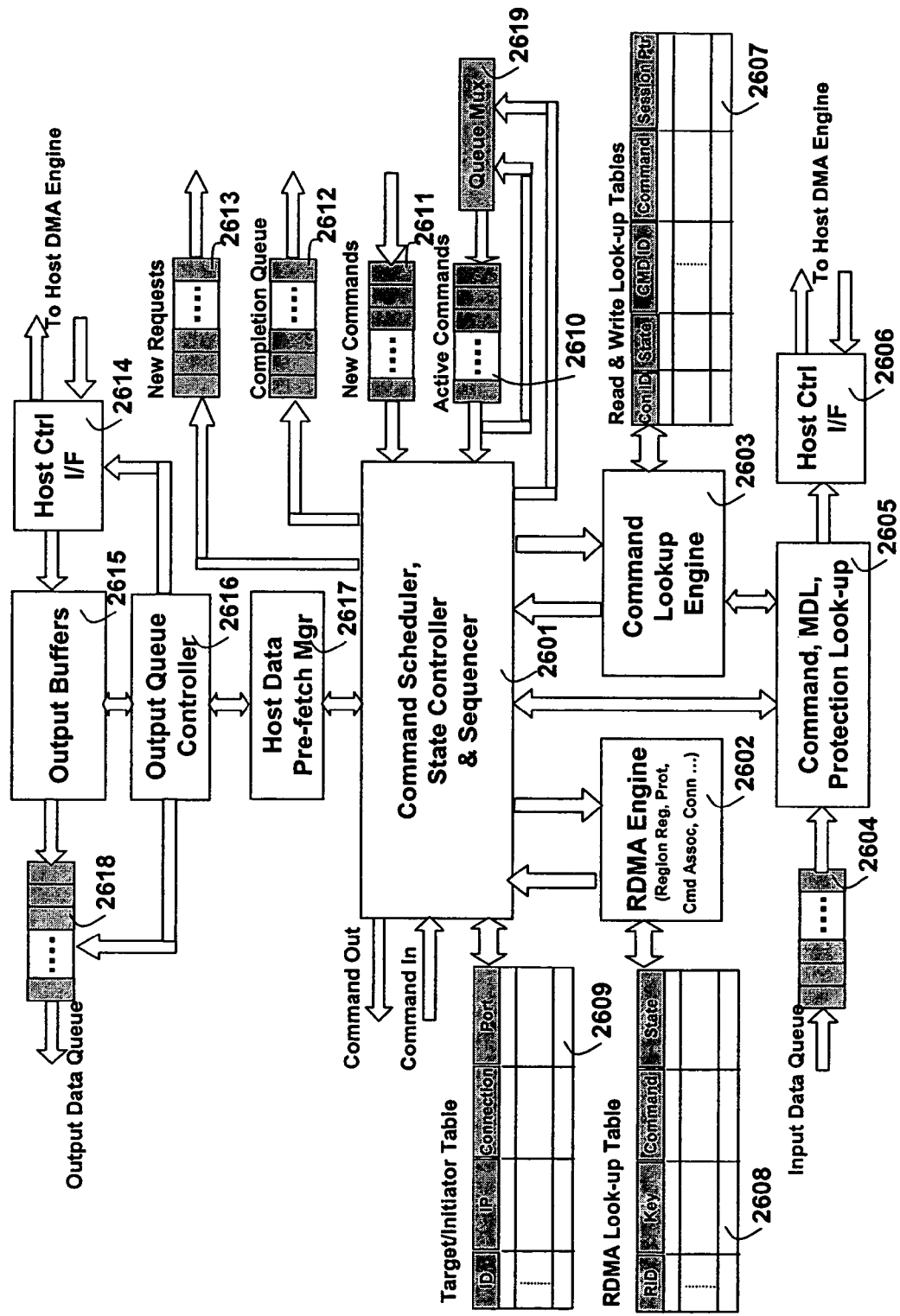
Fig. 26 Storage Flow & RDMA Controller

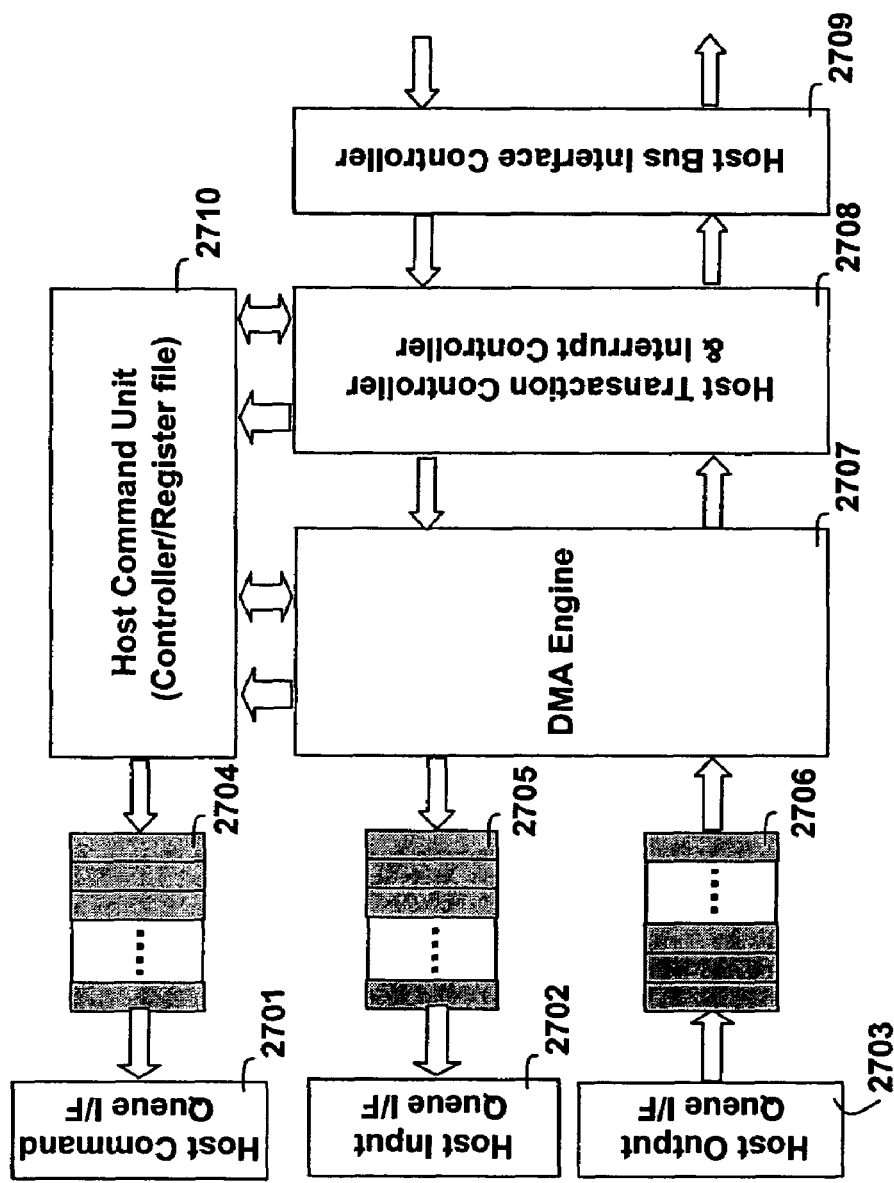
Fig. 27 Host Interface Controller

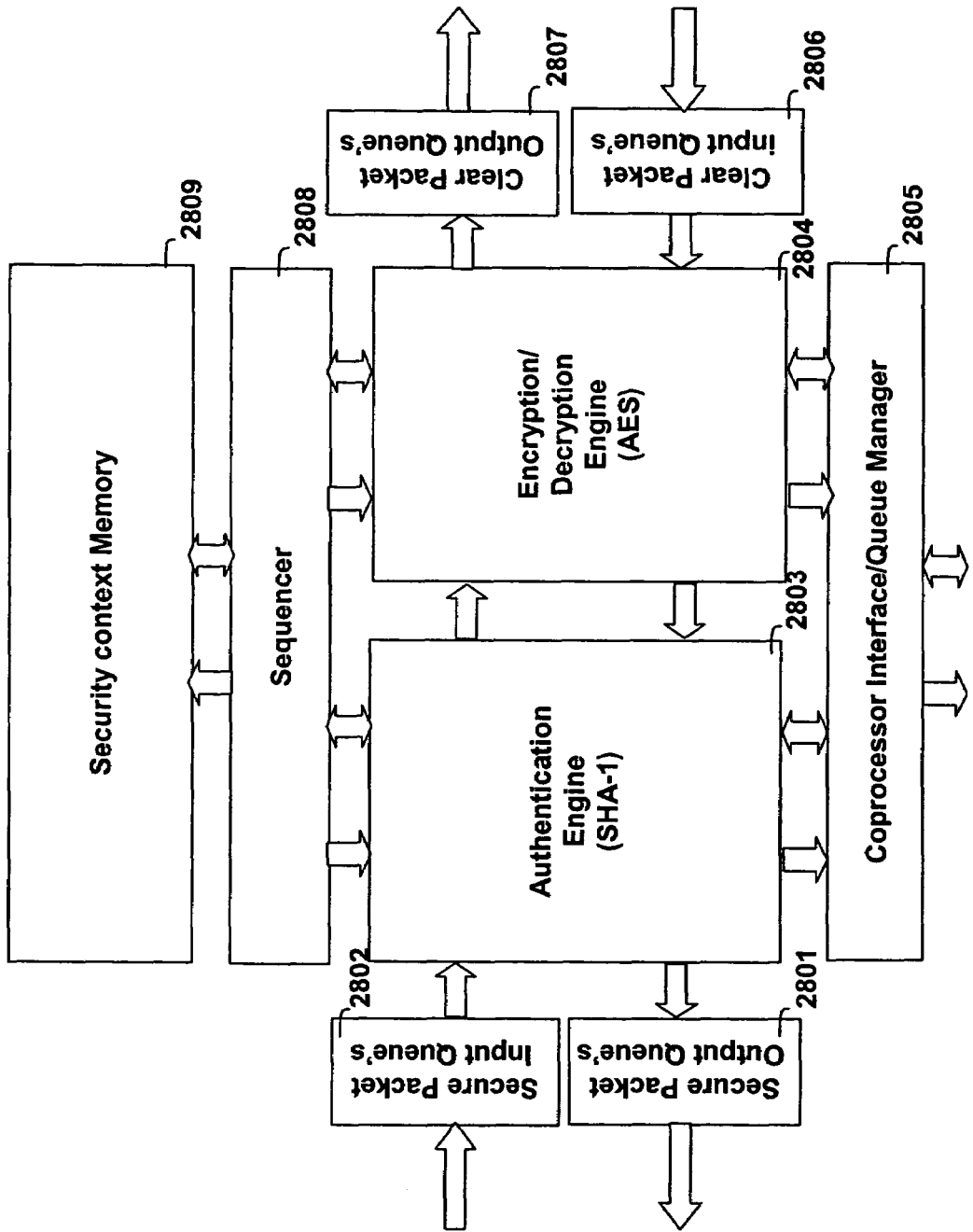
Fig. 28 Security Engine

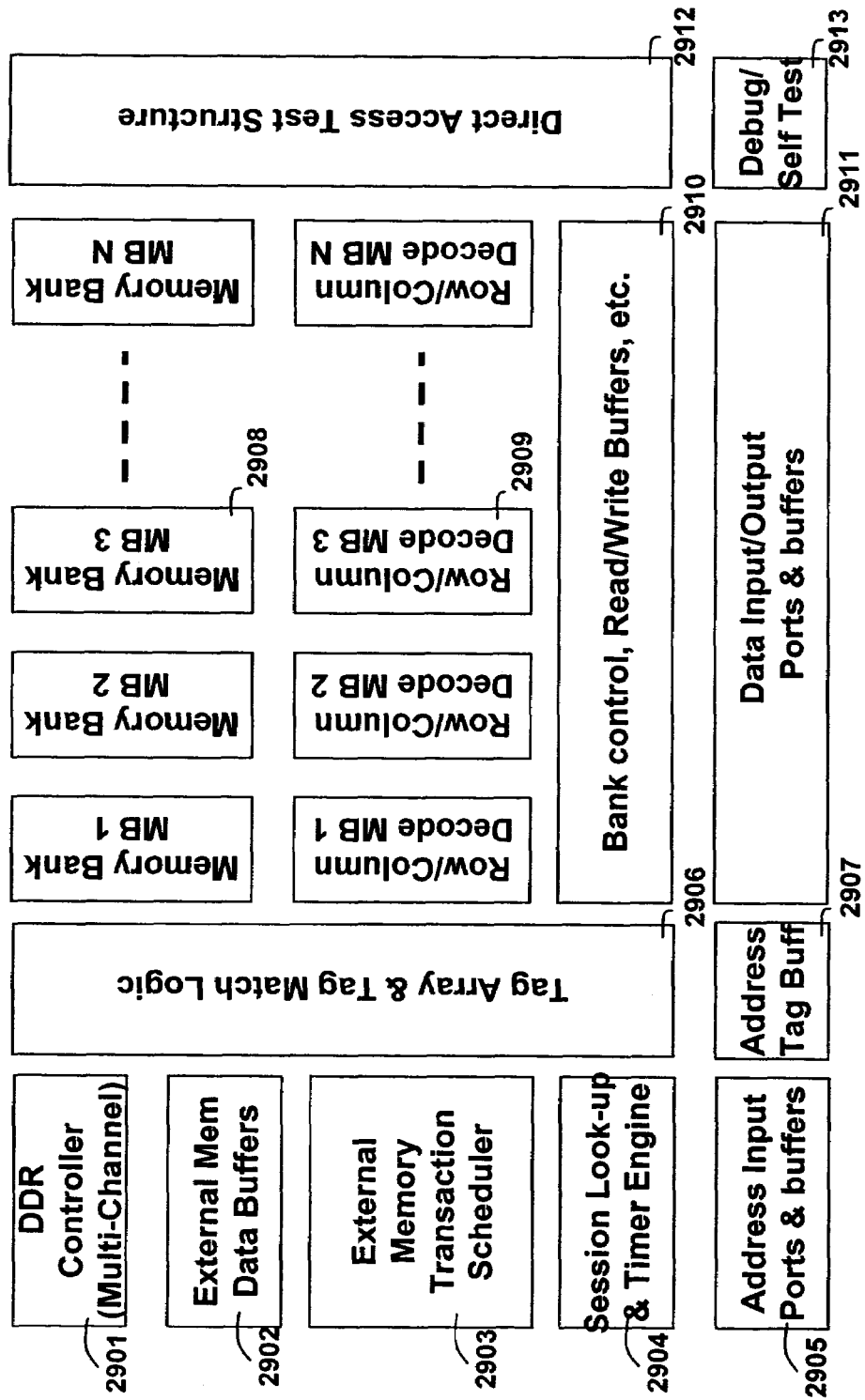
Fig. 29 IP Storage Session Cache & Memory Controller Complex

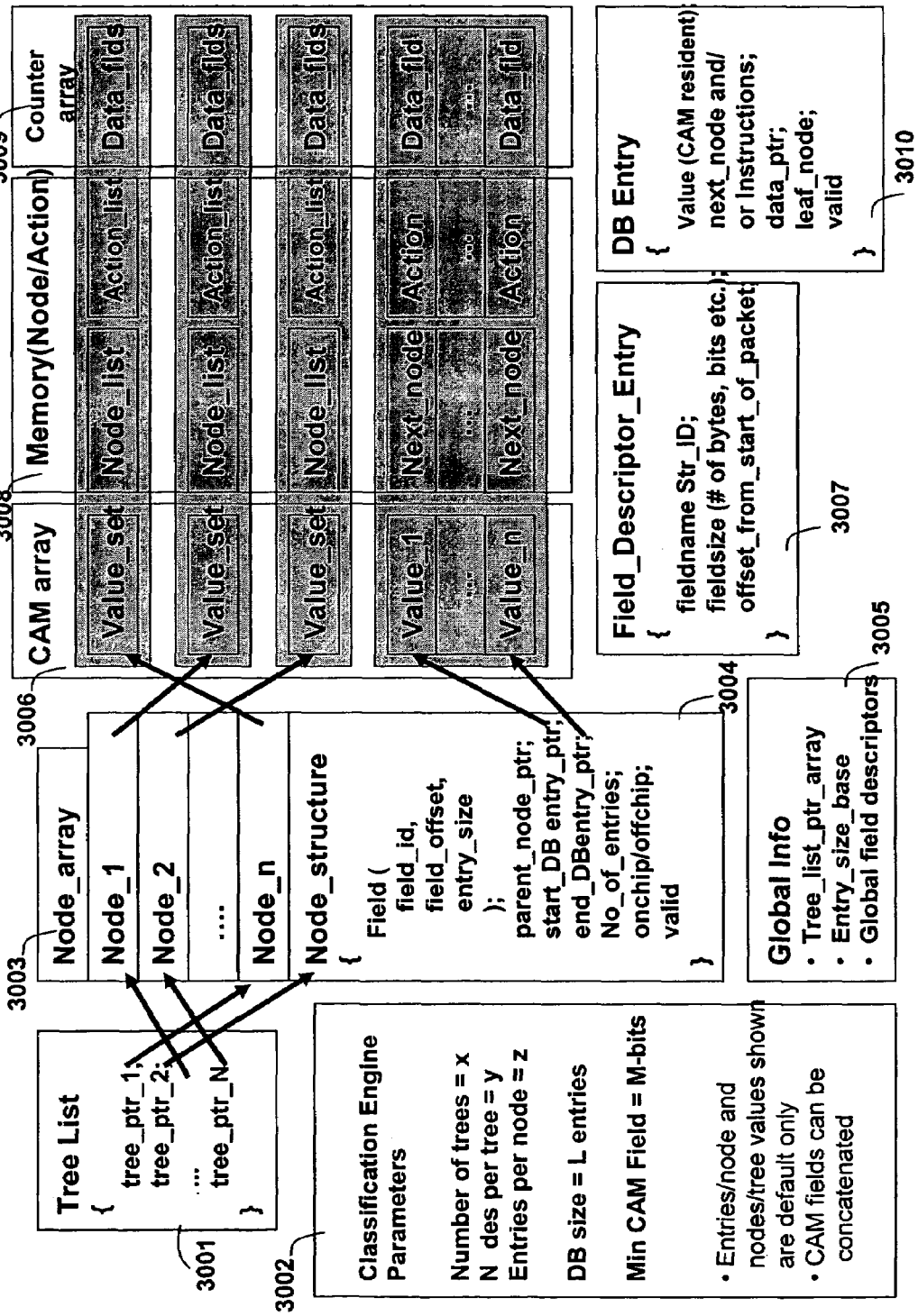

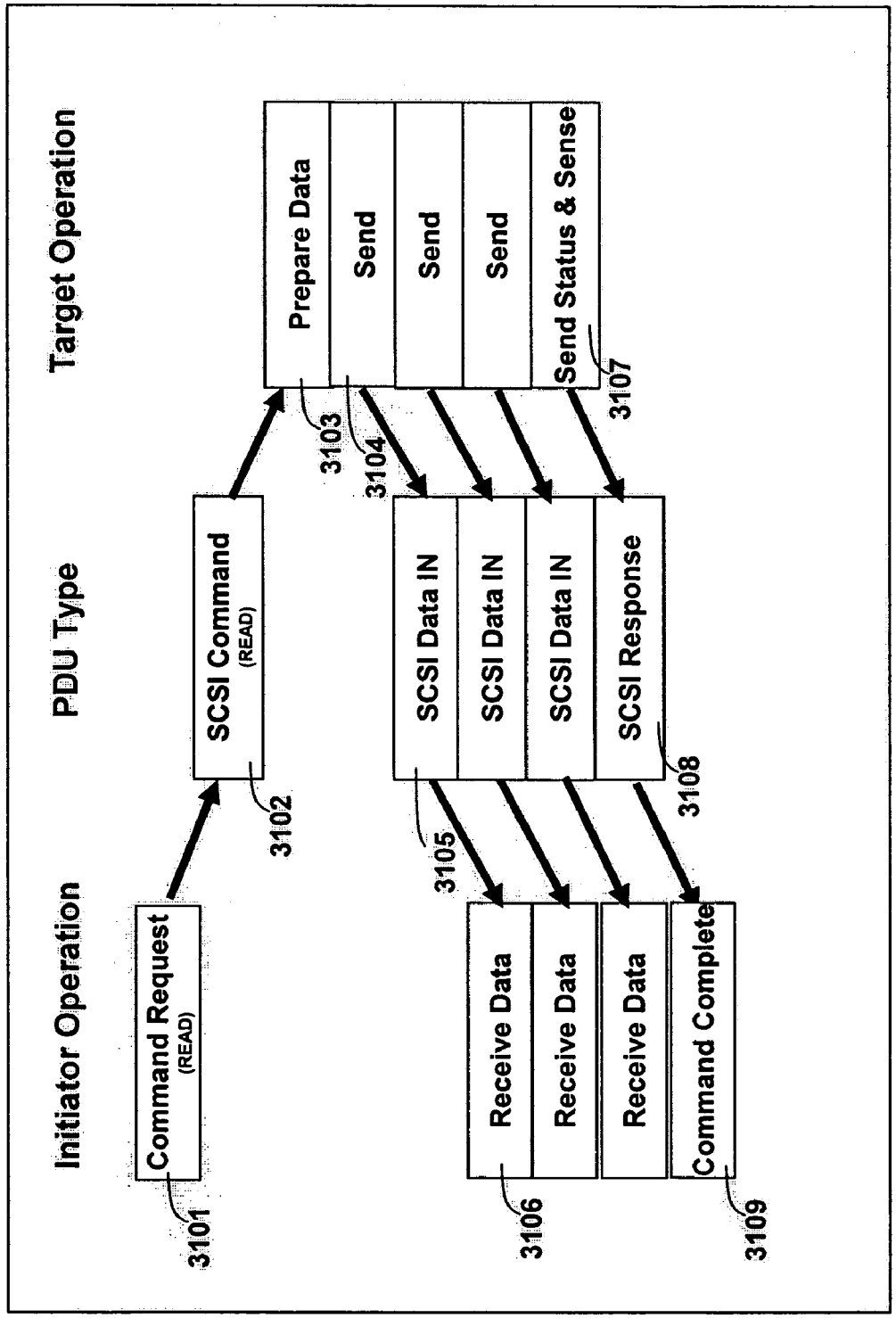

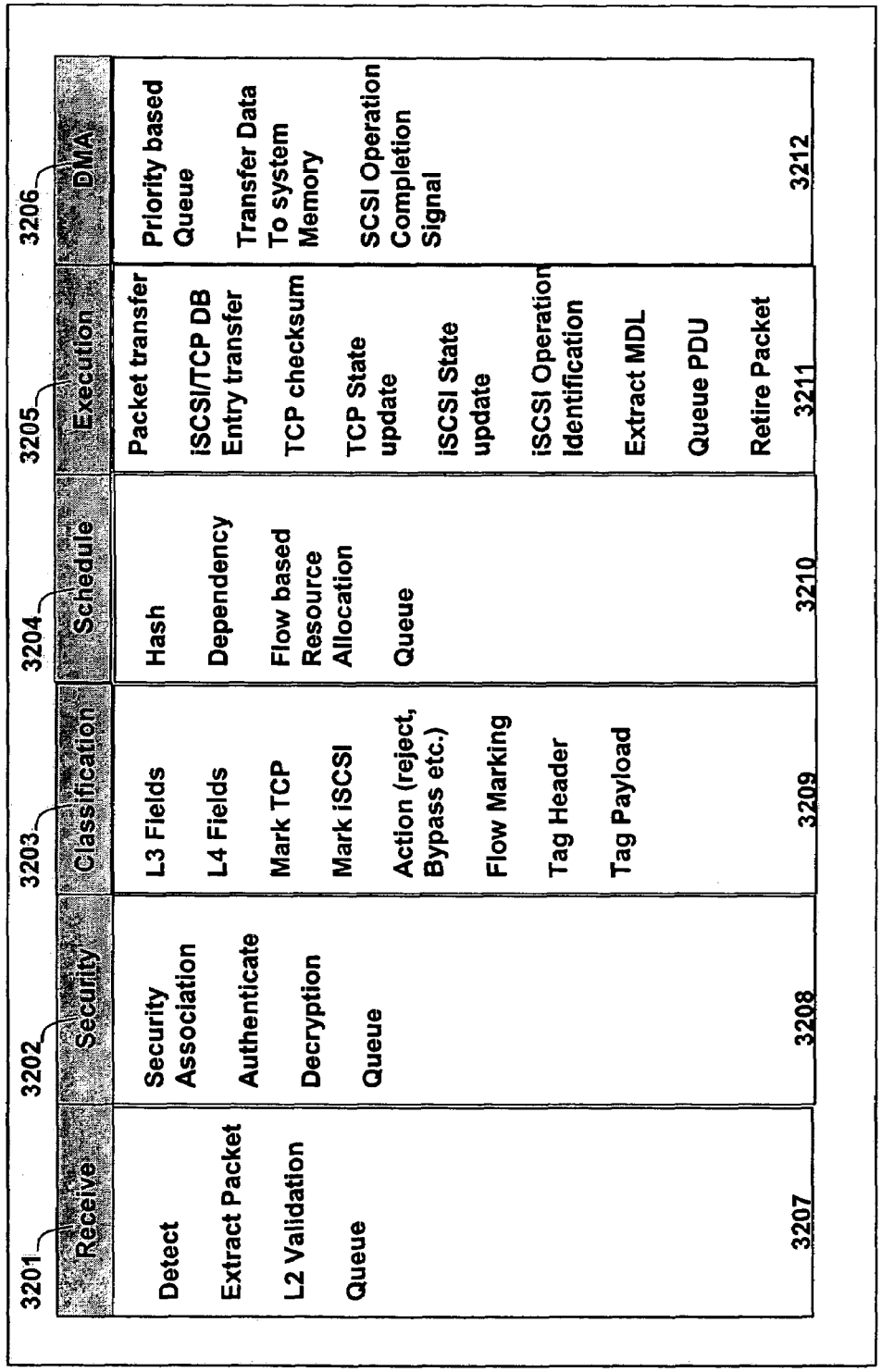
Fig. 32 Read Data Packet Flow

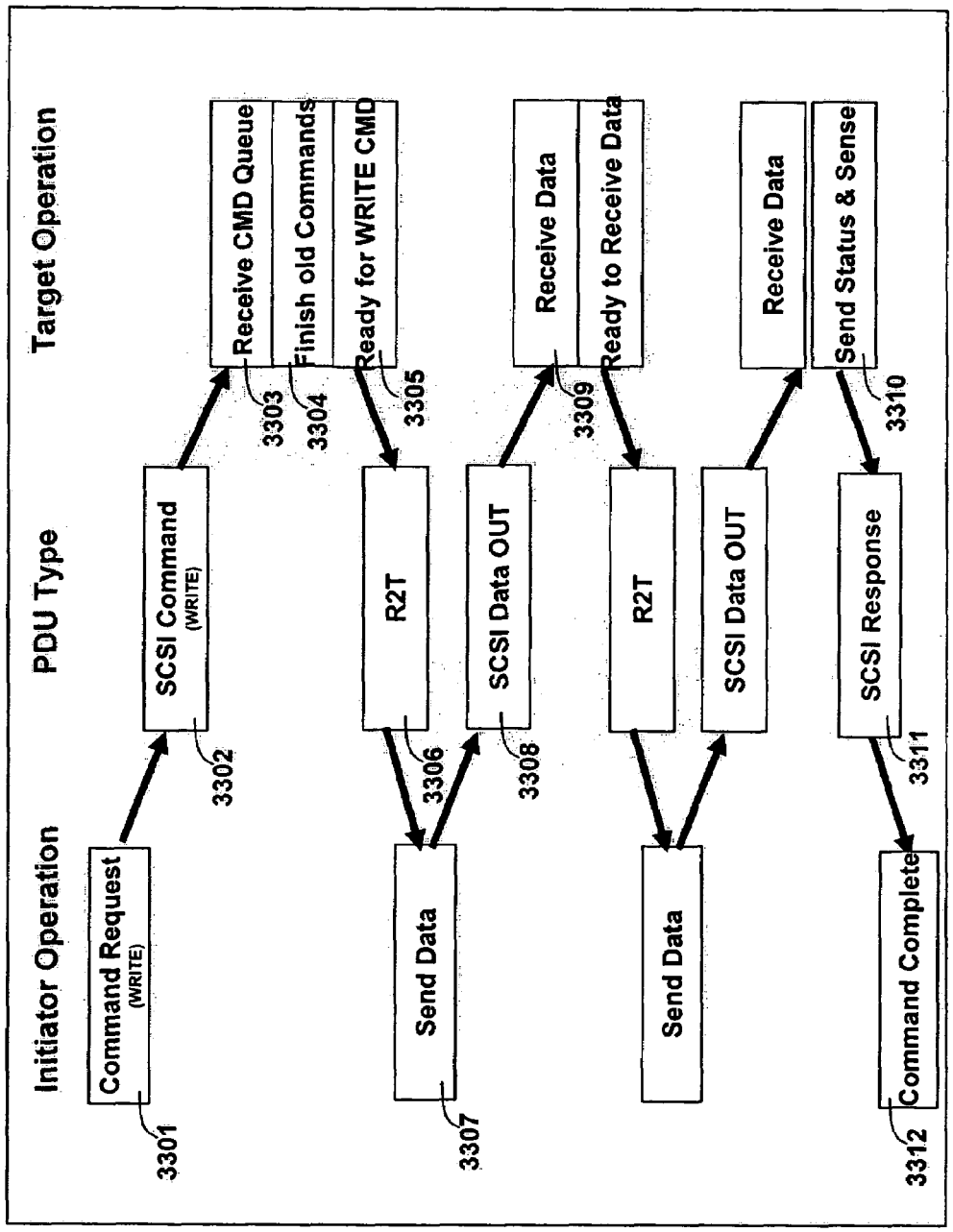
Fig. 33 Write Operation

Fig. 34 Write Data Packet Flow

| 3401 Receive | 3402 Classification | 3403 Schedule | 3404 Execution | 3405 DMA | 3406 Execution | 3407 Security | 3408 Transmit |
|---|---|---|---|---|---|---|---|
| Detect<br><br>Extract Packet<br><br>L2 Validation<br><br>Queue | L3 Fields<br><br>L4 Fields<br><br>Mark TCP<br><br>Mark iSCSI<br><br>Action (reject, Bypass etc.)<br><br>Flow Marking<br><br>Tag Header<br><br>Tag Payload | Hash Key Lookup<br><br>Dependency<br><br>Flow based Resource Allocation<br><br>Queue | Packet transfer<br><br>iSCSI/TCP DB Entry transfer<br><br>TCP checksum<br><br>TCP State update<br><br>iSCSI State update<br><br>iSCSI Operation Identification<br><br>Extract MDL<br><br>Queue PDU<br><br>Start Write DMA<br><br>Retire Packet | Priority Queue<br><br>Transfer Data from system Memory | Prepare Headers<br><br>Checksum<br><br>Prepare Packet<br><br>iSCSI/TCP DB Entry transfer<br><br>TCP State update<br><br>iSCSI State update<br><br>Packet transfer<br><br>Queue Packet | Security Association<br><br>Encryption<br><br>Message Digest<br><br>Queue | Assemble<br><br>L2 Headers<br><br>Queue<br><br>Transmit |
| 3415 | 3416 | 3409 | 3410 | 3411 | 3412 | 3413 | 3414 |
| R2T Read Response | | | | Write Data Transfer | | | |

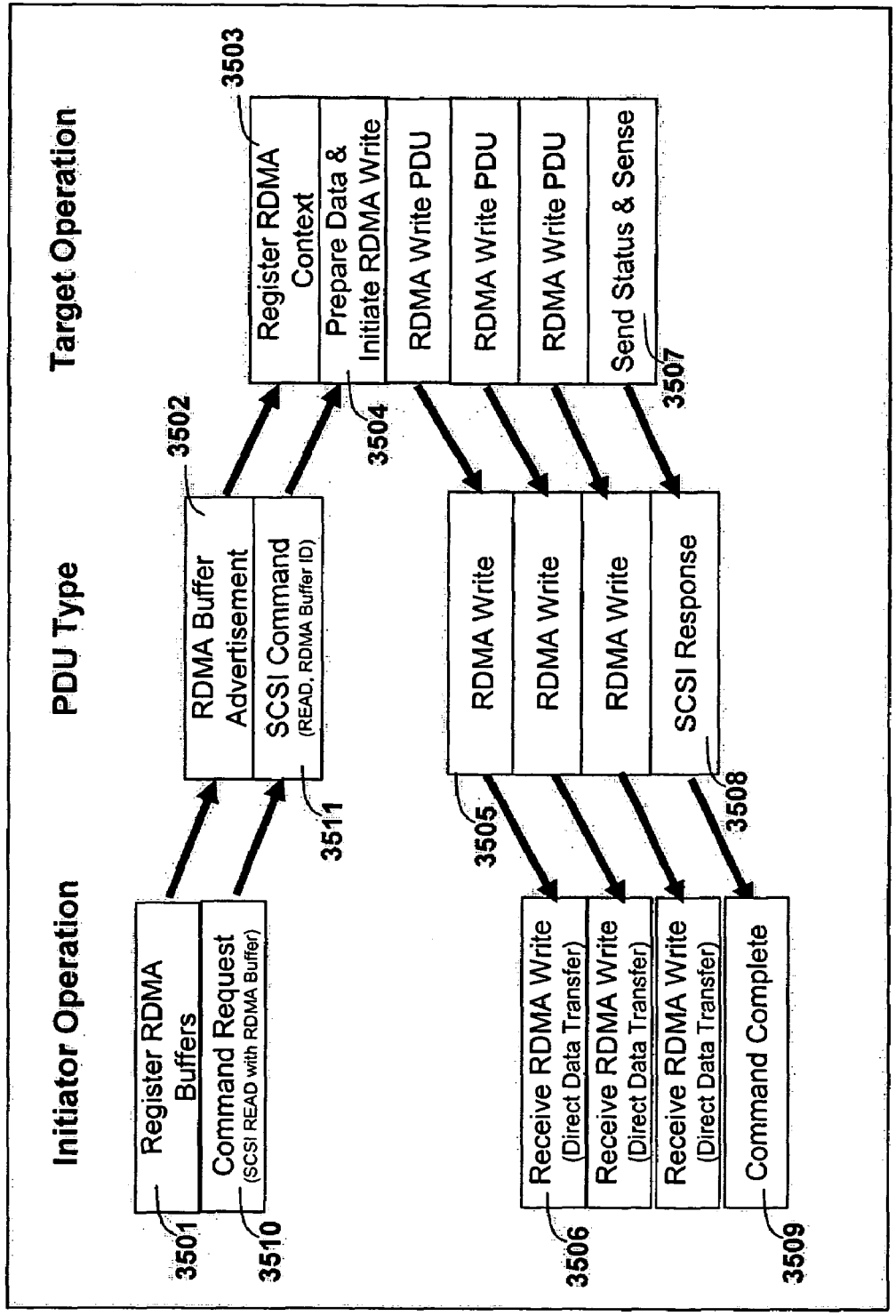
Fig. 35 iSCSI Read using RDMA Write

Fig. 36 Read Data Packet Flow (RDMA)

| 3601 Receiver | 3602 Security | 3603 Classification | 3604 Schedule | 3605 Execution | 3606 DMA |
|---|---|---|---|---|---|
| Detect | Security Association | L3 Fields | Hash | Packet transfer | Priority based Queue |
| Extract Packet | Authenticate | L4 Fields | Dependency | iSCSI/TCP DB Entry transfer | Transfer Data To system Memory |
| L2 Validation | Decryption | Mark TCP | Flow based Resource Allocation | TCP State update | RDMA Operation Completion Signal |
| Queue | Queue | Mark iSCSI | Queue | TCP checksum | iSCSI Operation Completion (if last RDMA) |
| | | Action (reject, Bypass etc.) | | iSCSI/RDMA State update | |
| | | Flow Marking | | RDMA Operation Identification | |
| | | Tag Header | | Extract MDL | |
| | | Tag Payload | | Queue PDU | |
| | | | | Retire Packet | |
| 3607 | 3608 | 3609 | 3610 | 3611 | 3612 |

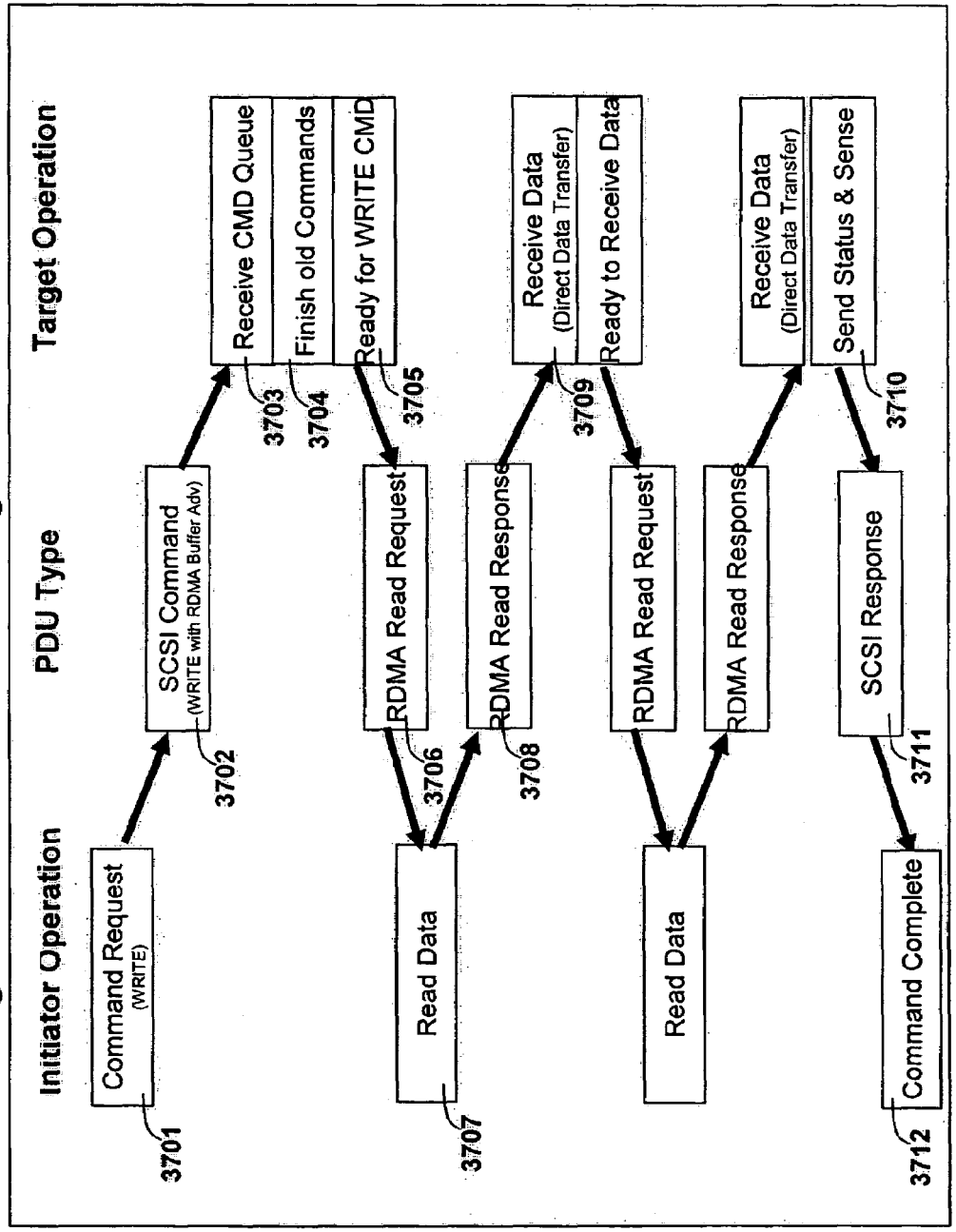
Fig. 37 iSCSI Write using RDMA Read

Fig. 38 Write Data Packet Flow (RDMA)

| 3801 Receive | 3802 Classification | 3803 Schedule | 3804 Execution | 3805 DMA | 3806 Execution | 3807 Security | 3808 Transmit |
|---|---|---|---|---|---|---|---|
| Detect<br><br>Extract Packet<br><br>L2 Validation<br><br>Queue | L3 Fields<br><br>L4 Fields<br><br>Mark TCP<br><br>Mark iSCSI<br><br>Action (reject, Bypass etc.)<br><br>Flow Marking<br><br>Tag Header<br><br>Tag Payload | Hash Key Lookup<br><br>Dependency<br><br>Flow based Resource Allocation<br><br>Queue | Packet transfer<br><br>iSCSI/TCP DB Entry transfer<br><br>TCP checksum<br><br>TCP State update<br><br>iSCSI/RDMA State update<br><br>RDMA Op Identification<br><br>Extract RID Access Check<br><br>Start Write RDMA<br><br>Retire Packet | Priority Queue<br><br>Transfer Data from system Memory | Prepare Headers<br><br>Checksum<br><br>Prepare Packet<br><br>iSCSI/TCP DB Entry transfer<br><br>TCP State update<br><br>iSCSI/RDMA State update<br><br>Packet transfer<br><br>Queue Packet | Security Association<br><br>Encryption<br><br>Message Digest<br><br>Queue | Assemble<br><br>L2 Headers<br><br>Queue<br><br>Transmit |
| 3815 | 3816 | 3809 | 3810 | 3811 | 3812 | 3813 | 3814 |
| RDMA Read Request | | | | RDMA Read Response Packet (Write) | | | |

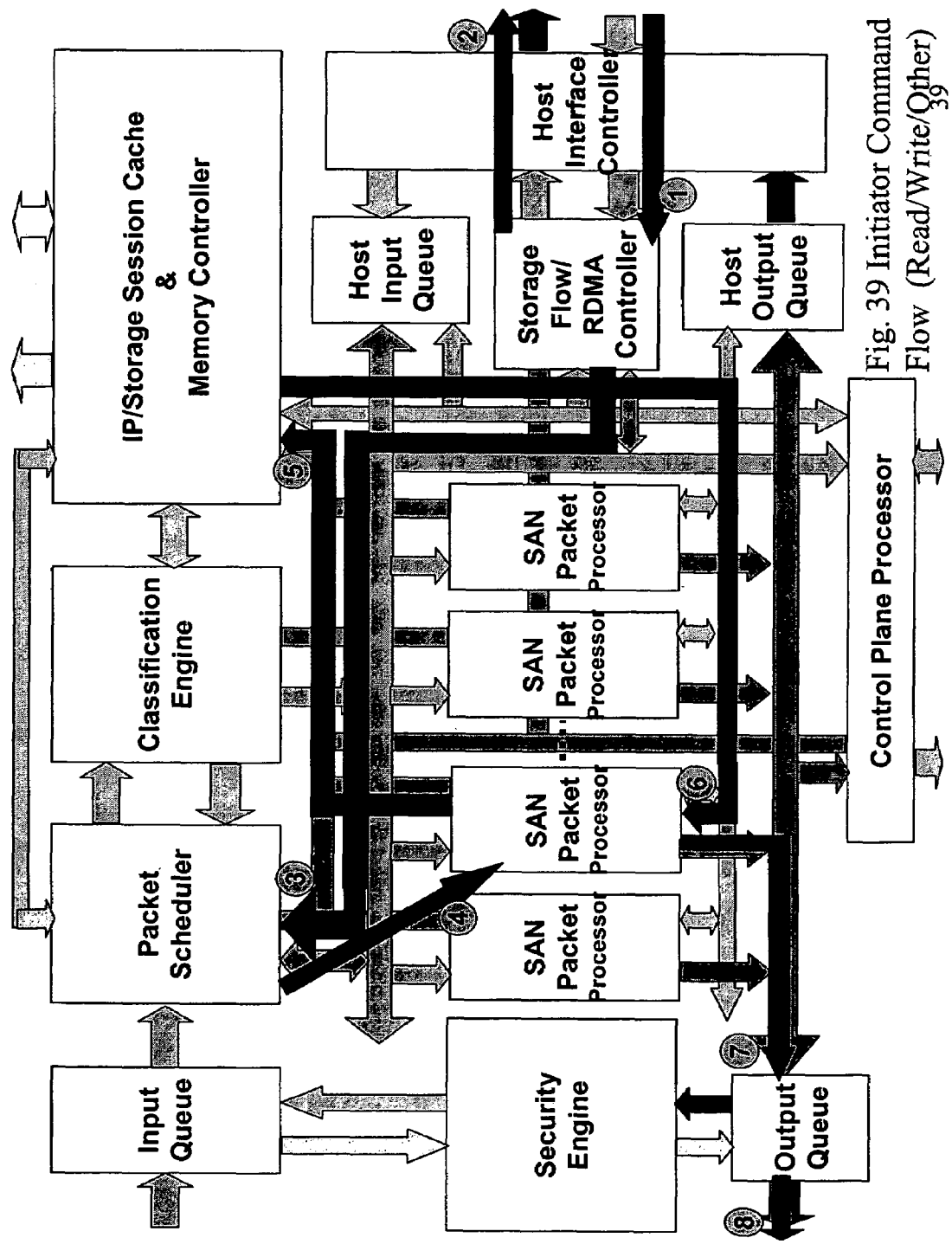
Fig. 39 Initiator Command Flow (Read/Write/Other)

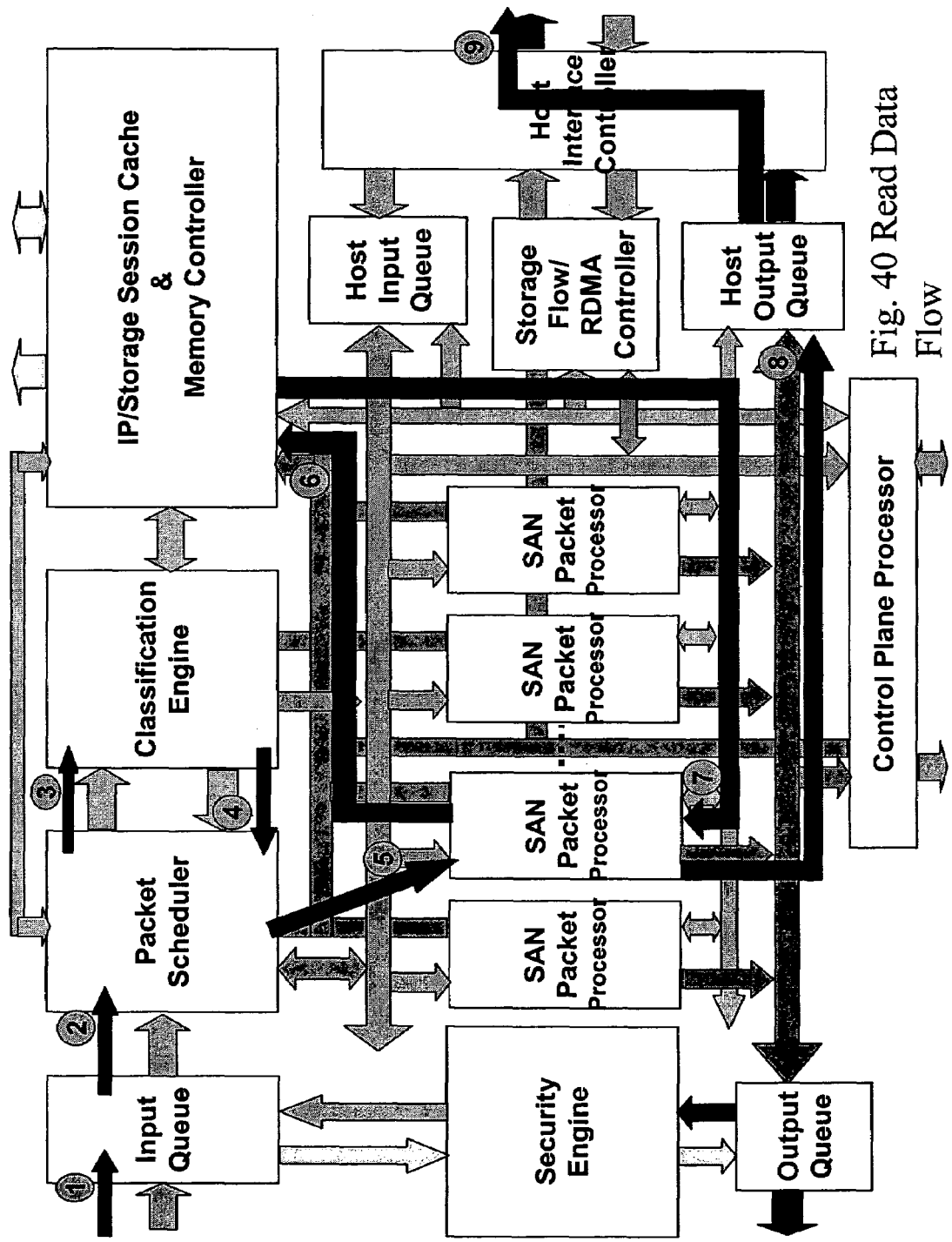
Fig. 40 Read Data Flow

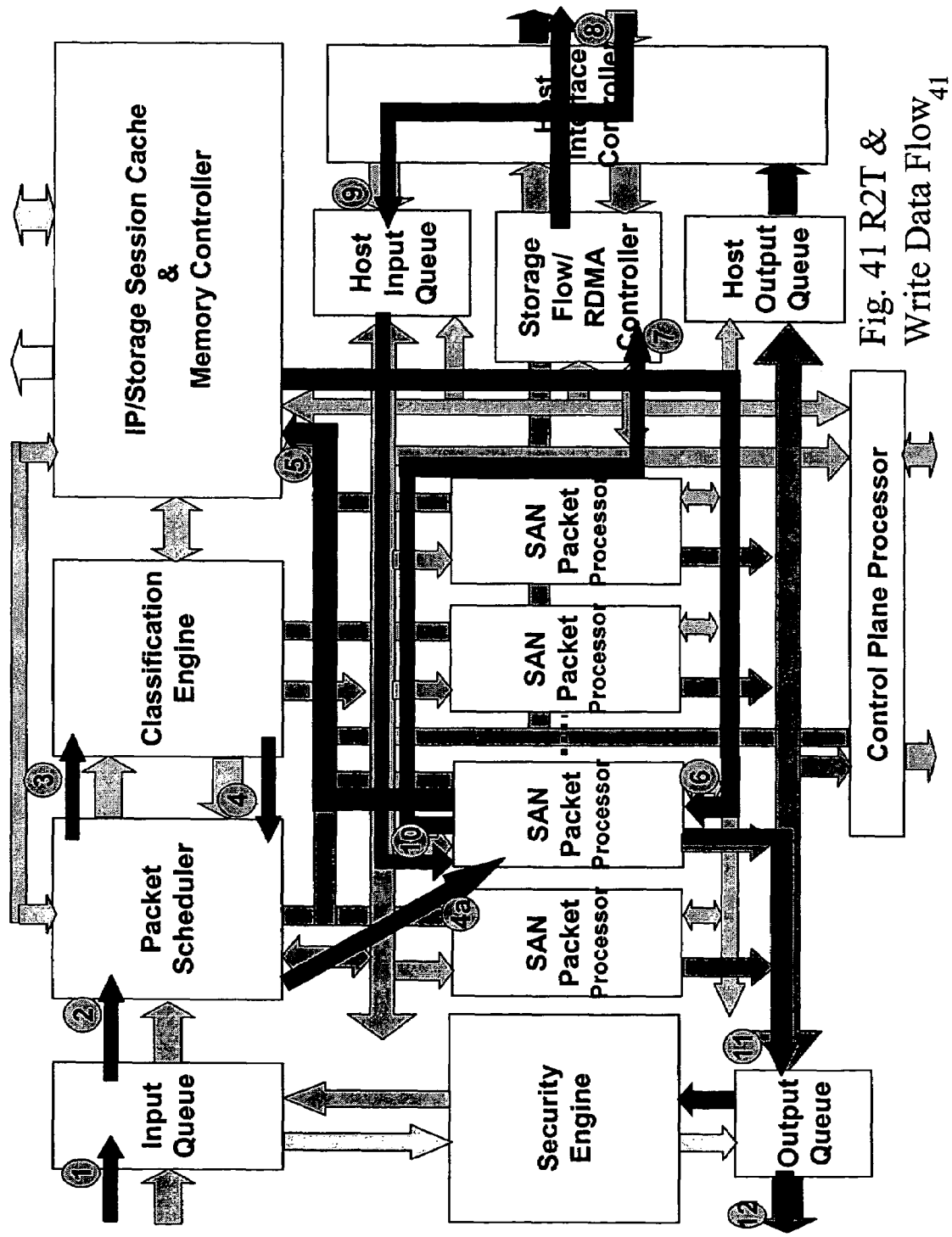
Fig. 41 R2T & Write Data Flow

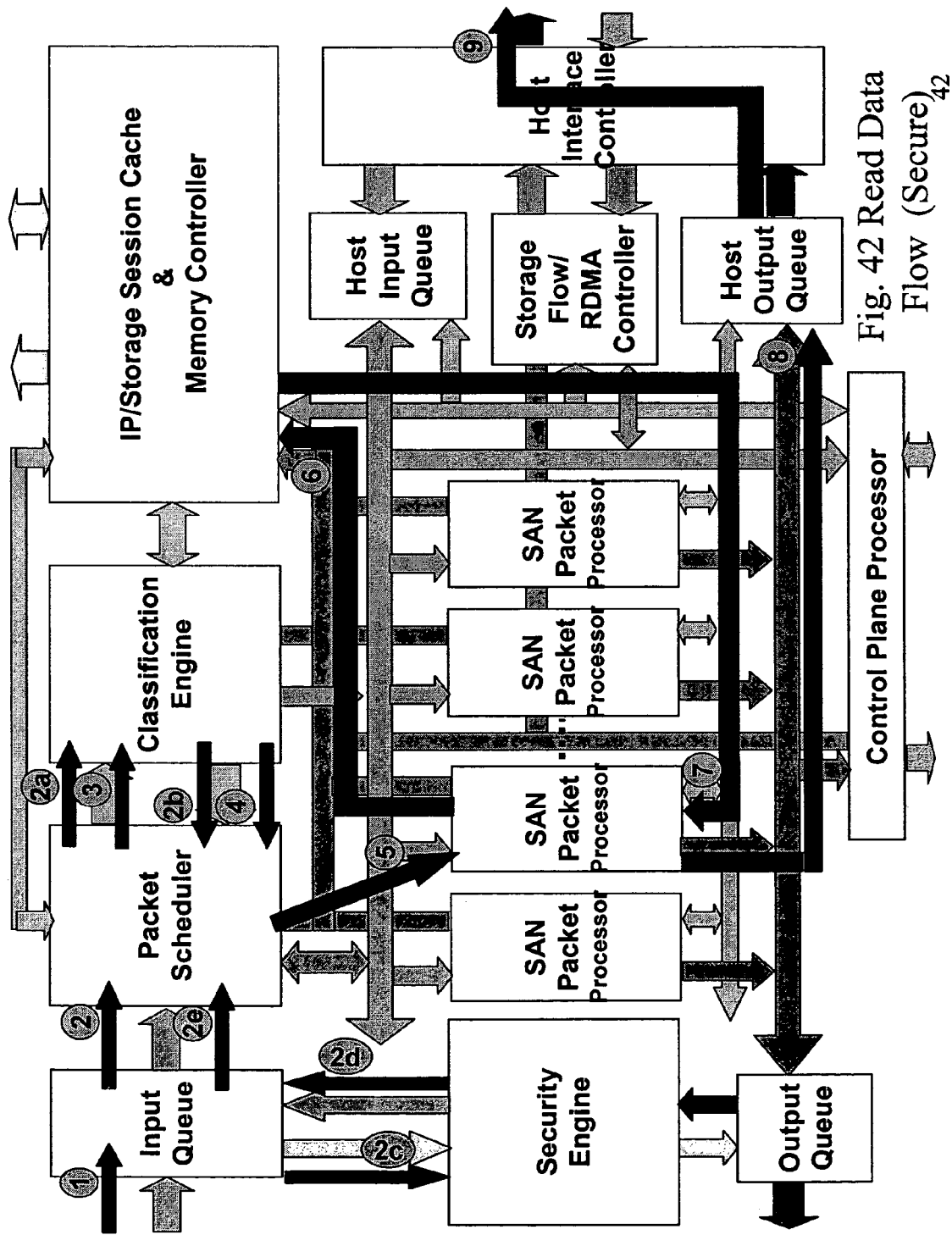
Fig. 42 Read Data Flow (Secure)₄₂

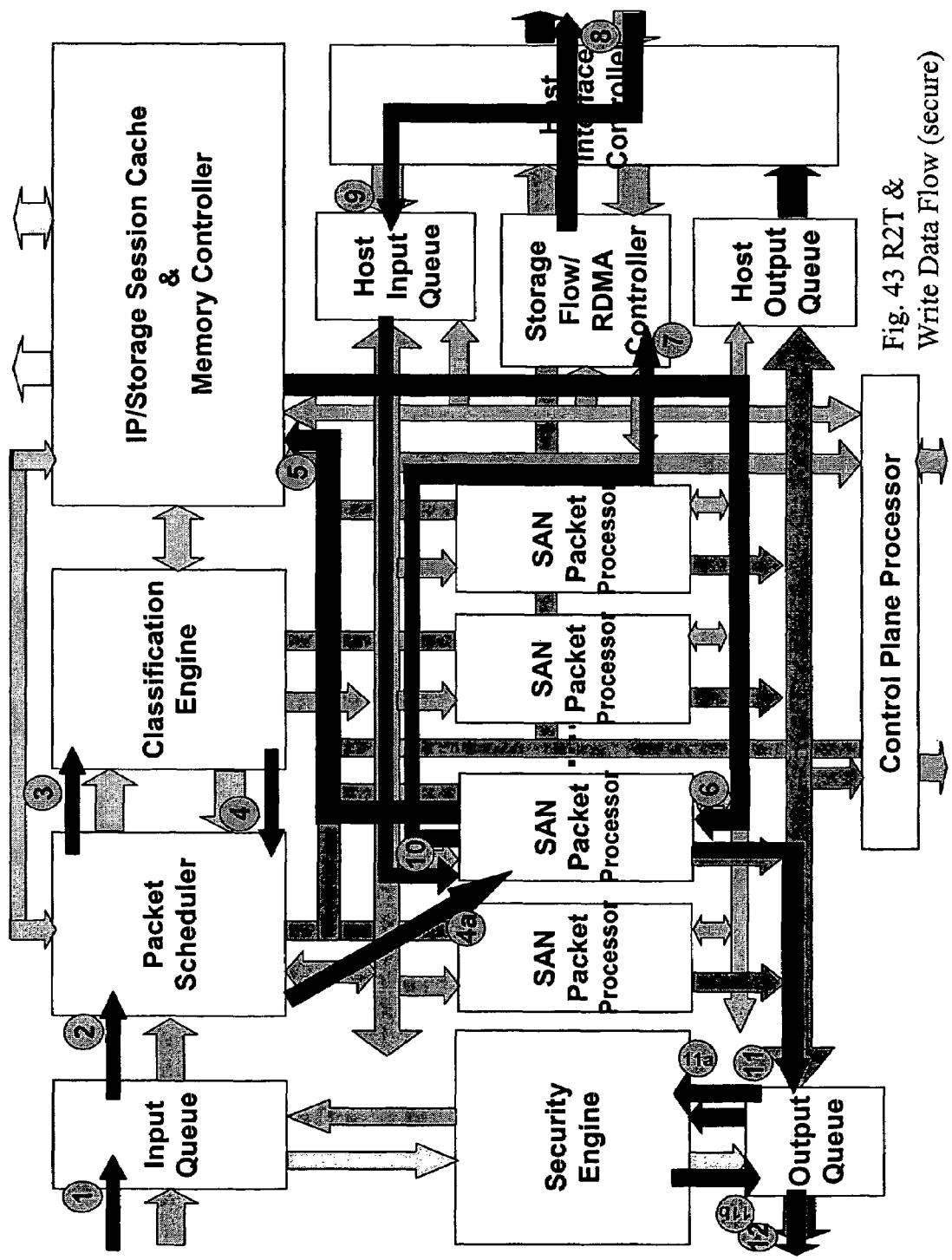

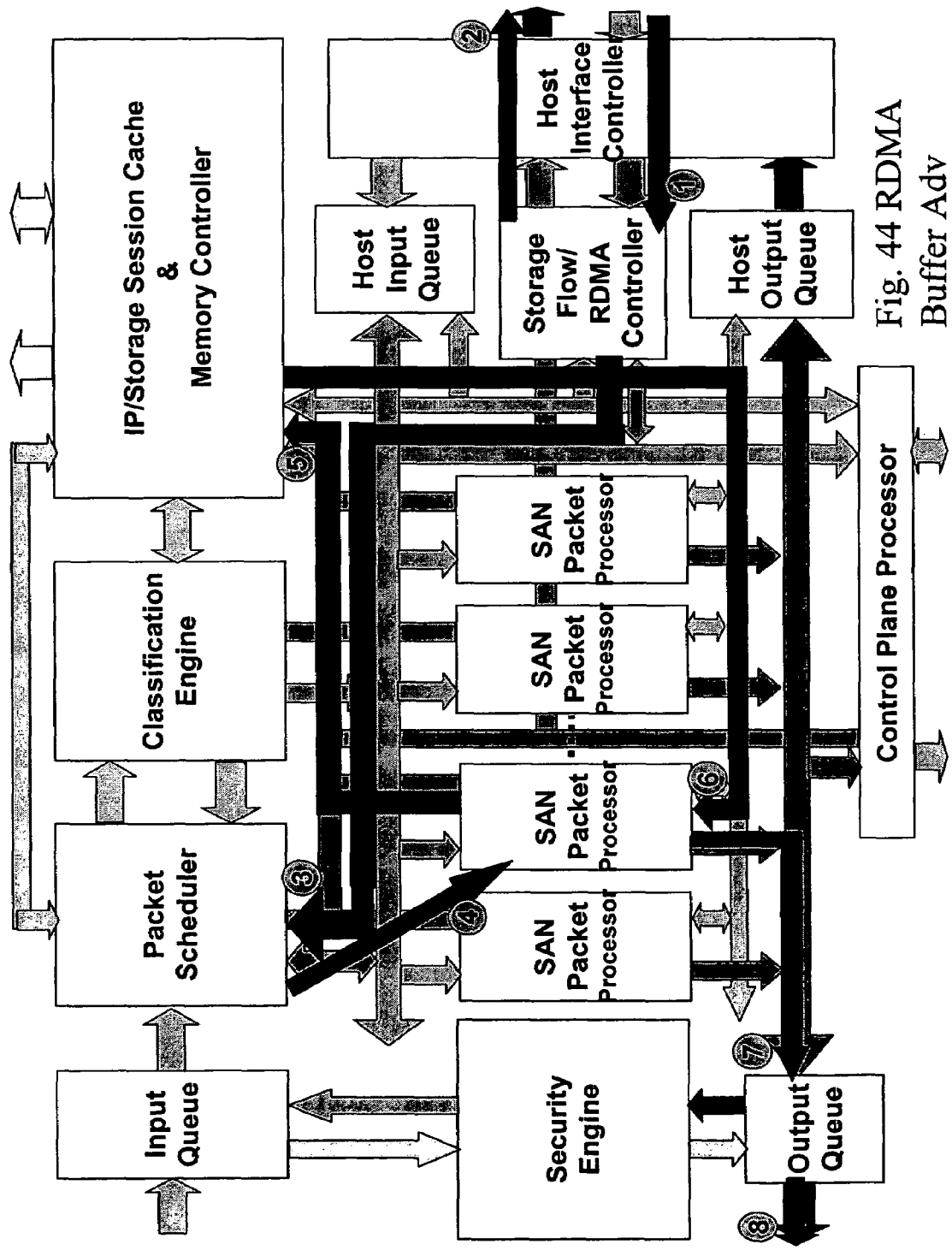
Fig. 44 RDMA Buffer Adv

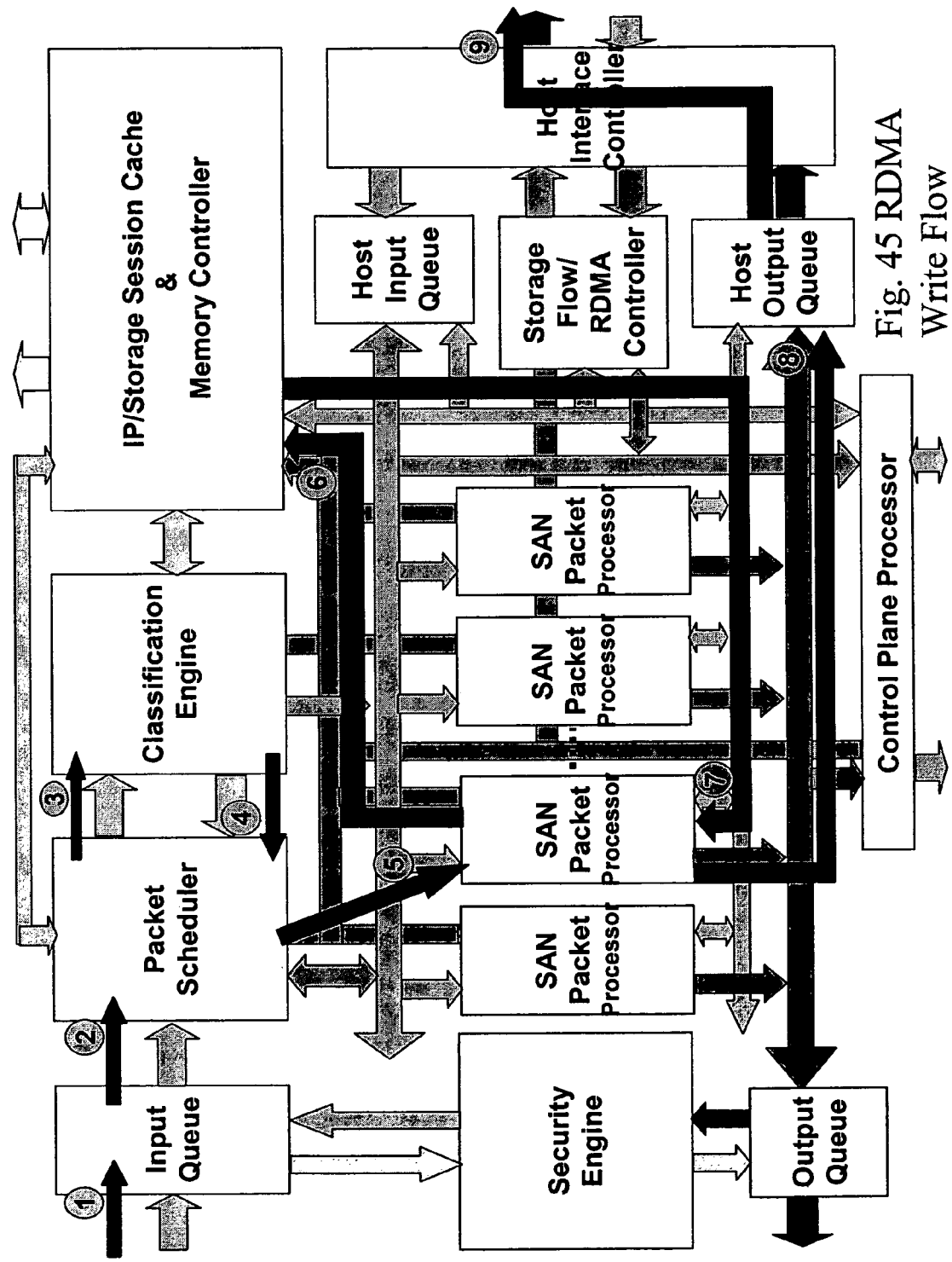
Fig. 45 RDMA Write Flow

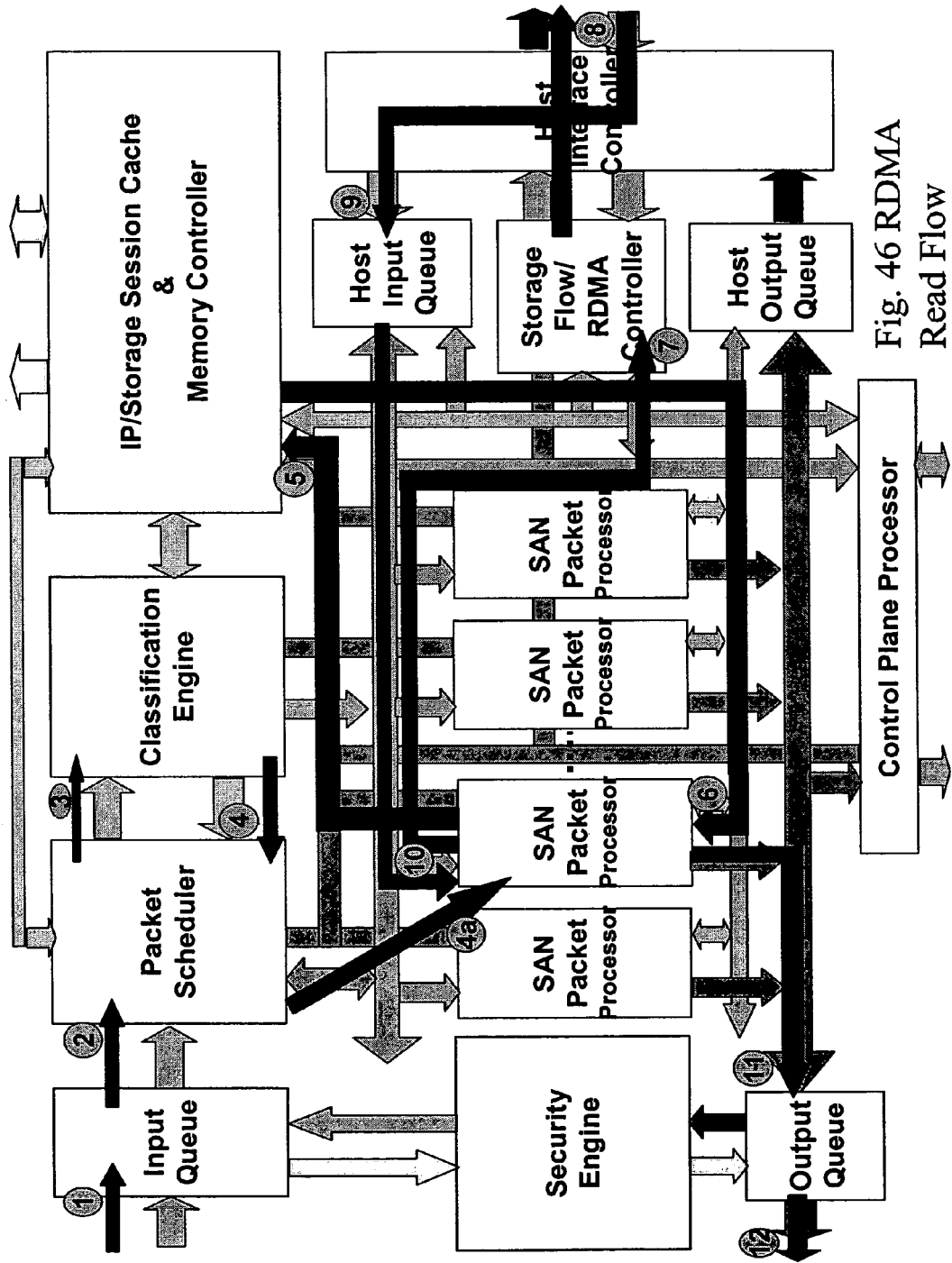
Fig. 46 RDMA Read Flow

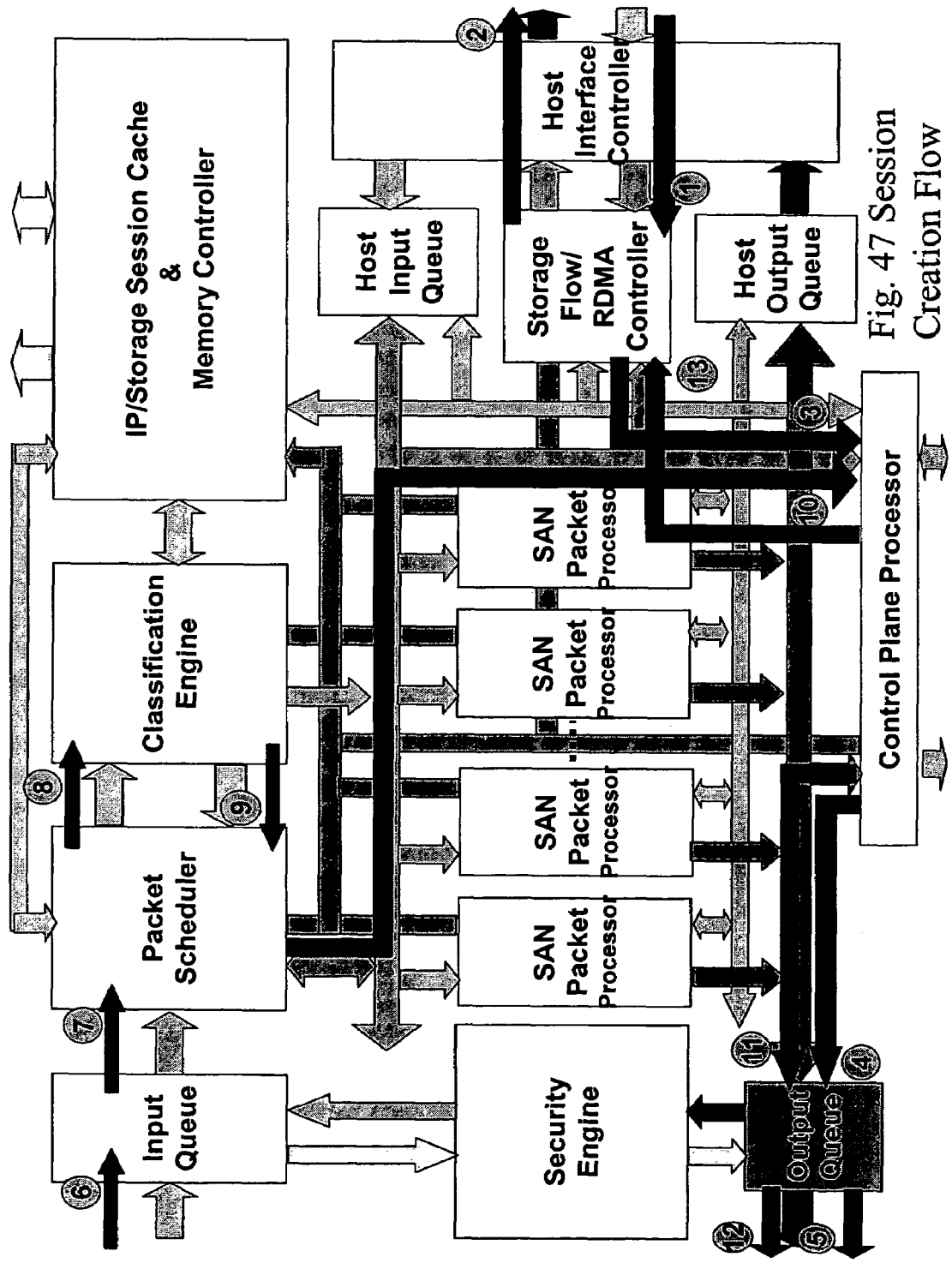

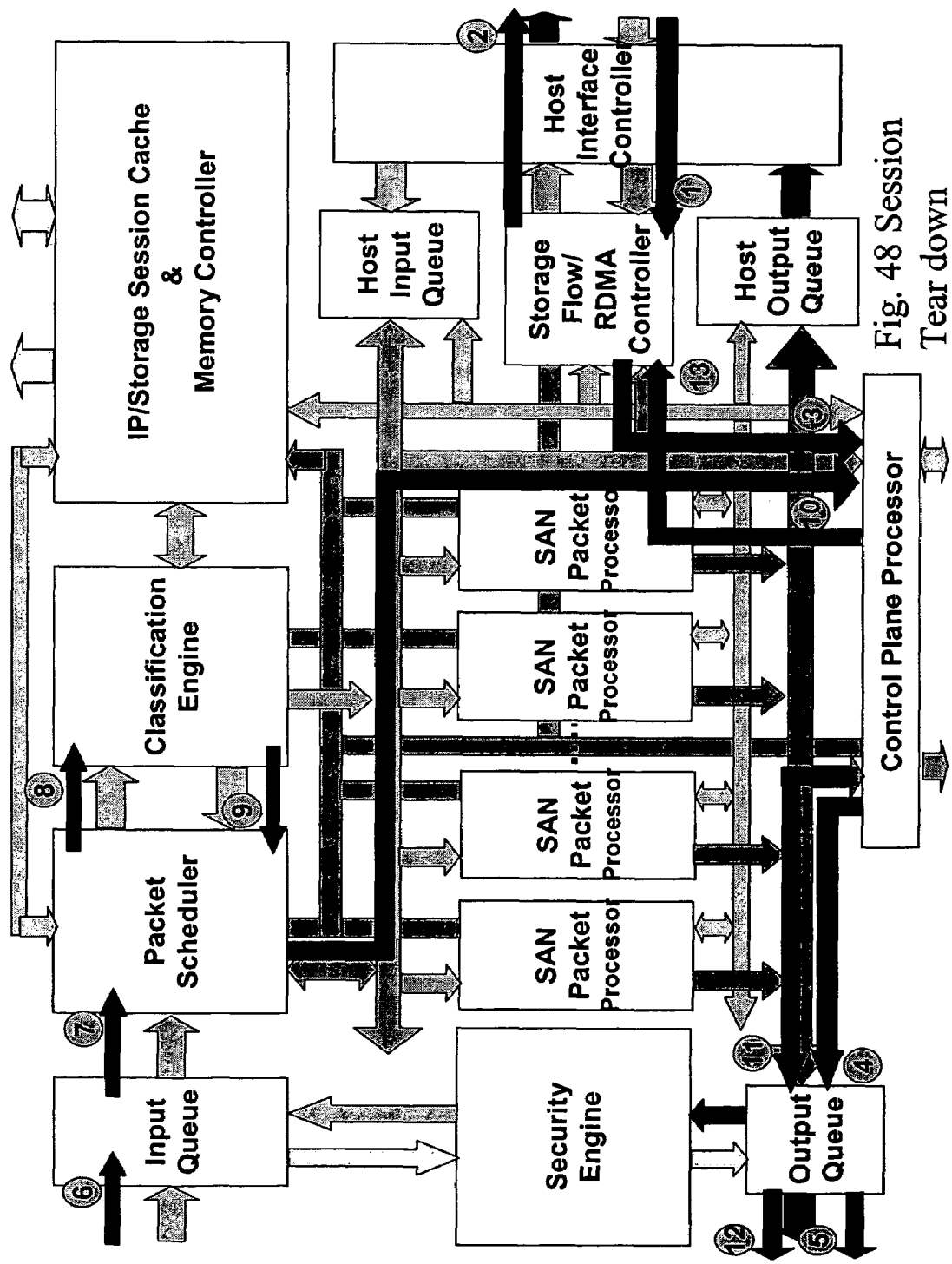
Fig. 48 Session Tear down

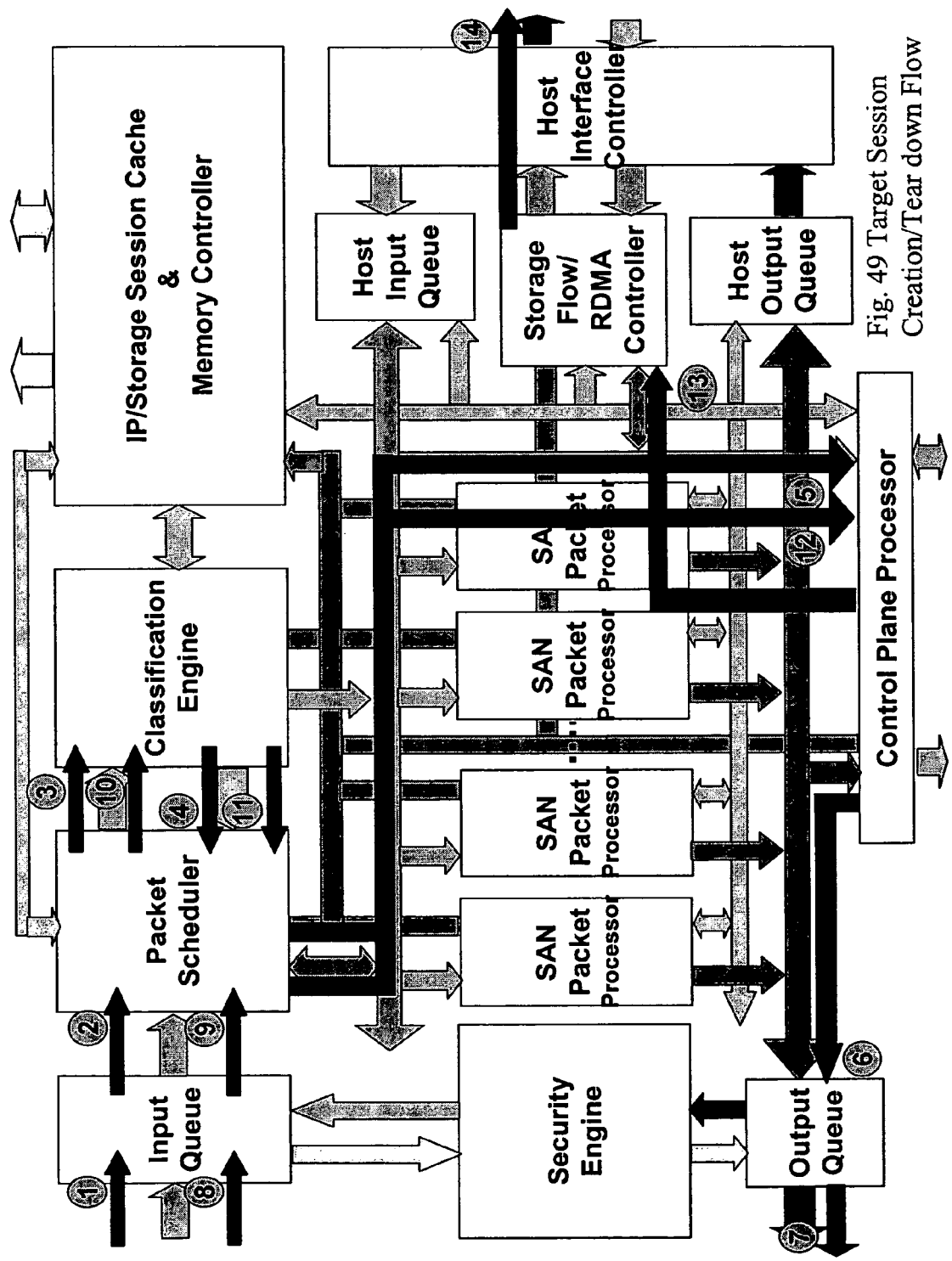
Fig. 49 Target Session Creation/Tear down Flow

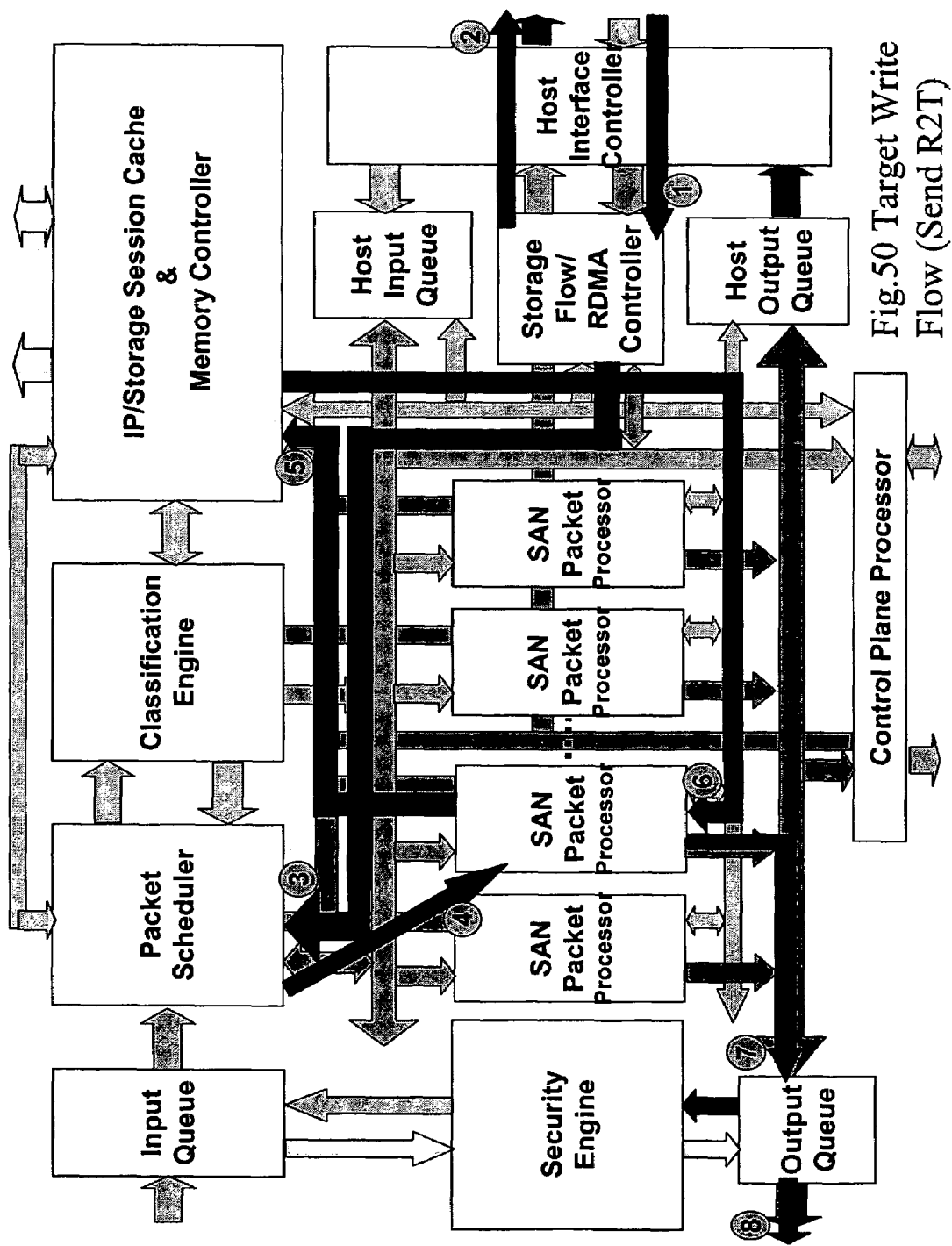
Fig.50 Target Write Flow (Send R2T)

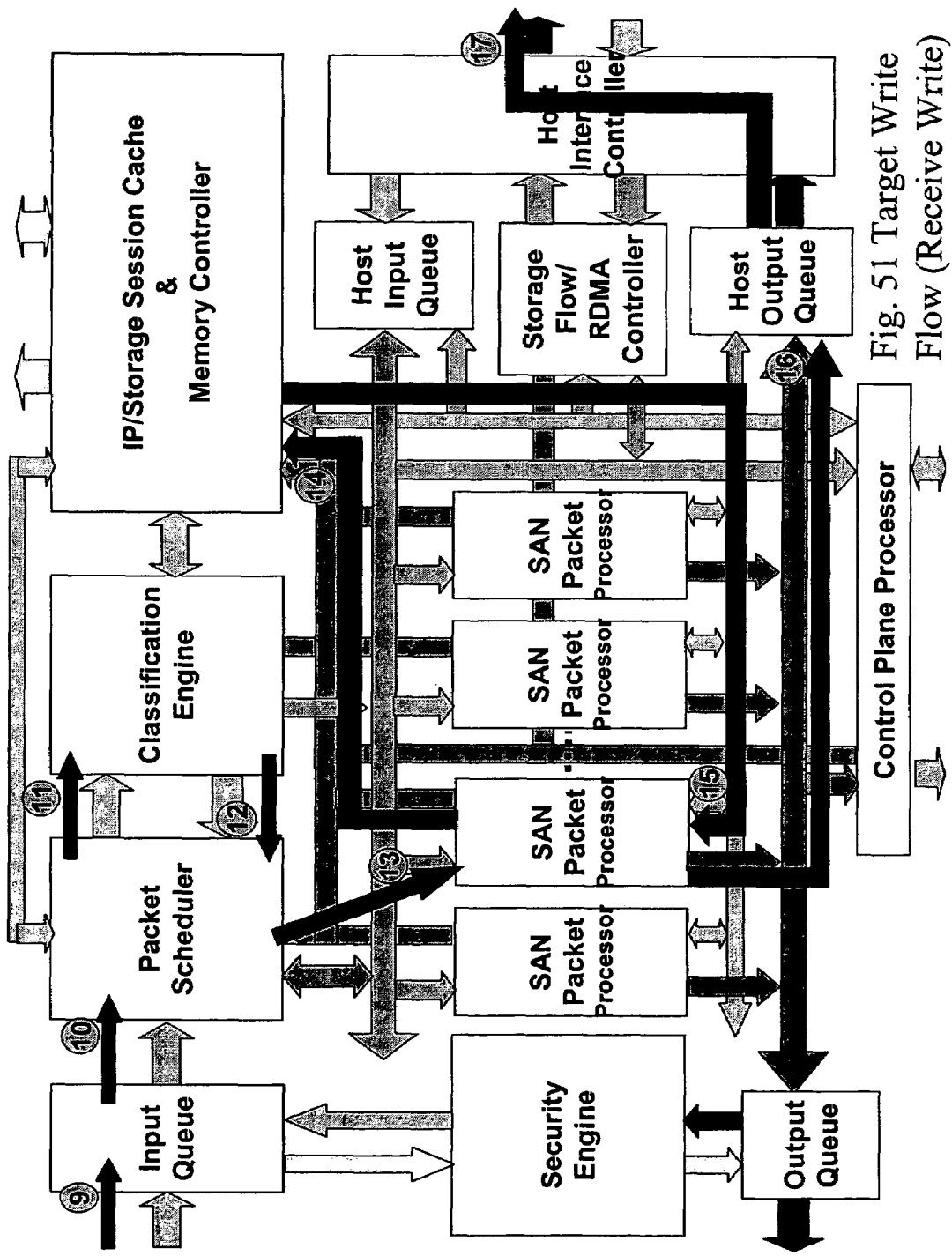
Fig. 51 Target Write Flow (Receive Write)

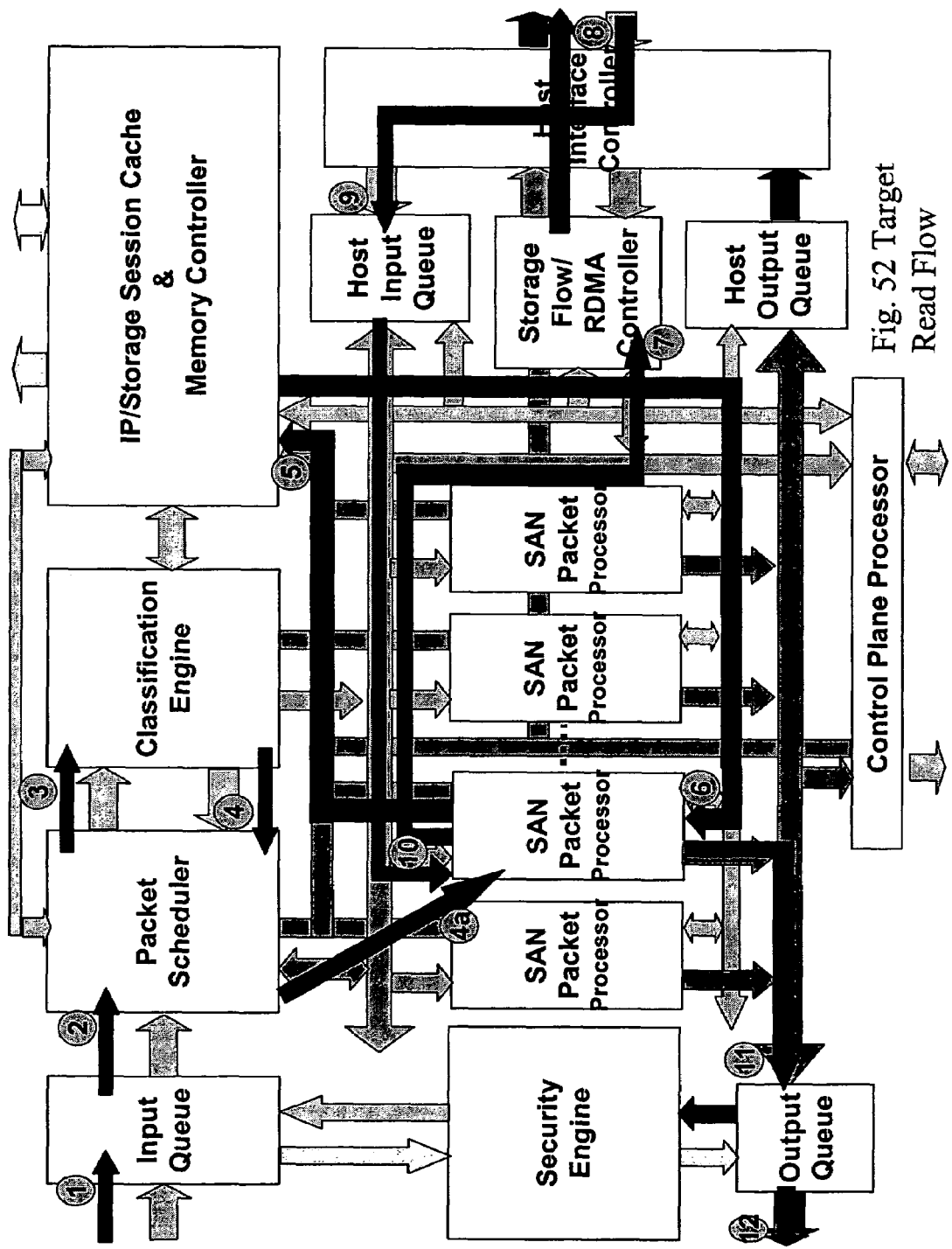
Fig. 52 Target Read Flow

TCP/IP PROCESSOR AND ENGINE USING RDMA

RELATED APPLICATIONS

Priority is claimed to Provisional Application Ser. No. 60/388,407, filed on Jun. 11, 2002, U.S. Patent Application number not yet assigned filed on Jun. 10, 2003 entitled High Performance IP Processor Using RDMA, U.S. Patent Application number not yet assigned filed on Jun. 10, 2003 entitled IP Storage Processor and Engine Therefor Using RDMA, U.S. Patent Application number not yet assigned filed on Jun. 10, 2003 entitled A Memory System For A High Performance IP Processor, U.S. Patent Application number not yet assigned filed on Jun. 10, 2003 entitled Data Processing System Using Internet Protocols and RDMA, U.S. Patent Application number not yet assigned filed on Jun. 10, 2003 entitled High Performance IP Processor, U.S. Patent Application number not yet assigned filed on Jun. 10, 2003 entitled Data Processing System Using Internet Protocols.

BACKGROUND OF THE INVENTION

This invention relates generally to storage networking semiconductors and in particular to a high performance network storage processor that is used to create Internet Protocol (IP) based storage networks.

Internet protocol (IP) is the most prevalent networking protocol deployed across various networks like local area networks (LANs), metro area networks (MANs) and wide area networks (WANs). Storage area networks (SANs) are predominantly based on Fibre Channel (FC) technology. There is a need to create IP based storage networks.

When transporting block storage traffic on IP designed to transport data streams, the data streams are transported using Transmission Control Protocol (TCP) that is layered to run on top of IP. TCP/IP is a reliable connection/session oriented protocol implemented in software within the operating systems. TCP/IP software stack is very slow to handle the high line rates that will be deployed in future. Currently, a 1 GHz processor based server running TCP/IP stack, with a 1 Gbps network connection, would use 50-70% or more of the processor cycles, leaving minimal cycles available for the processor to allocate to the applications that run on the server. This overhead is not tolerable when transporting storage data over TCP/IP as well as for high performance IP networks. Hence, new hardware solutions would accelerate the TCP/IP stack to carry storage and network data traffic and be competitive to FC based solutions. In addition to the TCP protocol, other protocols such as SCTP and UDP protocols can be used, as well as other protocols appropriate for transporting data streams.

SUMMARY OF THE INVENTION

I describe a high performance hardware processor that sharply reduces the TCP/IP protocol stack overhead from host processor and enables a high line rate storage and data transport solution based on IP.

Traditionally, TCP/IP networking stack is implemented inside the operating system kernel as a software stack. The software TCP/IP stack implementation consumes, as mentioned above, more than 50% of the processing cycles available in a 1 GHz processor when serving a 1 Gbps network. The overhead comes from various aspects of the software TCP/IP stack including checksum calculation, memory buffer copy, processor interrupts on packet arrival, session establishment, session tear down and other reliable transport services. The software stack overhead becomes prohibitive at higher lines rates. Similar issues occur in networks with lower line rates, like wireless networks, that use lower performance host processors. A hardware implementation can remove the overhead from the host processor.

The software TCP/IP networking stack provided by the operating systems uses up a majority of the host processor cycles. TCP/IP is a reliable transport that can be run on unreliable data links. Hence, when a network packet is dropped or has errors, TCP does the retransmission of the packets. The errors in packets are detected using checksum that is carried within the packet. The recipient of a TCP packet performs the checksum of the received packet and compares that to the received checksum. This is an expensive compute intensive operation performed on each packet involving each received byte in the packet. The packets between a source and destination may arrive out of order and the TCP layer performs ordering of the data stream before presenting it to the upper layers. IP packets may also be fragmented based on the maximum transfer unit (MTU) of the link layer and hence the recipient is expected to defragment the packets. These functions result in temporarily storing the out of order packets, fragmented packets or unacknowledged packets in memory on the network card for example. When the line rates increase to above 1 Gbps, the memory size overhead and memory speed bottleneck resulting from these add significant cost to the network cards and also cause huge performance overhead. Another function that consumes a lot of processor resources is the copying of the data to/from the network card buffers, kernel buffers and the application buffers.

Microprocessors are increasingly achieving their high performance and speed using deep pipelining and super scalar architectures. Interrupting these processors on arrival of small packets will cause severe performance degradation due to context switching overhead, pipeline flushes and refilling of the pipelines. Hence interrupting the processors should be minimized to the most essential interrupts only. When the block storage traffic is transported over TCP/IP networks, these performance issues become critical, severely impacting the throughput and the latency of the storage traffic. Hence the processor intervention in the entire process of transporting storage traffic needs to be minimized for IP based storage solutions to have comparable performance and latency as other specialized network architectures like fibre channel, which are specified with a view to a hardware implementation. Emerging IP based storage standards like iSCSI, FCIP, iFCP, and others (like NFS, CIFS, DAFS, HTTP, XML, XML derivatives (such as Voice XML, EBXML, Microsoft SOAP and others), SGML, and HTML formats) encapsulate the storage and data traffic in TCP/IP segments. However, there usually isn't alignment relationship between the TCP segments and the protocol data units that are encapsulated by TCP packets. This becomes an issue when the packets arrive out of order, which is a very frequent event in today's networks. The storage and data blocks cannot be extracted from the out of order packets for use until the intermediate packets in the stream arrive which will cause the network adapters to store these packets in the memory, retrieve them and order them when the intermediate packets arrive. This can be expensive from the size of the memory storage required and also the performance that the memory subsystem is expected to support, particularly at line rates above 1 Gbps. This overhead can be removed if each TCP segment can uniquely identify the protocol data unit and its sequence. This can allow the packets to be directly transferred to their end memory location in the host system. Host processor intervention should also be minimized in the transfer of large blocks of data that may be transferred to the storage subsystems or being shared with other processors in a clustering environment or other client server environment. The processor should be interrupted only on storage command boundaries to minimize the impact.

The IP processor set forth herein eliminates or sharply reduces the effect of various issues outlined above through innovative architectural features and the design. The described processor architecture provides features to terminate the TCP traffic carrying the storage and data payload thereby eliminating or sharply reducing the TCP/IP networking stack overhead on the host processor, resulting in packet streaming architecture that allows packets to pass through from input to output with minimal latency. To enable high line rate storage or data traffic being carried over IP requires maintaining the transmission control block information for various connections (sessions) that are traditionally maintained by host kernel or driver software. As used in this patent, the term "IP session" means a session for a session oriented protocol that runs on IP. Examples are TCP/IP, SCTP/IP, and the like. Accessing session information for each packet adds significant processing overhead. The described architecture creates a high performance memory subsystem that significantly reduces this overhead. The architecture of the processor provides capabilities for intelligent flow control that minimizes interrupts to the host processor primarily at the command or data transfer completion boundary.

Today, no TCP/IP processor is offered with security.

The described processor architecture also provides integrated security features. When the storage traffic is carried on a network from the server to the storage arrays in a SAN or other storage system, it is exposed to various security vulnerabilities that a direct attached storage system does not have to deal with. This processor allows for in stream encryption and decryption of the storage traffic thereby allowing high line rates and at the same time offering confidentiality of the storage data traffic.

Classification of network traffic is another task that consumes up to half of the processing cycles available on packet processors leaving few cycles for deep packet inspection and processing. IP based storage traffic by the nature of the protocol requires high speed low latency deep packet processing. The described IP processor significantly reduces the classification overhead by providing a programmable classification engine.

Tremendous growth in the storage capacity and storage networks have created storage area management as a major cost item for IT departments. Policy based storage management is required to contain management costs. The described programmable classification engine allows deployment of storage policies that can be enforced on packet, transaction, flow and command boundaries. This will have significant improvement in storage area management costs.

The programmable IP processor architecture also offers enough headroom to allow customer specific applications to be deployed. These applications may belong to multiple categories e.g. network management, storage firewall or other security capabilities, bandwidth management, quality of service, virtualization, performance monitoring, zoning, LUN masking and the like.

BRIEF DESCRIPTION OF THE DRAWINGS

FIG. 1 illustrates a layered SCSI architecture and interaction between respective layers located between initiator and target systems.

FIG. 2 illustrates the layered SCSI architecture with iSCSI and TCP/IP based transport between initiator and target systems.

FIG. 3 illustrates an OSI stack comparison of software based TCP/IP stack with hardware oriented protocols like Fibre channel.

FIG. 4 illustrates an OSI stack with a hardware based TCP/IP implementation for providing performance parity with the other non-IP hardware oriented protocols.

FIG. 5 illustrates a host software stack illustrating operating system layers implementing networking and storage stacks.

FIG. 6 illustrates software TCP stack data transfers.

FIG. 7 illustrates remote direct memory access data transfers using TCP/IP offload from the host processor as described in this patent.

FIG. 8 illustrates host software SCSI storage stack layers for transporting block storage data over IP networks.

FIG. 9 illustrates certain iSCSI storage network layer stack details of an embodiment of the invention.

FIG. 10 illustrates TCP/IP network stack functional details of an embodiment of the invention.

FIG. 11 illustrates an iSCSI storage data flow through various elements of an embodiment of the invention.

FIG. 12 illustrates iSCSI storage data structures useful in the invention.

FIG. 13 illustrates a TCP/IP Transmission Control Block data structure for a session database entry useful in an embodiment of the invention.

FIG. 14 illustrates an iSCSI session database structure useful in an embodiment of the invention.

FIG. 15 illustrates iSCSI session memory structure useful in an embodiment of the invention.

FIG. 16 illustrates a high-level architectural block diagram of an IP network application processor useful in an embodiment of the invention.

FIG. 17 illustrates a detailed view of the architectural block diagram of the IP network application processor of FIG. 16.

FIG. 18 illustrates an input queue and controller for one embodiment of the IP processor.

FIG. 19 illustrates a packet scheduler, sequencer and load balancer useful in one embodiment of the IP processor.

FIG. 20 illustrates a packet classification engine, including a policy engine block of one embodiment of the IP storage processor.

FIG. 21 broadly illustrates an embodiment of the SAN packet processor block of one embodiment of an IP processor at a high-level.

FIG. 22 illustrates an embodiment of the SAN packet processor block of the described IP processor in further detail.

FIG. 23 illustrates an embodiment of the programmable TCP/IP processor engine which can be used as part of the described SAN packet processor.

FIG. 24 illustrates an embodiment of the programmable IP Storage processor engine which can be used as part of the described SAN packet processor.

FIG. 25 illustrates an embodiment of an output queue block of the programmable IP processor of FIG. 17.

FIG. 26 illustrates an embodiment of the storage flow controller and RDMA controller.

FIG. 27 illustrates an embodiment of the host interface controller block of the IP processor useful in an embodiment of the invention.

FIG. 28 illustrates an embodiment of the security engine.

FIG. 29 illustrates an embodiment of a memory and controller useful in the described processor.

FIG. 30 illustrates a data structure useable in an embodiment of the described classification engine.

FIG. 31 illustrates a storage read flow between initiator and target.

FIG. 32 illustrates a read data packet flow through pipeline stages of the described processor.

FIG. 33 illustrates a storage write operation flow between initiator and target.

FIG. 34 illustrates a write data packet flow through pipeline stages of the described processor.

FIG. 35 illustrates a storage read flow between initiator and target using the remote DMA (RDMA) capability between initiator and target.

FIG. 36 illustrates a read data packet flow between initiator and target using RDMA through pipeline stages of the described processor.

FIG. 37 illustrates a storage write flow between initiator and target using RDMA capability.

FIG. 38 illustrates a write data packet flow using RDMA through pipeline stages of the described processor.

FIG. 39 illustrates an initiator command flow in more detail through pipeline stages of the described processor.

FIG. 40 illustrates a read packet data flow through pipeline stages of the described processor in more detail.

FIG. 41 illustrates a write data flow through pipeline stages of the described processor in more detail.

FIG. 42 illustrates a read data packet flow when the packet is in cipher text or is otherwise a secure packet through pipeline stages of the described processor.

FIG. 43 illustrates a write data packet flow when the packet is in cipher text or is otherwise a secure packet through pipeline stages of the described processor of one embodiment of the invention.

FIG. 44 illustrates a RDMA buffer advertisement flow through pipeline stages of the described processor.

FIG. 45 illustrates a RDMA write flow through pipeline stages of the described processor in more detail.

FIG. 46 illustrates a RDMA Read data flow through pipeline stages of the described processor in more detail.

FIG. 47 illustrates steps of a session creation flow through pipeline stages of the described processor.

FIG. 48 illustrates steps of a session tear down flow through pipeline stages of the described processor.

FIG. 49 illustrates a session creation and session teardown steps from a target perspective through pipeline stages of the described processor.

FIG. 50 illustrates an R2T command flow in a target subsystem through pipeline stages of the described processor.

FIG. 51 illustrates a write data flow in a target subsystem through pipeline stages of the described processor.

FIG. 52 illustrates a target read data flow through the pipeline stages of the described processor.

DESCRIPTION

I provide a new high performance and low latency way of implementing a TCP/IP stack in hardware to relieve the host processor of the severe performance impact of a software TCP/IP stack. This hardware TCP/IP stack is then interfaced with additional processing elements to enable high performance and low latency IP based storage applications.

This can be implemented in a variety of forms to provide benefits of TCP/IP termination, high performance and low latency IP storage capabilities, remote DMA (RDMA) capabilities, security capabilities, programmable classification and policy processing features and the like. Following are some of the embodiments that can implement this:

Server

The described architecture may be embodied in a high performance server environment providing hardware based TCP/IP functions that relieve the host server processor or processors of TCP/IP software and performance overhead. The IP processor may be a companion processor to a server chipset, providing the high performance networking interface with hardware TCP/IP. Servers can be in various form factors like blade servers, appliance servers, file servers, thin servers, clustered servers, database server, game server, grid computing server, VOIP server, wireless gateway server, security server, network attached storage server or traditional servers. The current embodiment would allow creation of a high performance network interface on the server motherboard.

Companion Processor to a Server Chipset

The server environment may also leverage the high performance IP storage processing capability of the described processor, besides high performance TCP/IP and/or RDMA capabilities. In such an embodiment the processor may be a companion processor to a server chipset providing high performance network storage I/O capability besides the TCP/IP offloading from the server processor. This embodiment would allow creation of high performance IP based network storage I/O on the motherboard. In other words it would enable IP SAN on the motherboard.

Storage System Chipsets

The processor may also be used as a companion of a chipset in a storage system, which may be a storage array (or some other appropriate storage system or subsystem) controller, which performs the storage data server functionality in a storage networking environment. The processor would provide IP network storage capability to the storage array controller to network in an IP based SAN. The configuration may be similar to that in a server environment, with additional capabilities in the system to access the storage arrays and provide other storage-centric functionality.

Server/Storage Host Adapter Card

The IP processor may also be embedded in a server host adapter card providing high speed TCP/IP networking. The same adapter card may also be able to offer high speed network storage capability for IP based storage networks. The adapter card may be used in traditional servers and may also be used as blades in a blade server configuration. The processor may also be used in adapters in a storage array (or other storage system or subsystem) front end providing IP based storage networking capabilities.

Processor Chipset Component

The TCP/IP processor may be embodied inside a processor chipset, providing the TCP/IP offloading capability. Such a configuration may be used in the high end servers, workstations or high performance personal computers that interface with high speed networks. Such an embodiment could also include IP storage or RDMA capabilities or combination of this invention to provide IP based storage networking and/or TCP/IP with RDMA capability embedded in the chipset. The usage of multiple capabilities of the described architecture can be made independent of using other capabilities in this or other embodiments, as a trade-off of feature requirements, development timeline and cost, silicon die cost and the like.

Storage or SAN System or Subsystem Switching Line Cards

The IP processor may also be used to create high performance, low latency IP SAN switching system (or other storage system or subsystem) line cards. The processor may be used as the main processor terminating and originating IP-based storage traffic to/from the line card. This processor would work with the switching system fabric controller, which may act like a host, to transport the terminated storage traffic, based on their IP destination, to the appropriate switch line card as determined by the forwarding information base present in the switch system. Such a switching system may support purely IP based networking or may support multi-protocol support, allow interfacing with IP based SAN along with other data center SAN fabrics like Fibre channel. A very similar configuration could exist inside a gateway controller system, that terminates IP storage traffic from LAN or WAN and originates new sessions to carry the storage traffic into a SAN, which may be IP based SAN or more likely a SAN built from other fabrics inside a data center like Fibre channel. The processor could also be embodied in a SAN gateway controller.

Storage Appliance

Storage networks management costs are increasing rapidly. The ability to manage the significant growth in the networks and the storage capacity would require creating special appliances which would be providing the storage area management functionality. The described management appliances for high performance IP based SAN, would implement my high performance IP processor, to be able to perform its functions on the storage traffic transported inside TCP/IP packets. These systems would require a high performance processor to do deep packet inspection and extract the storage payload in the IP traffic to provide policy based management and enforcement functions. The security, programmable classification and policy engines along with the high speed TCP/IP and IP storage engines described would enable these appliances and other embodiments described in this patent to perform deep packet inspection and classification and apply the policies that are necessary on a packet by packet basis at high line rates at low latency. Further these capabilities can enable creating storage management appliances that can perform their functions like virtualization, policy based management, security enforcement, access control, intrusion detection, bandwidth management, traffic shaping, quality of service, anti-spam, virus detection, encryption, decryption, LUN masking, zoning, link aggregation and the like in-band to the storage area network traffic. Similar policy based management, and security operations or functionality may also be supported inside the other embodiments described in this patent.

Clustered Environments

Server systems are used in a clustered environment to increase the system performance and scalability for applications like clustered data bases and the like. The applications running on high performance cluster servers require ability to share data at high speeds for inter-process communication. Transporting this inter-process communication traffic on a traditional software TCP/IP network between cluster processors suffers from severe performance overhead. Hence, specialized fabrics like Fibre channel have been used in such configurations. However, a TCP/IP based fabric which can allow direct memory access between the communicating processes' memory, can be used by applications that operate on any TCP/IP network without being changed to specialized fabrics like fibre channel. The described IP processor with its high performance TCP/IP processing capability and the RDMA features, can be embodied in a cluster server environment to provide the benefits of high performance and low latency direct memory to memory data transfers. This embodiment may also be used to create global clustering and can also be used to enable data transfers in grid computers and grid networks.

Additional Embodiments

The processor architecture can be partially implemented in software and partially in hardware. The performance needs and cost implications can drive trade-offs for hardware and software partitioning of the overall system architecture of this invention. It is also possible to implement this architecture as a combination of chip sets along with the hardware and software partitioning or independent of the partitioning. For example the security processor and the classification engines could be on separate chips and provide similar functions. This can result in lower silicon cost of the IP processor including the development and manufacturing cost, but it may in some instances increase the part count in the system and may increase the footprint and the total solution cost. Security and classification engines could be separate chips as well. As used herein, a chip set may mean a multiple-chip chip set, or a chip set that includes only a single chip, depending on the application.

The storage flow controller and the queues could be maintained in software on the host or may become part of another chip in the chipset. Hence, multiple ways of partitioning this architecture are feasible to accomplish the high performance IP based storage and TCP/IP offload applications that will be required with the coming high performance processors in the future. The storage engine description has been given with respect to iSCSI, however, with TCP/IP and storage engine programmability, classifier programmability and the storage flow controller along with the control processor, other IP storage protocols like iFCP, FCIP and others can be implemented with the appropriate firmware. iSCSI operations may also be IP Storage operations. The high performance IP processor core may be coupled with multiple input output ports of lower line rates, matching the total throughput to create multi-port IP processor embodiment as well.

It is feasible to use this architecture for high performance TCP/IP offloading from the main processor without using the storage engines. This can result in a silicon and system solution for next generation high performance networks for the data and telecom applications. The TCP/IP engine can be augmented with application specific packet accelerators and leverage the core architecture to derive new flavors of this processor. It is possible to change the storage engine with another application specific accelerator like a firewall engine or a route look-up engine or a telecom/network acceleration engine, along with the other capabilities of this invention and target this processor architecture for telecom/networking and other applications.

DETAILED DESCRIPTION

Storage costs and demand have been increasing at a rapid pace over the last several years. This is expected to grow at the same rate in the foreseeable future. With the advent of e-business, availability of the data at any time and anywhere irrespective of the server or system downtime is critical. This is driving a strong need to move the server attached storage onto a network to provide storage consolidation, availability of data and ease of management of the data. The storage area networks (SANs) are today predominantly based on Fibre Channel technology, that provide various benefits like low latency and high performance with its hardware oriented stacks compared to TCP/IP technology.

Some system transport block storage traffic on IP designed to transport data streams. The data streams are transported using Transmission Control Protocol (TCP) that is layered to run on top of IP. TCP/IP is a reliable connection oriented protocol implemented in software within the operating systems. A TCP/IP software stack is slow to handle the high line rates that will be deployed in the future. New hardware solutions will accelerate the TCP/IP stack to carry storage and network traffic and be competitive to FC based solutions.

The prevalent storage protocol in high performance servers, workstations and storage controllers and arrays is SCSI protocol which has been around for 20 years. SCSI architecture is built as layered protocol architecture. FIG. 1 illustrates the various SCSI architecture layers within an initiator, block 101, and target subsystems, block 102. As used in patent, the terms "initiator" and "target" mean a data processing apparatus, or a subsystem or system including them. The terms "initiator" and "target" can also mean a client or a server or a peer. Likewise, the term "peer" can mean a peer data processing apparatus, or a subsystem or system thereof. A "remote peer" can be a peer located across the world or across the room.

The initiator and target subsystems in FIG. 1 interact with each other using the SCSI application protocol layer, block 103, which is used to provide a client-server request and response transactions. It also provides device service request and response between the initiator and the target mass storage device which may take many forms like a disk arrays, tape drives, and the like. Traditionally, the target and initiator are interconnected using the SCSI bus architecture carrying the SCSI protocol, block 104. The SCSI protocol layer is the transport layer that allows the client and the server to interact with each other using the SCSI application protocol. The transport layer must present the same semantics to the upper layer so that the upper layer protocols and application can stay transport protocol independent.

FIG. 2 illustrates the SCSI application layer on top of IP based transport layers. An IETF standards track protocol, iSCSI (SCSI over IP) is an attempt to provide IP based storage transport protocol. There are other similar attempts including FCIP (FC encapsulated in IP), iFCP( FC over IP) and others. Many of these protocols layer on top of TCP/IP as the transport mechanism, in a manner similar to that illustrated in FIG. 2. As illustrated in FIG. 2, the iSCSI protocol services layer, block 204, provides the layered interface to the SCSI application layer, block 203. iSCSI carries SCSI commands and data as iSCSI protocol data units (PDUs) as defined by the standard. These protocol data units then can be transported over the network using TCP/IP, block 205, or the like. The standard does not specify the means of implementing the underlying transport that carries iSCSI PDUs. FIG. 2 illustrates iSCSI layered on TCP/IP which provides the transport for the iSCSI PDUs.

The IP based storage protocol like iSCSI can be layered in software on top of a software based TCP/IP stack. However, such an implementation would suffer serious performance penalties arising from software TCP/IP and the storage protocol layered on top of that. Such an implementation would severely impact the performance of the host processor and may make the processor unusable for any other tasks at line rates above 1Gbps. Hence, we would implement the TCP/IP stack in hardware, relieving the host processor, on which the storage protocol can be built. The storage protocol, like iSCSI, can be built in software running on the host processor or may, as described in this patent, be accelerated using hardware implementation. A software iSCSI stack will present many interrupts to the host processor to extract PDUs from received TCP segments to be able to act on them. Such an implementation will suffer severe performance penalties for reasons similar to those for which a software based TCP stack would. The described processor provides a high performance and low latency architecture to transport Storage protocol on a TCP/IP based network that eliminates or greatly reduces the performance penalty on the host processor, and the resulting latency impact.

FIG. 3 illustrates a comparison of the TCP/IP stack to Fibre channel as referenced to the OSI networking stack. The TCP/IP stack, block 303, as discussed earlier in the Summary of the Invention section of this patent, has performance problems resulting from the software implementation on the hosts. Compared to that, specialized networking protocols like Fibre channel, block 304, and others are designed to be implemented in hardware. The hardware implementation allows the networking solutions to be higher performance than the IP based solution. However, the ubiquitous nature of IP and the familiarity of IP from the IT users' and developers' perspective makes IP more suitable for wide spread deployment. This can be accomplished if the performance penalties resulting from TCP/IP are reduced to be equivalent to those of the other competing specialized protocols. FIG. 4 illustrates a protocol level layering in hardware and software that is used for TCP/IP, block 403, to become competitive to the other illustrated specialized protocols.

FIG. 5 illustrates a host operating system stack using a hardware based TCP/IP and storage protocol implementation of this patent. The protocol is implemented such that it can be introduced into the host operating system stack, block 513, such that the operating system layers above it are unchanged. This allows the SCSI application protocols to operate without any change. The driver layer, block 515, and the stack underneath for IP based storage interface, block 501, will represent a similar interface as a non-networked SCSI interface, blocks 506 and 503 or Fibre Channel interface, block 502.

FIG. 6 illustrates the data transfers involved in a software TCP/IP stack. Such an implementation of the TCP/IP stack carries huge performance penalties from memory copy of the data transfers. The figure illustrates data transfer between client and server networking stacks. User level application buffers, block 601, that need to be transported from the client to the server or vice versa, go through the various levels of data transfers shown. The user application buffers on the source get copied into the OS kernel space buffers, block 602. This data then gets copied to the network driver buffers, block 603, from where it gets DMA-transferred to the network interface card (NIC) or the host bus adapter (HBA) buffers, block 604. The buffer copy operations involve the host processor and use up valuable processor cycles. Further, the data being transferred goes through checksum calculations on the host using up additional computing cycles from the host. The data movement into and out of the system memory on the host multiple times creates a memory bandwidth bottleneck as well. The data transferred to the NIC/HBA is then sent on to the network, block 609, and reaches the destination system. At the destination system the data packet traverses through the software networking stack in the opposite direction as the host though following similar buffer copies and checksum operations. Such implementation of TCP/IP stack is very inefficient for block storage data transfers and for clustering applications where a large amount of data may be transferred between the source and the destination.

FIG. 7 illustrates the networking stack in an initiator and in a target with features that allow remote direct memory access (RDMA) features of the architecture described in this patent. The following can be called an RDMA capability or an RDMA mechanism or an RDMA function. In such a system the application running on the initiator or target registers a region of memory, block 702, which is made available to its peer(s) for access directly from the NIC/HBA without substantial host intervention. These applications would also let their peer(s) know about the memory regions being available for RDMA, block 708. Once both peers of the communication are ready to use the RDMA mechanism, the data transfer from RDMA regions can happen with essentially zero copy overhead from the source to the destination without substantial host intervention if NIC/HBA hardware in the peers implement RDMA capability. The source, or initiator, would inform its peer of its desire to read or write specific RDMA enabled buffers and then let the destination or target, push or pull the data to/from its RDMA buffers. The initiator and the target NIC/HBA would then transport the data using the TCP/IP hardware implementation described in this patent, RMDA 703, TCP/IP offload 704, RMDA 708 and TCP/IP offload 709, between each other without substantial intervention of the host processors, thereby significantly reducing the processor overhead. This mechanism would significantly reduce the TCP/IP processing overhead on the host processor and eliminate the need for multiple buffer copies for the data transfer illustrated in FIG. 6. RDMA enabled systems would thus allow the system, whether fast or slow, to perform the data transfer without creating a performance bottleneck for its peer. RDMA capability implemented in this processor in storage over IP solution eliminates host intervention except usually at the data transfer start and termination. This relieves the host processors in both target and initiator systems, to perform useful tasks without being interrupted at each packet arrival or transfer. RDMA implementation also allows the system to be secure and prevent unauthorized access. This is accomplished by registering the exported memory regions with the HBA/NIC with their access control keys along with the region IDs. The HBA/NIC performs the address translation of the memory region request from the remote host to the RDMA buffer, performs security operations such as security key verification and then allows the data transfer. This processing is performed off the host processor in the processor of this invention residing on the HBA/NIC or as a companion processor to the host processor on the motherboard, for example. This capability can also be used for large data transfers for server clustering applications as well as client server applications. Real time media applications transferring large amounts of data between a source or initiator and a destination or target can benefit from this.

FIG. 8 illustrates the host file system and SCSI stack implemented in software. As indicated earlier the IP based storage stack, blocks 805, 806, 807, 808 and 809, should represent a consistent interface to the SCSI layers, blocks 803 and 804, as that provided by SCSI transport layer, block 811, or Fibre channel transport, block 810. This figure illustrates high level requirements that are imposed on the IP based storage implementation from a system level, besides those imposed by various issues of IP which is not designed to transport performance sensitive block data.

FIG. 9 illustrates the iSCSI stack in more detail from that illustrated in FIG. 8. The iSCSI stack blocks 805 though 809, should provide an OS defined driver interface level functionality to the SCSI command consolidation layer blocks 803 & 804, such that the behavior of this layer and other layers on top of it are unchanged. FIG. 9 illustrates a set of functions that would be implemented to provide IP storage capabilities. The functions that provide the iSCSI functionality are grouped into related sets of functions, although there can be many variations of these as any person skilled in this area would appreciate. There are a set of functions that are required to meet the standard (e.g. target and initiator login and logout) functions, block 916, connection establishment and teardown functions, block 905. The figure illustrates functions that allow the OS SCSI software stack to discover the iSCSI device, block 916, set and get options/parameters, blocks 903 and 909, to start the device, block 913 and release the device, block 911. Besides the control functions discussed earlier, the iSCSI implementation provides bulk data transfer functions, through queues 912 and 917, to transport the PDUs specified by the iSCSI standard. The iSCSI stack may also include direct data transfer/placement (DDT) or RDMA functions or combination thereof, block 918, which are used by the initiator and target systems to perform substantially zero buffer copy and host intervention-less data transfers including storage and other bulk block data transfers. The SCSI commands and the block data transfers related to these are implemented as command queues, blocks 912 and 917, which get executed on the described processor. The host is interrupted primarily on the command completion. The completed commands are queued for the host to act on at a time convenient to the host. The figure illustrates the iSCSI protocol layer and the driver layer layered on the TCP/IP stack, blocks 907 and 908, which is also implemented off the host processor on the IP processor system described herein.

FIG. 10 illustrates the TCP/IP stack functionality that is implemented in the described IP processor system. These functions provide an interface to the upper layer protocol functions to carry the IP storage traffic as well as other applications that can benefit from direct OS TCP/IP bypass, RDMA or network sockets direct capabilities or combination thereof to utilize the high performance TCP/IP implementation of this processor. The TCP/IP stack provides capabilities to send and receive upper layer data, blocks 1017 and 1031, and command PDUs, establish the transport connections and teardown functions, block 1021, send and receive data transfer functions, checksum functions, block 1019, as well as error handling functions, block 1022, and segmenting and sequencing and windowing operations, block 1023. Certain functions like checksum verification/creation touch every byte of the data transfer whereas some functions that transport the data packets and update the transmission control block or session data base are invoked for each packet of the data transfer. The session DB, block 1025, is used to maintain various information regarding the active sessions/connections along with the TCP/IP state information. The TCP layer is built on top of IP layer that provides the IP functionality as required by the standard. This layer provides functions to fragment/de-fragment, block 1033, the packets as per the path MTU, providing the route and forwarding information, block 1032, as well as interface to other functions necessary for communicating errors like, for example, ICMP, block 1029. The IP layer interfaces with the Ethernet layer or other media access layer technology to transport the TCP/IP packets onto the network. The lower layer is illustrated as Ethernet in various figures in this description, but could be other technologies like SONET, for instance, to transport the packets over SONET on MANs/WANs. Ethernet may also be used in similar applications, but may be used more so within a LAN and dedicated local SAN environments, for example.

FIG. 11 illustrates the iSCSI data flow. The figure illustrates the receive and transmit path of the data flow. The Host's SCSI command layer working with the iSCSI driver, both depicted in block 1101, would schedule the commands to be processed to the command scheduler, block 1108, in the storage flow controller seen in more detail in FIG. 26. The command scheduler 1108 schedules the new commands for operation in the processor described in more detail in FIG. 17. A new command that is meant for the target device with an existing connection gets en-queued to that existing connection, block 1111. When the connection to the target device does not exist, a new command is en-queued on to the unassigned command queue, block 1102. The session/connection establishment process like that shown in FIG. 47 and blocks 905 and 1006 is then called to connect to the target. Once the connection is established the corresponding command from the queue 1102 gets en-queued to the newly created connection command queue 1111 by the command scheduler 1108 as illustrated in the figure. Once a command reaches a stage of execution, the receive 1107 or transmit 1109 path is activated depending on whether the command is a read or a write transaction. The state of the connection/session which the command is transported is used to record the progress of the command execution in the session database as described subsequently. The buffers associated with the data transfer may be locked till such time as the transfer is completed. If the RDMA mechanism is used to transfer the data between the initiator and the target, appropriate region buffers identifiers, access control keys and related RDMA state data is maintained in memory on board the processor and may also be maintained in off-chip memory depending on the implementation chosen. As the data transfer, which may be over multiple TCP segments, associated with the command is completed the status of the command execution is passed onto the host SCSI layer which then does the appropriate processing. This may involve releasing the buffers being used for data transfers to the applications, statistics update, and the like. During transfer, the iSCSI PDUs are transmitted by the transmit engines, block 1109, working with the transmit command engines, block 1110, that interpret the PDU and perform appropriate operations like retrieving the application buffers from the host memory using DMA to the storage processor and keeping the storage command flow information in the iSCSI connection database updated with the progress. As used in this patent the term "engine" can be a data processor or a part of a data processor, appropriate for the function or use of the engine. Similarly, the receive engines, block 1107, interpret the received command into new requests, response, errors or other command or data PDUs that need to be acted on appropriately. These receive engines working with the command engines, block 1106, route the read data or received data to the appropriate allocated application buffer through direct data transfer/placement or RDMA control information maintained for the session in the iSCSI session table. On command completion the control to the respective buffers, blocks 1103 and 1112, is released for the application to use. Receive and transmit engines can be the SAN packet processors 1706(*a*) to 1706(*n*) of FIG. 17 of this IP processor working with the session information recorded in the session data base entries 1704, which can be viewed as a global memory as viewed from the TCP/IP processor of FIG. 23 or the IP processor of FIG. 24 The same engines can get reused for different packets and commands with the appropriate storage flow context provided by the session database discussed in more detail below with respect to block 1704 and portion of session database in 1708 of FIG. 17. For clarification, the terms IP network application processor, IP Storage processor, IP Storage network application processor and IP processor can be the same entity, depending on the application. An IP network application processor core or an IP storage network application processor core can be the same entity, depending on the application.

Similarly a control command can use the transmit path whereas the received response would use the receive path. Similar engines can exist on the initiator as well as the target. The data flow direction is different depending on whether it is the initiator or the target. However, primarily similar data flow exists on both initiator and target with additional steps at the target. The target needs to perform additional operations to reserve the buffers needed to get the data of a write command, for instance, or may need to prepare the read data before the data is provided to the initiator. Similar instances would exist in case of an intermediate device, although, in such a device, which may be a switch or an appliance, some level of virtualization or frame filtering or such other operation may be performed that may require termination of the session on one side and originating sessions on the other. This functionality is supported by this architecture but not illustrated explicitly in this figure, inasmuch as it is well within the knowledge of one of ordinary skill in the art.

FIG. 12 through FIG. 15 illustrate certain protocol information regarding transport sessions and how that information may be stored in a database in memory.

FIG. 12 illustrates the data structures that are maintained for iSCSI protocol and associated TCP/IP connections. The data belonging to each iSCSI session, block 1201, which is essentially a nexus of initiator and target connections, is carried on the appropriate connection, block 1202. Dependent commands are scheduled on the queues of the same connection to maintain the ordering of the commands, block 1203. However, unrelated commands can be assigned to different transport connection. It is possible to have all the commands be queued to the same connection, if the implementation supports only one connection per session. However, multiple connections per session are feasible to support line trunking between the initiator and the target. For example, in some applications, the initiator and the target will be in communication with each other and will decide through negotiation to accept multiple connections. In others, the initiator and target will communicate through only one session or connection. FIG. 13 and FIG. 14 illustrate the TCP/IP and iSCSI session data base or transmission control block per session and connection. These entries may be carried as separate tables or may be carried together as a composite table as seen subsequently with respect to FIGS. 23, 24, 26 and 29 depending on the implementation chosen and the functionality implemented e.g. TCP/IP only, TCP/IP with RDMA, IP Storage only, IP storage with TCP/IP, IP Storage with RDMA and the like. Various engines that perform TCP/IP and storage flow control use all or some of these fields or more fields not shown, to direct the block data transfer over TCP/IP. The appropriate fields are updated as the connection progresses through the multiple states during the course of data transfer. FIG. 15 illustrates one method of storing the transmission control entries in a memory subsystem that consists of an on-chip session cache, blocks 1501 and 1502, and off-chip session memory, blocks 1503, 1504, 1505, 1506 and 1507, that retains the state information necessary for continuous progress of the data transfers.

FIG. 16 illustrates the IP processor architecture at a high level of abstraction. The processor consists of modular and scalable IP network application processor core, block 1603. Its functional blocks provide the functionality for enabling high speed storage and data transport over IP networks. The processor core can include an intelligent flow controller, a programmable classification engine and a storage/network policy engine. Each can be considered an individual processor or any combination of them can be implemented as a single processor. The disclosed processor also includes a security processing block to provide high line rate encryption and decryption functionality for the network packets. This, likewise, can be a single processor, or combined with the others mentioned above. The disclosed processor includes a memory subsystem, including a memory controller interface, which manages the on chip session cache/memory, and a memory controller, block 1602, which manages accesses to the off chip memory which may be SRAM, DRAM, FLASH, ROM, EEPROM, DDR SDRAM, RDRAM, FCRAM, QDR SRAM, or other derivatives of static or dynamic random access memory or a combination thereof. The IP processor includes appropriate system interfaces to allow it to be used in the targeted market segments, providing the right media interfaces, block 1601, for LAN, SAN, WAN and MAN networks, and similar networks, and appropriate host interface, block 1606. The media interface block and the host interface block may be in a multi-port form where some of the ports may serve the redundancy and fail-over functions in the networks and systems in which the disclosed processor is used. The processor also may contain the coprocessor interface block 1605, for extending the capabilities of the main processor for example creating a multi-processor system. The system controller interface of block 1604 allows this processor to interface with an off-the-shelf microcontroller that can act as the system controller for the system in which the disclosed processor may be used. The processor architecture also support a control plane processor on board, that could act as the system controller or session manager. The system controller interface may still be provided to enable the use of an external processor. Such a version of this processor may not include the control processor for die cost reasons. There are various types of the core architecture that can be created, targeting specific system requirements, for example server adapters or storage controllers or switch line cards or other networking systems. The primary differences would be as discussed in the earlier sections of this patent. These processor blocks provide capabilities and performance to achieve the high performance IP based storage using standard protocols like iSCSI, FCIP, iFCP and the like. The detailed architecture of these blocks will be discussed in the following description.

FIG. 17 illustrates the IP processor architecture in more detail. The architecture provides capabilities to process incoming IP packets from the media access control (MAC) layer, or other appropriate layer, through full TCP/IP termination and deep packet inspection. This block diagram does not show the MAC layer block 1601, or blocks 1602, 1604 or 1605 of FIG. 16. The MAC layer interface blocks to the input queue, block 1701, and output queue, block 1712, of the processor in the media interface, block 1601, shown in FIG. 16. The MAC functionality could be standards based, with the specific type dependent on the network. Ethernet and Packet over SONET are examples of the most widely used interfaces today which may be included on the same silicon or a different version of the processor created with each.

The block diagram in FIG. 17 illustrates input queue and output queue blocks 1701 and 1712 as two separate blocks. The functionality may be provided using a combined block. The input queue block 1701 consists of the logic, control and storage to retrieve the incoming packets from the MAC interface block. Block 1701 queues the packets as they arrive from the interface and creates appropriate markers to identify start of the packet, end of the packet and other attributes like a fragmented packet or a secure packet, and the like, working with the packet scheduler 1702 and the classification engine 1703. The packet scheduler 1702, can retrieve the packets from the input queue controller and passes them for classification to the classification engine. The classification block 1703, is shown to follow the scheduler, however from a logical perspective the classification engine receives the packet from the input queue, classifies the packet and provides the classification tag to the packet, which is then scheduled by the scheduler to the processor array 1706(*a*) . . . 1706(*n*). Thus the classification engine can act as a pass-through classification engine, sustaining the flow of the packets through its structure at the full line rate. The classification engine is a programmable engine that classifies the packets received from the network in various categories and tags the packet with the classification result for the scheduler and the other packet processors to use. Classification of the network traffic is a very compute intensive activity which can take up to half of the processor cycles available in a packet processor. This integrated classification engine is programmable to perform Layer 2 through Layer 7 inspection. The fields to be classified are programmed in with expected values for comparison and the action associated with them if there is a match. The classifier collects the classification walk results and can present these as a tag to the packet identifying the classification result as seen subsequently with respect to FIG. 30. This is much like a tree structure and is understood as a "walk." The classified packets are then provided to the scheduler 1702 as the next phase of the processing pipeline.

The packet scheduler block 1702 includes a state controller and sequencer that assign packets to appropriate execution engines on the disclosed processor. The execution engines are the SAN packet processors, block 1706(*a*) through 1706(*n*), including the TCP/IP and/or storage engines as well as the storage flow/RDMA controller, block 1708 or host bypass and/or other appropriate processors, depend on the desired implementation. For clarity, the term "/", when used to designate hardware components in this patent, can mean "and/or" as appropriate. For example, the component "storage flow/RDMA controller" can be a storage flow and RDMA controller, a storage flow controller, or an RDMA controller, as appropriate for the implementation. The scheduler 1702 also maintains the packet order through the processor where the state dependency from a packet to a packet on the same connection/session is important for correct processing of the incoming packets. The scheduler maintains various tables to track the progress of the scheduled packets through the processor until packet retirement. The scheduler also receives commands that need to be scheduled to the packet processors on the outgoing commands and packets from the host processor or switch fabric controller or interface.

The TCP/IP and storage engines along with programmable packet processors are together labeled as the SAN Packet Processors 1706(*a*) through 1706(*n*) in FIG. 17. These packet processors are engines that are independent programmable entities that serve a specific role. Alternatively, two or more of them can be implemented as a single processor depending on the desired implementation. The TCP/IP engine of FIG. 23 and the storage engines of FIG. 24 are configured in this example as coprocessors to the programmable packet processor engine block 2101 of FIG. 21. This architecture can thus be applied with relative ease to applications other than storage by substituting/removing for the storage engine for reasons of cost, manufacturability, market segment and the like. In a pure networking environment the storage engine could be removed, leaving the packet processor with a dedicated TCP/IP engine and be applied for the networking traffic, which will face the same processing overhead from TCP/IP software stacks. Alternatively one or more of the engines may be dropped for desired implementation e.g. for processor supporting only IP Storage functions may drop TCP/IP engine and/or packet engine which may be in a separate chip. Hence, multiple variations of the core scalable and modular architecture are possible. The core architecture can thus be leveraged in applications beside the storage over IP applications by substituting the storage engine with other dedicated engines, for example a high performance network security and policy engine, a high performance routing engine, a high performance network management engine, deep packet inspection engine providing string search, an engine for XML, an engine for virtualization, and the like, providing support for an application specific acceleration. The processing capability of this IP processor can be scaled by scaling the number of SAN Packet Processor blocks 1706(*a*) through 1706(*n*) in the chip to meet the line rate requirements of the network interface. The primary limitation from the scalability would come from the silicon real-estate required and the limits imposed by the silicon process technologies. Fundamentally this architecture is scalable to very high line rates by adding more SAN packet processor blocks thereby increasing the processing capability. Other means of achieving a similar result is to increase the clock frequency of operation of the processor to that feasible within the process technology limits.

FIG. 17 also illustrates the IP session cache/memory and the memory controller block 1704. This cache can be viewed as an internal memory or local session database cache. This block is used to cache and store the TCP/IP session database and also the storage session database for a certain number of active sessions. The number of sessions that can be cached is a direct result of the chosen silicon real-estate and what is economically feasible to manufacture. The sessions that are not on chip, are stored and retrieved to/from off chip memory, viewed as an external memory, using a high performance memory controller block which can be part of block 1704 or otherwise. Various processing elements of this processor share this controller using a high speed internal bus to store and retrieve the session information. The memory controller can also be used to temporarily store packets that may be fragmented or when the host interface or outbound queues are backed-up. The controller may also be used to store statistics information or any other information that may be collected by the disclosed processor or the applications running on the disclosed or host processor.

The processor block diagram of FIG. 17 also illustrates host interface block 1710, host input queue, block 1707 and host output queue, block 1709 as well as the storage flow/RDMA controller, block 1708. These blocks provide the functions that are required to transfer data to and from the host (also called "peer") memory or switch fabric. These blocks also provide features that allow the host based drivers to schedule the commands, retrieve incoming status, retrieve the session database entry, program the disclosed processor, and the like to enable capabilities like sockets direct architecture, full TCP/IP termination,. IP storage offload and the like capabilities with or without using RDMA. The host interface controller 1710, seen in greater detail in FIG. 27, provides the configuration registers, DMA engines for direct memory to memory data transfer, the host command block that performs some of the above tasks, along with the host interface transaction controller and the host interrupt controller. The host input and output queues 1707, 1709 provide the queuing for incoming and outgoing packets. The storage flow and RDMA controller block 1708 provides the functionality necessary for the host to queue the commands to the disclosed processor, which then takes these commands and executes them, interrupting the host processor on command termination. The RDMA controller portion of block 1708 provides various capabilities necessary for enabling remote direct memory access. It has tables that include information such as RDMA region, access keys, and virtual address translation functionality. The RDMA engine inside this block performs the data transfer and interprets the received RDMA commands to perform the transaction if the transaction is allowed. The storage flow controller of block 1708 also keeps track of the state of the progress of various commands that have been scheduled as the data transfer happens between the target and the initiator. The storage flow controller schedules the commands for execution and also provides the command completion information to the host drivers. The above can be considered RDMA capability and can be implemented as described or by implementing as individual processors, depending on designer's choice. Also, additional functions can be added to or removed from those described without departing from the spirit or the scope of this patent.

The control plane processor block 1711 of this processor is used to provide relatively slow path functionality for TCP/IP and/or storage protocols which may include error processing with ICMP protocol, name resolution, address resolution protocol, and it may also be programmed to perform session initiation/teardown acting as a session controller/connection manger, login and parameter exchange, and the like. This control plane processor could be off chip to provide the system developer a choice of the control plane processor, or may be on chip to provide an integrated solution. If the control plane processor is off-chip, then an interface -block would be created or integrated herein that would allow this processor to interface with the control plane processor and perform data and command transfers. The internal bus structures and functional block interconnections may be different than illustrated for all the detailed figures for performance, die cost requirements and the like and not depart from the spirit and the scope of this patent.

Capabilities described above for FIG. 17 blocks with more detail below, enable a packet streaming architecture that allows packets to pass through from input to output with minimal latency, with in-stream processing by various processing resources of the disclosed processor.

FIG. 18 illustrates the input queue and controller block shown generally at 1701 of FIG. 17 in more detail. The core functionality of this block is to accept the incoming packets from multiple input ports, Ports 1 to N, in blocks 1801 and 1802(*i*) to 1802(*n*), and to queue them using a fixed or programmable priority on the input packet queue, block 1810, from where the packets get dequeued for classifier, scheduler and further packet processing through scheduler I/F blocks 1807-1814. The input queue controller interfaces with each of the input ports (Port 1 through Port N in a multi-port implementation), and queues the packets to the input packet queue 1810. The packet en-queue controller and marker block 1804 may provide fixed priority functions or may be programmable to allow different policies to be applied to different interfaces based on various characteristics like port speed, the network interface of the port, the port priority and others that may be appropriate. Various modes of priority may be programmable like round-robin, weighted round-robin or others. The input packet de-queue controller 1812 de-queues the packets and provides them to the packet scheduler, block 1702 of FIG. 17 via scheduler I/F 1814. The scheduler schedules the packets to the SAN packet processors 1706(*a*)-1706(*n*) once the packets have been classified by the classification engine 1703 of FIG. 17. The encrypted packets can be classified as encrypted first and passed on to the security engine 1705 of FIG. 17 by the secure packet interface block 1813 of FIG. 18, for authentication and/or decryption if the implementation includes security processing otherwise the security interfaces may not be present and an external security processor would be used to perform similar functions. The decrypted packets from clear packet interface, block 1811, are then provided to the input queue through block 1812 from which the packet follows the same route as a clear packet. The fragmented IP packets may be stored on-chip in the fragmented packet store and controller buffers, block 1806, or may be stored in the internal or external memory. When the last fragment arrives, the fragment controller of block 1806, working with the classification engine and the scheduler of FIG. 17, merges these fragments to assemble the complete packet. Once the fragmented packet is combined to form a complete packet, the packet is scheduled into the input packet queue via block 1804 and is then processed by the packet de-queue controller, block 1812, to be passed on to various other processing stages of this processor. The input queue controller of FIG. 18 assigns a packet tag/descriptor to each incoming packet which is managed by the attribute manager of block 1809 which uses the packet descriptor fields like the packet start, size, buffer address, along with any other security information from classification engine, and stored in the packet attributes and tag array of block 1808. The packet tag and attributes are used to control the flow of the packet through the processor by the scheduler and other elements of the processor in an efficient manner through interfaces 1807, 1811, 1813 and 1814.

FIG. 19 illustrates the packet scheduler and sequencer 1702 of FIG. 17 in more detail. This block is responsible for scheduling packets and tasks to the execution resources of this processor and thus also acts as a load balancer. The scheduler retrieves the packet headers from the header queue, block 1902, from the input queue controller 1901 to pass them to the classification engine 1703 of February 17 which returns the classification results to the classifier queue, block 1909, that are then used by the rest of the processor engines. The classification engine may be presented primarily with the headers, but if deep packet inspection is also programmed, the classification engine may receive the complete packets which it routes to the scheduler after classification. The scheduler comprises a classification controller/scheduler., block 1908, which manages the execution of the packets through the classification engine. This block 1908 of FIG. 19 provides the commands to the input queue controller, block 1901, in case of fragmented packets or secure packets, to perform the appropriate actions for such packets e.g. schedule an encrypted packet to the security engine of FIG. 17. The scheduler state control and the sequencer, block 1916, receive state information of various transactions/operations active inside the processor and provide instructions for the next set of operations. For instance, the scheduler retrieves the packets from the input packet queue of block 1903, and schedules these packets in the appropriate resource queue depending on the results of the classification received from the classifier or directs the packet to the packet memory, block 1913 or 1704 through 1906, creating a packet descriptor/tag which may be used to retrieve the packet when appropriate resource needs it to performs its operations at or after scheduling. The state control and sequencer block 1916 instructs/directs the packets with their classification result, block 1914, to be stored in the packet memory, block 1913, from where the packets get retrieved when they are scheduled for operation. The state controller and the sequencer identify the execution resource that should receive the packet for operation and creates a command and assigns this command with the packet tag to the resource queues, blocks 1917 (Control Plane), 1918 (port i-port n), 1919 (bypass) and 1920 (host) of FIG. 19. The priority selector 1921 is a programmable block that retrieves the commands and the packet tag from the respective queues based on the assigned priority and passes this to the packet fetch and command controller, block 1922. This block retrieves the packet from the packet memory store 1913 along with the classification results and schedules the packet transfer to the appropriate resource on the high performance processor command and packet busses such as at 1926 when the resource is ready for operation. The bus interface blocks, like command bus interface controller 1905, of the respective recipients interpret the command and accept the packet and the classification tag for operation. These execution engines inform the scheduler when the packet operation is complete and when the packet is scheduled for its end destination (either the host bus interface, or the output interface or control plane interface, etc.). This allows the scheduler to retire the packet from its state with the help of retirement engine of block 1904 and frees up the resource entry for this session in the resource allocation table, block 1923. The resource allocation table is used by the sequencer to assign the received packets to specific resources, depending on the current state of internal state of these resources, e.g. the session database cache entry buffered in the SAN packet processor engine, the connection ID of the current packet being executed in the resource, and the like. Thus packets that are dependent on an ordered execution get assigned primarily to the same resource, which improves memory traffic and performance by using the current DB state in the session memory in the processor and not have to retrieve new session entries. The sequencer also has interface to the memory controller, block 1906, for queuing of packets that are fragmented packets and/or for the case in which the scheduler queues get backed-up due to a packet processing bottleneck down stream, which may be caused by specific applications that are executed on packets that take more time than that allocated to maintain a full line rate performance, or for the case in which any other downstream systems get full, unable to sustain the line rate.

If the classifier is implemented before the scheduler as discussed above with respect to FIG. 17 where the classification engine receives the packet from the input queue, items 1901, 1902, 1908, 1909 and 1910 would be in the classifier, or may not be needed, depending on the particular design. The appropriate coupling from the classifier to/from the scheduler blocks 1903, 1907, 1914 and 1915 may be created in such a scenario and the classifier coupled directly to the input queue block of FIG. 18.

FIG. 20 illustrates the packet classification engine shown generally at 1703 of FIG. 17. Classification of the packets into their various attributes is a very compute intensive operation. The classifier can be a programmable processor that examines various fields of the received packet to identify the type of the packet, the protocol type e.g. IP, ICMP, TCP, UDP etc, the port addresses, the source and destination fields, etc. The classifier can be used to test a particular field or a set of fields in the header or the payload. The block diagram illustrates a content addressable memory based classifier. However, as discussed earlier this could be a programmable processor as well. The primary differences are the performance and complexity of implementation of the engine. The classifier gets the input packets through the scheduler from the input queues, blocks 2005 and 2004 of FIG. 20. The input buffers 2004 queue the packets/descriptor and/or the packet headers that need to be classified. Then the classification sequencer 2003 fetches the next available packet in the queue and extracts the appropriate packet fields based on the global field descriptor sets, block 2007, which are, or can be, programmed. Then the classifier passes these fields to the content addressable memory (CAM) array, block 2009, to perform the classification. As the fields are passed through the CAM array, the match of these fields identifies next set of fields to be compared and potentially their bit field location. The match in the CAM array results in the action/event tag, which is collected by the result compiler, (where "compiling" is used in the sense of "collecting") block 2014 and also acted on as an action that may require updating the data in the memory array, block 2013, associated with specific CAM condition or rule match. This may include performing an arithmetic logic unit (ALU) operation, block 2017, which can be considered one example of an execution resource) on this field e.g. increment or decrement the condition match and the like. The CAM arrays are programmed with the fields, their expected values and the action on match, including next field to compare, through the database initialization block 2011, accessible for programming through the host or the control plane processor interfaces 1710, 1711. Once the classification reaches a leaf node the classification is complete and the classification tag is generated that identifies the path traversed that can then be used by other engines of the IP processor avoid performing the same classification tasks. For example a classification tag may include the flow or session ID, protocol type indication e.g. TCP/UDP/ICMP etc., value indicating whether to processes, bypass, drop packet, drop session, and the like, or may also include the specific firmware code routine pointer for the execution resource to start packet processing or may include signature of the classification path traversed or the like. The classification tag fields are chosen based on processor implementation and functionality. The classifier retirement queue, block 2015, holds the packets/descriptors of packets that are classified and classification tag and are waiting to be retrieved by the scheduler. The classification data base can be extended using database extension interface and pipeline control logic block 2006. This allows systems that need extensibility for a larger classification database to be built. The classification engine with the action interpreter, the ALU and range matching block of 2012 also provide capabilities to program storage/network policies/actions that need to be taken if certain policies are met. The policies can be implemented in the form of rule and action tables. The policies get compiled and programmed in the classification engine through the host interface along with the classification tables. The database interface and pipeline control 2006 could be implemented to couple to companion processor to extend the size of the classification/policy engine.

FIG. 21 illustrates the SAN Packet Processor shown generally at 1706($a$) through 1706($n$) of FIG. 17. A packet processor can be a specially designed packet processor, or it can be any suitable processor such as an ARM, MIPS, StrongARM, X86, PowerPC, Pentium processor, or any other processor that serves the functions described herein. This is also referred as the packet processor complex in various sections of this patent. This packet processor comprises a packet engine, block 2101, which is generally a RISC machine with target instructions for packet processing or a TCP/IP engine, block 2102 or an IP storage engine, block 2103 or a combination thereof. These engines can be configured as coprocessors to the packet engine or can be independent engines. FIG. 22 illustrates the packet engine in more detail. The packet engine is a generally RISC machine as indicated above with instruction memory, block 2202, and Data Memory, block 2206, (both of which can be RAM) that are used to hold the packet processing micro routines and the packets and intermediate storage. The instruction memory 2202 which, like all such memory in this patent, can be RAM or other suitable storage, is initialized with the code that is executed during packet processing. The packet processing code is organized as tight micro routines that fit within the allocated memory. The instruction decoder and the sequencer, block 2204, fetches the instructions from instruction memory 2202, decodes them and sequences them through the execution blocks contained within the ALU, block 2208. This machine can be a simple pipelined engine or a more complex deep pipelined machine that may also be designed to provide a packet oriented instruction set. The DMA engine, block 2205 and the bus controller, block 2201, allow the packet engine to move the data packets from the scheduler of FIG. 19 and the host interface into the data memory 2206 for operation. The DMA engine may hold multiple memory descriptors to store/retrieve packet/data to/from host memory/packet memory. This would enable memory accesses to happen in parallel to packet processor engine operations. The DMA engine 2205 also may be used to move the data packets to and from the TCP and storage engines 2210, 2211. Once the execution of the packet is complete, the extracted data or newly generated packet is transferred to the output interface either towards the media interface or the host interface.

FIG. 23 illustrates a programmable TCP/IP packet processor engine, seen generally at 2210 of FIG. 22, in more detail. This engine is generally a programmable processor with common RISC instructions along with various TCP/IP oriented instructions and execution engines but could also be a micro-coded or a state machine driven processor with appropriate execution engines described in this patent. The TCP processor includes a checksum block, 2311, for TCP checksum verification and new checksum generation by executing these instructions on the processor. The checksum block extracts the data packet from the packet buffer memory (a Data RAM is one example of such memory), 2309, and performs the checksum generation or verification. The packet look-up interface block, 2310, assists the execution engines and the instruction sequencer, 2305, providing access to various data packet fields or the full data packet. The classification tag interpreter, 2313, is used by the instruction decoder 2304 to direct the program flow based on the results of the classification if such an implementation is chosen. The processor provides specific sequence and windowing operations including segmentation, block 2315, for use in the TCP/IP data sequencing calculations for example, to look-up the next expected sequence number and see if that received is within the agreed upon sliding window, which sliding window is a well known part of the TCP protocol, for the connection to which the packet belongs. This element 2315 may also include a segmentation controller like that show at 2413 of FIG. 24. Alternatively, one of ordinary skill in the art, with the teaching of this patent, can easily implement the segmentation controllers elsewhere on the TCP/IP processor of this FIG. 23. The processor provides a hash engine, block 2317, which is used to perform hash operations against specific fields of the packet to perform a hash table walk that may be required to get the right session entry for the packet. The processor also includes a register file, block 2316, which extracts various commonly used header fields for TCP processing, along with pointer registers for data source and destination, context register sets, and registers that hold the TCP states along with a general purpose register file. The TCP/IP processor can have multiple contexts for packet execution, so that when a given packet execution stalls for any reason, for example memory access, the other context can be woken up and the processor continue the execution of another packet stream with little efficiency loss. The TCP/IP processor engine also maintains a local session cache, block 2320, which holds most recently used or most frequently used entries, which can be used locally without needing to retrieve them from the global session memory. The local session cache can be considered an internal memory of the TCP/IP processor, which can be a packet processor. Of course, the more entries that will be used that can be stored locally in the internal memory, without retrieving additional ones from the session, or global, memory, the more efficient the processing will be. The packet scheduler of FIG. 19 is informed of the connection IDs that are cached per TCP/IP processor resource, so that it can schedule the packets that belong to the same session to the same packet processor complex. When the packet processor does not hold the session entry for the specific connection, then the TCP session database lookup engine, block 2319, working with the session manager, block 2321, and the hash engine retrieves the corresponding entry from the global session memory through the memory controller interface, block 2323. There are means, such as logic circuitry inside the session manager that allow access of session entries or fields of session entries, that act with the hash engine to generate the session identifier for storing/retrieving the corresponding session entry or its fields to the session database cache. This can be used to update those fields or entries as a result of packet processing. When a new entry is fetched, the entry which it is replacing is stored to the global session memory. The local session caches may follow exclusivity caching principles, so that multiple processor complexes do not cause any race conditions, damaging the state of the session. Other caching protocols like MESI protocol may also be used to achieve similar results. When a session entry is cached in a processor complex, and another processor complex needs that entry, this entry is transferred to the new processor with exclusive access or appropriate caching state based on the algorithm. The session entry may also get written to the global session memory in certain cases. The TCP/IP processor also includes a TCP state machine, block 2322, which is used to walk through the TCP states for the connection being operated on. This state machine receives the state information stored in the session entry along with the appropriate fields affecting the state from the newly received packet. This allows the state machine to generate the next state if there is a state transition and the information is updated in the session table entry. The TCP/IP processor also includes a frame controller/out of order manager block, 2318, that is used to extract the frame information and perform operations for out of order packet execution. This block could also include an RDMA mechanism such as that shown at 2417 of FIG. 24, but used for non-storage data transfers. One of ordinary skill in the art can also, with the teaching of this patent, implement an RDMA mechanism elsewhere on the TCP/IP processor. This architecture creates an upper layer framing mechanism which may use packet CRC as framing key or other keys that is used by the programmable frame controller to extract the embedded PDUs even when the packets arrive out of order and allow them to be directed to the end buffer destination. This unit interacts with the session database to handle out of order arrival information which is recorded so that once the intermediate segments arrive, the retransmissions are avoided. Once the packet has been processed through the TCP/IP processor, it is delivered for operation to the storage engine, if the packet belongs to a storage data transfer and the specific implementation includes a storage engine, otherwise the packet is passed on to the host processor interface or the storage flow/RDMA controller of block 1708 for processing and for DMA to the end buffer destination. The packet may be transferred to the packet processor block as well for any additional processing on the packet. This may include application and customer specific application code that can be executed on the packet before or after the processing by the TCP/IP processor and the storage processor. Data transfer from the host to the output media interface would also go through the TCP/IP processor to form the appropriate headers to be created around the data and also perform the appropriate data segmentation, working with the frame controller and/or the storage processor as well as to update the session state. This data may be retrieved as a result of host command or received network packet scheduled by the scheduler to the packet processor for operation. The internal bus structures and functional block interconnections may be different than illustrated for performance, die cost requirements and the like. For example, Host Controller Interface 2301, Scheduler Interface 2307 and Memory Controller Interface 2323 may be part of a bus controller that allows transfer of data packets or state information or commands, or a combination thereof, to or from a scheduler or storage flow/RDMA controller or host or session controller or other resources such as, without limitation, security processor, or media interface units, host interface, scheduler, classification processor, packet buffers or controller processor, or any combination of the foregoing.

FIG. 24 illustrates the IP storage processor engine of FIG. 22 in more detail. The storage engine. is a programmable engine with an instruction set that is geared towards IP based storage along with, usually, a normal RISC-like packet processing instruction set. The IP storage processor engine contains block 2411, to perform CRC operations. This block allows CRC generation and verification. The incoming packet with IP storage is transferred from the TCP/IP engine through DMA, blocks 2402 and 2408, into the data memory (a data RAM is an example of such memory), block 2409. When the implementation does not include TCP/IP engine or packet processor engine or a combination thereof, the packet may be received from the scheduler directly for example. The TCP session database information related to the connection can be retrieved from the local session cache as needed or can also be received with the packet from the TCP/IP engine The storage PDU is provided to the PDU classifier engine, block 2418, which classifies the PDU into the appropriate command, which is then used to invoke the appropriate storage command execution engine, block 2412. The command execution can be accomplished using the RISC, or equivalent, instruction set or using a dedicated hardware engine. The command execution engines perform the command received in the PDU. The received PDU may contain read command data, or R2T for a pending write command or other commands required by the IP storage protocol. These engines retrieve the write data from the host interface or direct the read data to the destination buffer. The storage session database entry is cached, in what can be viewed as a local memory, block 2420, locally for the recent or frequent connections served by the processor. The command execution engines execute the commands and make the storage database entry updates working with the storage state machine, block 2422, and the session manager, block 2421. The connection ID is used to identify the session, and if the session is not present in the cache, then it is retrieved from the global session memory 1704 of FIG. 17 by the storage session look-up engine, block 2419. For data transfer from the initiator to target, the processor uses the-segmentation controller, block 2413, to segment the data units into segments as per various network constraints like path MTU and the like. The segmentation controller attempts to ensure that the outgoing PDUs are optimal size for the connection. If the data transfer requested is larger than the maximum effective segment size, then the segmentation controller packs the data into multiple packets and works with the sequence manager, block 2415, to assign the sequence numbers appropriately. The segmentation controller 2413 may also be implemented within the TCP/IP processor of FIG. 23. That is, the segmentation controller may be part of the sequence/window operations manager 2315 of FIG. 23 when this processor is used for TCP/IP operations and not storage operations. One of ordinary skill in the art can easily suggest alternate embodiments for including the segmentation controller in the TCP/IP processor using the teachings of this patent. The storage processor of FIG. 24 (or the TCP/IP processor of FIG. 23) can also include an RDMA engine that interprets the remote direct memory access instructions received in the PDUs for storage or network data transfers that are implemented using this RDMA mechanism. In FIG. 24, for example, this is RDMA engine 2417. In the TCP/IP processor of FIG. 23 an RDMA engine could be part of the frame controller and out of order manager 2318, or other suitable component. If both ends of the connection agree to the RDMA mode of data transfer, then the RDMA engine is utilized to schedule the data transfers between the target and initiator without substantial host intervention. The RDMA transfer state is maintained in a session database entry. This block creates the RDMA headers to be layered around the data, and is also used to extract these headers from the received packets that are received on RDMA enabled connections. The RDMA engine works with the storage flow/RDMA controller, 1708, and the host interface controller, 1710, by passing the messages/instructions and performs the large block data transfers without substantial host intervention. The RDMA engine of the storage flow/RDMA controller block, 1708, of the IP processor performs protection checks for the operations requested and also provides conversion from the RDMA region identifiers to the physical or virtual address in the host space. This functionality may also be provided by RDMA engine, block 2417, of the storage engine of the SAN packet processor based on the implementation chosen. The distribution of the RDMA capability between 2417 and 1708 and other similar engines is an implementation choice that one with ordinary skill in the art will be able to do with the teachings of this patent. Outgoing data is packaged into standards based PDU by the PDU creator, block 2425. The PDU formatting may also be accomplished by using the packet processing instructions. The storage engine of FIG. 24 works with the TCP/IP engine of FIG. 23 and the packet processor engine of FIG. 17 to perform the IP storage operations involving data and command transfers in both directions i.e. from the initiator to target and the target to the host and vice versa. That is, the Host controller Interface 2401, 2407 store and retrieve commands or data or a combination thereof to or from the host processor. These interfaces may be directly connected to the host or may be connected through an intermediate connection. Though shown as two apparatus, interfaces 2401 and 2407 could be implemented as a single apparatus. The flow of data through these blocks would be different based on the direction of the transfer. For instance, when command or data is being sent from the host to the target, the storage processing engines will be invoked first to format the PDU and then this PDU is passed on to the TCP processor to package the PDU in a valid TCP/IP segment. However, a received packet will go through the TCP/IP engine before being scheduled for the storage processor engine. The internal bus structures and functional block interconnections may be different than illustrated for performance, die cost requirements, and the like. For example, and similarly to FIG. 23, Host Controller Interface 2401, 2407 and Memory Controller Interface 2423 may be part of a bus controller that allows transfer of data packets or state information or commands, or a combination thereof, to or from a scheduler or host or storage flow/RDMA controller or session controller or other resources such as, without limitation, security processor, or media interface units, host interface, scheduler, classification processor, packet buffers or controller processor, or any combination of the foregoing.

In applications in which storage is done on a chip not including the TCP/IP processor of FIG. 23 by, as one example, an IP Storage processor such as an iSCSI processor of FIG. 24, the TCP/IP Interface 2406 would function as an interface to a scheduler for scheduling IP storage packet processing by the IP Storage processor. Similar variations are well within the knowledge of one of ordinary skill in the art, viewing the disclosure of this patent.

FIG. 25 illustrates the output queue controller block 1712 of FIG. 17 in more detail. This block receives the packets that need to be sent on to the network media independent interface 1601 of FIG. 16. The packets may be tagged to indicate if they need to be encrypted before being sent out. The controller queues the packets that need to be secured to the security engine through the queue 2511 and security engine interface 2510. The encrypted packets are received from the security engine and are queued in block 2509, to be sent to their destination. The output queue controller may assign packets onto their respective quality of service (QOS) queues, if such a mechanism is supported. The programmable packet priority selector, block 2504, selects the next packet to be sent and schedules the packet for the appropriate port, Port1 . . . PortN. The media controller block 1601 associated with the port accepts the packets and sends them to their destination.

FIG. 26 illustrates the storage flow controller /RDMA controller block, shown generally at 1708 of FIG. 17, in more detail. The storage flow and RDMA controller block provides the functionality necessary for the host to queue the commands (storage or RDMA or sockets direct or a combination thereof) to this processor, which then takes these commands and executes them, interrupting the host processor primarily on command termination. The command queues, new and active, blocks 2611 and 2610, and completion queue, block 2612, can be partially on chip and partially in a host memory region or memory associated with the IP processor, from which the commands are fetched or the completion status deposited. The RDMA engine, block 2602, provides various capabilities necessary for enabling remote direct memory access. It has tables, like RDMA look-up table 2608, that include information like RDMA region and the access keys, and virtual address translation functionality. The RDMA engine inside this block 2602 performs the data transfer and interprets the received RDMA commands to perform the transaction if allowed. The storage flow controller also keeps track of the state of the progress of various commands that have been scheduled as the data transfer happens between the target and the initiator. The storage flow controller schedules the commands for execution and also provides the command completion information to the host drivers. The storage flow controller provides command queues where new requests from the host are deposited, as well as active commands are held in the active commands queue. The command scheduler of block 2601, assigns new commands, that are received which are for targets for which no connections exist, to the scheduler for initiating a new connection. The scheduler 1702, uses the control plane processor shown generally at 1711 of FIG. 17 to do the connection establishment at which point the connection entry is moved to the session cache, shown generally in FIG. 15 and 1704 in FIG. 17, and the state controller in the storage flow controller block 2601 moves the new command to active commands and associates the command to the appropriate connection. The active commands, in block 2610, are retrieved and sent to the scheduler, block 1702 for operation by the packet processors. The update to the command status is provided back to the flow controller which then stores it in the command state tables, blocks 2607 and accessed through block 2603. The sequencer of 2601 applies a programmable priority for command scheduling and thus selects the next command to be scheduled from the active commands and new commands. The flow controller also includes a new requests queue for incoming commands, block 2613. The new requests are transferred to the active command queue once the appropriate processing and buffer reservations are done on the host by the host driver. As the commands are being scheduled for execution, the state controller 2601 initiates data pre-fetch by host data pre-fetch manager, block 2617, from the host memory using the DMA engine of the host interface block 2707, hence keeping the data ready to be provided to the packet processor complex when the command is being executed. The output queue controller, block 2616, enables the data transfer, working with the host controller interface, block 2614. The storage flow/RDMA controller maintains a target-initiator table, block 2609, that associates the target/initiators that have been resolved and connections established for fast look-ups and for associating commands to active connections. The command sequencer may also work with the RDMA engine 2602, if the commands being executed are RDMA commands or if the storage transfers were negotiated to be done through the RDMA mechanism at the connection initiation. The RDMA engine 2602, as discussed above, provides functionality to accept multiple RDMA regions, access control keys and the virtual address translation pointers. The host application (which may be a user application or an OS kernel function, storage or non-storage such as downloading web pages, video files, or the like) registers a memory region that it wishes to use in RDMA transactions with the disclosed processor through the services provided by the associated host driver. Once this is done, the host application communicates this information to its peer on a remote end. Now, the remote machine or the host can execute RDMA commands, which are served by the RDMA blocks on both ends without requiring substantial host intervention. The RDMA transfers may include operations like read from a region, a certain number of bytes with a specific offset or a write with similar attributes. The RDMA mechanism may also include send functionality which would be useful in creating communication pipes between two end nodes. These features are useful in clustering applications where large amounts of data transfer is required between buffers of two applications running on servers in a cluster, or more likely, on servers in two different clusters of servers, or such other clustered systems. The storage data transfer may also be accomplished using the RDMA mechanism, since it allows large blocks of data transfers without substantial host intervention. The hosts on both ends get initially involved to agree on doing the RDMA transfers and allocating memory regions and permissions through access control keys that get shared. Then the data transfer between the two nodes can continue without host processor intervention, as long as the available buffer space and buffer transfer credits are maintained by the two end nodes. The storage data transfer protocols would run on top of RDMA, by agreeing to use RDMA protocol and enabling it on both ends. The storage flow controller and RDMA controller of FIG. 26 can then perform the storage command execution and the data transfer using RDMA commands. As the expected data transfers are completed the storage command completion status is communicated to the host using the completion queue 2612. The incoming data packets arriving from the network are processed by the packet processor complex of FIG. 17 and then the PDU is extracted and presented to the flow controller OF FIG. 26 in case of storage/RDMA data packets. These are then assigned to the incoming queue block 2604, and transferred to the end destination buffers by looking up the memory descriptors of the receiving buffers and then performing the DMA using the DMA engine inside the host interface block 2707. The RDMA commands may also go through protection key look-up and address translation as per the RDMA initialization.

The foregoing may also be considered a part of an RDMA capability or an RDMA mechanism or an RDMA function.

FIG. 27 illustrates host interface controller 1710 of FIG. 17 in more detail. The host interface block includes a host bus interface controller, block 2709, which provides the physical interface to the host bus. The host interface block may be implemented as a fabric interface or media independent interface when embodied in a switch or a gateway or similar configuration depending on the system architecture and may provide virtual output queuing and/or other quality of service features. The transaction controller portion of block 2708, executes various bus transactions and maintains their status and takes requested transactions to completion. The host command unit, block 2710, includes host bus configuration registers and one or more command interpreters to execute the commands being delivered by the host. The host driver provides these commands to this processor over Host Output Queue Interface 2703. The commands serve various functions like setting up configuration registers, scheduling DMA transfers, setting up DMA regions and permissions if needed, setup session entries, retrieve session database, configure RDMA engines and the like. The storage and other commands may also be transferred using this interface for execution by the IP processor.

FIG. 28 illustrates the security engine 1705 of FIG. 17 in more detail. The security engine illustrated provides authentication and encryption and decryption services like those required by standards like IPSEC for example. The services offered by the security engine may include multiple authentication and security algorithms. The security engine may be on board the processor or may be part of a separate silicon chip as indicated earlier. An external security engine providing IP security services would be situated in a similar position in the data flow, as one of the first stages of packet processing for incoming packets and as one of the last stages for the outgoing packet. The security engine illustrated provides advanced encryption standard (AES) based encryption and decryption services, which are very hardware performance efficient algorithms adopted as security standards. This block could also provide other security capabilities like DES, 3DES, as an example. The supported algorithms and features for security and authentication are driven from the silicon cost and development cost. The algorithms chosen would also be those required by the IP storage standards. The authentication engine, block 2803, is illustrated to include the SHA-1 algorithm as one example of useable algorithms. This block provides message digest and authentication capabilities as specified in the IP security standards. The data flows through these blocks when security and message authentication services are required. The clear packets on their way out to the target are encrypted and are then authenticated if required using the appropriate engines. The secure packets received go through the same steps in reverse order. The secure packet is authenticated and then decrypted using the engines 2803, 2804 of this block. The security engine also maintains the security associations in a security context memory, block 2809, that are established for the connections. The security associations (may include secure session index, security keys, algorithms used, current state of session and the like) are used to perform the message authentication and the encryption/decryption services. It is possible to use the message authentication service and the encryption/decryption services independent of each other.

FIG. 29 illustrates the session cache and memory controller complex seen generally at 1704 of FIG. 17 in more detail. The memory complex includes a cache/memory architecture for the TCP/IP session database called session/global session memory or session cache in this patent, implemented as a cache or memory or a combination thereof. The session cache look-up engine, block 2904, provides the functionality to look-up a specific session cache entry. This look-up block creates a hash index out of the fields provided or is able to accept a hash key and looks-up the session cache entry. If there is no tag match in the cache array with the hash index, the look-up block uses this key to find the session entry from the external memory and replaces the current session cache entry with that session entry. It provides the session entry fields to the requesting packet processor complex. The cache entries that are present in the local processor complex cache are marked shared in the global cache. Thus when any processor requests this cache entry, it is transferred to the global cache and the requesting processor and marked as such in the global cache. The session memory controller is also responsible to move the evicted local session cache entries into the global cache inside this block. Thus only the latest session state is available at any time to any requesters for the session entry. If the session cache is full, a new entry may cause the least recently used entry to be evicted to the external memory. The session memory may be single way or multi-way cache or a hash indexed memory or a combination thereof, depending on the silicon real estate available in a given process technology. The use of a cache for storing the session database entry is unique, in that in networking applications for network switches or routers, generally there is not much locality of reference properties available between packets, and hence use of cache may not provide much performance improvement due to cache misses. However, the storage transactions are longer duration transactions between the two end systems and may exchange large amounts of data. In this scenario or cases where a large amount of data transfer occurs between two nodes, like in clustering or media servers or the like a cache based session memory architecture will achieve significant performance benefit from reducing the enormous data transfers from the off chip memories. The size of the session cache is a function of the available silicon die area and can have an impact on performance based on the trade-off. The memory controller block also provides services to other blocks that need to store packets, packet fragments or any other operating data in memory. The memory interface provides single or multiple external memory controllers, block 2901, depending on the expected data bandwidth that needs to be supported. This can be a double data rate controller or controller for DRAM or SRAM or RDRAM or other dynamic or static RAM or combination thereof. The figure illustrates multi-controllers however the number is variable depending on the necessary bandwidth and the costs. The memory complex may also provide timer functionality for use in retransmission time out for sessions that queue themselves on the retransmission queues maintained by the session database memory block.

FIG. 30 illustrates the data structures details for the classification engine. This is one way of organizing the data structures for the classification engine. The classification database is illustrated as a tree structure, block 3001, with nodes, block 3003, in the tree and the actions, block 3008, associated with those nodes allow the classification engine to walk down the tree making comparisons for the specific node values. The node values and the fields they represent are programmable. The action field is extracted when a field matches a specific node value. The action item defines the next step, which may include extracting and comparing a new field, performing other operations like ALU operations on specific data fields associated with this node-value pair, or may indicate a terminal node, at which point the classification of the specific packet is complete. This data structure is used by the classification engine to classify the packets that it receives from the packet scheduler. The action items that are retrieved with the value matches, while iterating different fields of the packet, are used by the results compiler to create a classification tag, which is attached to the packet, generally before the packet headers. The classification tag is then used as a reference by the rest of the processor to decide on the actions that need to be taken based on the classification results. The classifier with its programmable characteristics allows the classification tree structure to be changed in-system and allow the processor to be used in systems that have different classification needs. The classification engine also allows creation of storage/network policies that can be programmed as part of the classification tree-node-value-action structures and provide a very powerful capability in the IP based storage systems.

The policies would enhance the management of the systems that use this processor and allow enforcement capabilities when certain policies or rules are met or violated. The classification engine allows expansion of the classification database through external components, when that is required by the specific system constraints. The number of trees and nodes are decided based on the silicon area and performance tradeoffs. The data structure elements are maintained in various blocks of the classification engine and are used by the classification sequencer to direct the packet classification through the structures. The classification data structures may require more or less fields than those indicated depending on the target solution. Thus the core functionality of classification may be achieved with fewer components and structures without departing from the basic architecture. The classification process walks through the trees and the nodes as programmed. A specific node action may cause a new tree to be used for the remaining fields for classification. Thus, the classification process starts at the tree root and progress through the nodes until it reaches the leaf node.

FIG. 31 illustrates a read operation between an initiator and target. The initiator sends a READ command request, block 3101, to the target to start the transaction. This is an application layer request which is mapped to specific SCSI protocol command which is than transported as an READ protocol data unit, block 3102, in an IP based storage network. The target prepares the data that is requested, block 3103 and provides read response PDUs, block 3105, segmented to meet the maximum transfer unit limits. The initiator then retrieves the data, block 3016, from the IP packets and is then stored in the read buffers allocated for this operation. Once all the data has been transferred the target responds with command completion and sense status, block 3107. The initiator then retires the command once the full transfer is complete, block 3109. If there were any errors at the target and the command is being aborted for any reason, then a recovery procedure may be initiated separately by the initiator. This transaction is a standard SCSI READ transaction with the data transport over IP based storage protocol like iSCSI as the PDUs of that protocol.

FIG. 32 illustrates the data flow inside the IP processor of this invention for one of the received READ PDUs of the transaction illustrated in FIG. 31. The internal data flow is shown for the read data PDU received by the IP processor on the initiator end. This figure illustrates various stage of operation that a packet goes through. The stages can be considered as pipeline stages through which the packets traverse. The number of pipe stages traversed depends on the type of the packet received. The figure illustrates the pipe stages for a packet received on an established connection. The packet traverses through the following major pipe stages:

1. Receive Pipe Stage of block 3201, with major steps illustrated in block 3207: Packet is received by the media access controller. The packet is detected, the preamble/trailers removed and a packet extracted with the layer2 header and the payload. This is the stage where the Layer2 validation occurs for the intended recipient as well as any error detection. There may be quality of service checks applied as per the policies established. Once the packet validation is clear the packet is queued to the input queue.

2. Security Pipe Stage of block 3202, with major steps illustrated in block 3208. The packet is moved from the input queue to the classification engine, where a quick determination for security processing is made and if the packet needs to go through security processing, it enters the security pipe stage. If the packet is received in clear text and does not need authentication, then the security pipe stage is skipped. The security pipe stage may also be omitted if the security engine is not integrated with the IP processor. The packet goes through various stages of security engine where first the security association for this connection is retrieved from memory, and the packet is authenticated using the message authentication algorithm selected. The packet is then decrypted using the security keys that have been established for the session. Once the packet is in clear text, it is queued back to the input queue controller.

3. Classification Pipe Stage of block 3203, with major steps illustrated in block 3209. The scheduler retrieves the clear packet from the input queue and schedules the packet for classification. The classification engine performs various tasks like extracting the relevant fields from the packet for layer 3 and higher layer classification, identifies TCP/IP/storage protocols and the like and creates those classification tags and may also take actions like rejecting the packet or tagging the packet for bypass depending on the policies programmed in the classification engine. The classification engine may also tag the packet with the session or the flow to which it belongs along with marking the packet header and payload for ease of extraction. Some of the tasks listed may be or may not be performed and other tasks may be performed depending on the programming of the classification engine. As the classification is done, the classification tag is added to the packet and packet is queued for the scheduler to process.

4. Schedule Pipe Stage of block 3204, with major steps illustrated in block 3210. The classified packet is retrieved from the classification engine queue and stored in the scheduler for it to be processed. The scheduler performs the hash of the source and destination fields from the packet header to identify the flow to which the packet belongs, if not done by the classifier. Once the flow identification is done the packet is assigned to an execution resource queue based on the flow dependency. As the resource becomes available to accept a new packet, the next packet in the queue is assigned for execution to that resource.

5. Execution Pipe Stage of block 3205, with major steps illustrated in block 3211. The packet enters the execution pipe stage when the resource to execute this packet becomes available. The packet is transferred to the packet processor complex that is supposed to execute the packet. The processor looks at the classification tag attached to the packet to decide the processing steps required for the packet. If this is an IP based storage packet, then the session database entry for this session is retrieved. The database access may not be required if the local session cache already holds the session entry. If the packet assignment was done based on the flow, then the session entry may not need to be retrieved from the global session memory. The packet processor then starts the TCP engine/the storage engines to perform their operations. The TCP engine performs various TCP checks including checksum, sequence number checks, framing checks with necessary CRC operations, and TCP state update. Then the storage PDU is extracted and assigned to the storage engine for execution. The storage engine interprets the command in the PDU and in this particular case identifies it to be a read response for an active session. It than verifies the payload integrity and the sequence integrity and then updates the storage flow state in the session database entry. The memory descriptor of the destination buffer is also retrieved from the session data base entry and the extracted PDU payload is queued to the storage flow/RDMA controller and the host interface block for them to DMA the data to the final buffer destination. The data may be delivered to the flow controller with the memory descriptor and the command/operation to perform. In this case deposit the data for this active read command. The storage flow controller updates its active command database. The execution engine indicates to the scheduler the packet has been retired and the packet processor complex is ready to receive its next command.

6. DMA Pipe Stage of block 3206, with major steps illustrated in block 3212. Once the storage flow controller makes the appropriate verification of the Memory descriptor, the command and the flow state, it passes the data block to the host DMA engine for transfer to the host memory. The DMA engine may perform priority based queuing, if such QOS mechanism is programmed or implemented. The data is transferred to the host memory location through DMA. If this is the last operation of the command, then the command execution completion is indicated to the host driver. If this is the last operation for a command and the command has been queued to the completion queue, the resources allocated for the command are released to accept new command. The command statistics may be collected and transferred with the completion status as may be required for performance analysis, policy management or other network management or statistical purposes.

FIG. 33 illustrates write command operation between an initiator and a target. The Initiator sends a WRITE command, block 3301, to the target to start the transaction. This command is transported as a WRITE PDU, block 3302, on the IP storage network. The receiver queues the received command in the new request queue. Once the old commands in operation are completed, block 3304, the receiver allocates the resources to accept the WRITE data corresponding to the command, block 3305. At this stage the receiver issues a ready to transfer (R2T) PDU, block 3306, to the initiator, with indication of the amount of data it is willing to receive and from which locations. The initiator interprets the fields of the R2T requests and sends the data packets, block 3307, to the receiver as per the received R2T. This sequence of exchange between the initiator and target continues until the command is terminated. A successful command completion or an error condition is communicated to the initiator by the target as a response PDU, which then terminates the command. The initiator may be required to start a recovery process in case of an error. This is not shown in the exchange of the FIG. 33.

FIG. 34 illustrates the data flow inside the IP processor of this invention for one of the R2T PDUs and the following write data of the write transaction illustrated in FIG. 33. The initiator receives the R2T packet through its network media interface. The packet passes through all the stages, blocks 3401, 3402, 3403, and 3404 with detailed major steps in corresponding blocks 3415, 3416, 3409 and 3410, similar to the READ PDU in FIG. 32 including Receive, Security, Classification, Schedule, and Execution. Security processing is not illustrated in this figure. Following these stages the R2T triggers the write data fetch using the DMA stage shown in FIG. 34, blocks 3405 and 3411. The write data is then segmented and put in TCP/IP packets through the execution stage, blocks 3406 and 3412. The TCP and storage session DB entries are updated for the WRITE command with the data transferred in response to the R2T. The packet is then queued to the output queue controller. Depending on the security agreement for the connection, the packet may enter the security pipe stage, block 3407 and 3413. Once the packet has been encrypted and message authentication codes generated, the packet is queued to the network media interface for the transmission to the destination. During this stage, block 3408 and 3414 the packet is encapsulated in the Layer 2 headers, if not already done so by the packet processor and is transmitted. The steps followed in each stage of the pipeline are similar to that of the READ PDU pipe stages above, with additional stages for the write data packet stage, which is illustrated in this figure. The specific operations performed in each stage depend on the type of the command, the state of the session, the command state and various other configurations for policies that may be setup.

FIG. 35 illustrates the READ data transfer using RDMA mechanism between and initiator and target. The initiator and target register the RDMA buffers before initiating the RDMA data transfer, blocks 3501, 3502, and 3503. The initiator issues a READ command, block 3510, with the RDMA buffer as the expected recipient. This command is transported to the target, block 3511. The target prepares the data to be read, block 3504, and then performs the RDMA write operations, block 3505 to directly deposit the read data into the RDMA buffers at the initiator without the host intervention. The operation completion is indicated using the command completion response.

FIG. 36 illustrates the internal architecture data flow for the RDMA Write packet implementing the READ command flow. The RDMA write packet also follows the same pipe stages as any other valid data packet that is received on the network interface. This packet goes through Layer 2 processing in the receive pipe stage, blocks 3601 and 3607, from where it is queued for scheduler to detect the need for security processing. If the packet needs to be decrypted or authenticated, it enters the security pipe stage, blocks 3602 and 3608. The decrypted packet is then scheduled to the classification engine for it to perform the classification tasks that have been programmed, blocks 3603 and 3609. Once classification is completed, the tagged packet enters the schedule pipe stage, blocks 3604 and 3610, where the scheduler assigns this packet to a resource specific queue dependent on flow based scheduling. When the intended resource is ready to execute this packet, it is transferred to that packet processor complex, blocks 3605 and 3611, where all the TCP/IP verification, checks, and state updates are made and the PDU is extracted. Then the storage engine identifies the PDU as belonging to a storage flow for storage PDUs implemented using RDMA and interprets the RDMA command. In this case it is RDMA write to a specific RDMA buffer. This data is extracted and passed on to the storage flow/RDMA controller block which performs the RDMA region translation and protection checks and the packet is queued for DMA through the host interface, blocks 3606 and 3612. Once the packet has completed operation through the packet processor complex, the scheduler is informed and the packet is retired from the states carried in the scheduler. Once in the DMA stage, the RDMA data transfer is completed and if this is the last data transfer that completes the storage command execution, that command is retired and assigned to the command completion queue.

FIG. 37 illustrates the storage write command execution using RDMA Read operations. The initiator and target first register their RDMA buffers with their RDMA controllers and then also advertise the buffers to their peer. Then the initiator issues a write command, block 3701, to the target, where it is transported using the IP storage PDU. The recipient executes the write command, by first allocating the RDMA buffer to receive the write and then requesting an RDMA read to the initiator, blocks 3705, and 3706. The data to be written from the initiator is then provided as an RDMA read response packet, blocks 3707 and 3708. The receiver deposits the packet directly to the RDMA buffer without any host interaction. If the read request was for data larger than the segment size, then multiple READ response PDUs would be sent by the initiator in response to the READ request. Once the data transfer is complete the completion status is transported to the initiator and the command completion is indicated to the host.

FIG. 38 illustrates the data flow of an RDMA Read request and the resulting write data transfer for one section of the flow transaction illustrated in FIG. 37. The data flow is very similar to the write data flow illustrated in FIG. 34. The RDMA read request packet flows through various processing pipe stages including: receive, classify, schedule, and execution, blocks 3801, 3802, 3803, 3804, 3815, 3816, 3809 and 3810. Once this request is executed, it generates the RDMA read response packet. The RDMA response is generated by first doing the DMA, blocks 3805 and 3811, of the requested data from the system memory, and then creating segments and packets through the execution stage, blocks 3806 and 3812. The appropriate session database entries are updated and the data packets go to the security stage, if necessary, blocks 3807 and 3813. The secure or clear packets are then queued to the transmit stage, block 3808 and 3814, which performs the appropriate layer 2 updates and transmits the packet to the target.

FIG. 39 illustrates an initiator command flow for the storage commands initiated from the initiator in more details. As illustrated following are some of the major steps that a command follows:
1. Host driver queues the command in processor command queue in the storage flow/RDMA controller;
2. Host is informed if the command is successfully scheduled for operation and to reserve the resources;
3. The storage flow/RDMA controller schedules the command for operation to the packet scheduler, if the connection to the target is established. Otherwise the controller initiates the target session initiation and once session is established the command is scheduled to the packet scheduler;
4. The scheduler assigns the command to one of the SAN packet processors that is ready to accept this command;
5. The processor complex sends a request to the session controller for the session entry;
6. The session entry is provided to the packet processor complex;
7. The packet processor forms a packet to carry the command as a PDU and is scheduled to the output queue; and
8. The command PDU is given to the network media interface, which sends it to the target.

This is the high level flow primarily followed by most commands from the initiator to the target when the connection has been established between an initiator and a target.

FIG. 40 illustrates read packet data flow in more detail. Here the read command is initially send using a flow similar to that illustrated in FIG. 39 from the initiator to the target. The target sends the read response PDU to the initiator which follows the flow illustrated in FIG. 40. As illustrated the read data packet passes through following major steps:

1. Input packet is received from the network media interface block;
2. Packet scheduler retrieves the packet from the input queue;
3. Packet is scheduled for classification;
4. Classified packet returns from the classifier with a classification tag;
5. Based on the classification and flow based resource allocation, the packet is assigned to a packet processor complex which operates on the packet;
6. Packet processor complex looks-up session entry in the session cache (if not present locally);
7. Session cache entry is returned to the packet processor complex;
8. Packet processor complex performs the TCP/IP operations/IP storage operations and extracts the read data in the payload. The read data with appropriate destination tags like MDL(memory descriptor list) is provided to the host interface output controller; and
9. The host DMA engine transfers the read data to the system buffer memory.

Some of these steps are provided in more details in FIG. 32, where a secure packet flow is represented, where as the FIG. 40 represents a clear text read packet flow. This flow and other flows illustrated in this patent are applicable to storage and non-storage data transfers by using appropriate resources of the disclosed processor, that a person with ordinary skill in the art will be able to do with the teachings of this patent.

FIG. 41 illustrates the write data flow in more details. The write command follows the flow similar to that in FIG. 39. The initiator sends the write command to the target. The target responds to the initiator with a ready to transfer (R2T) PDU which indicates to the initiator that the target is ready to receive the specified amount of data. The initiator then sends the requested data to the target. FIG. 41 illustrates the R2T followed by the requested write data packet from the initiator to the target. The major steps followed in this flow are as follows:
1. Input packet is received from the network media interface block;
2. Packet scheduler retrieves the packet from the input queue;
3. Packet is scheduled for classification;
4. Classified packet returns from the classifier with a classification tag;
   a. Depending on the classification and flow based resource allocation, the packet is assigned to a packet processor complex which operates on the packet;
5. Packet processor complex looks-up session entry in the session cache (if not present locally);
6. Session cache entry is returned to the packet processor complex;
7. The packet processor determines the R2T PDU and requests the write data with a request to the storage flow/RDMA Controller;
8. The flow controller starts the DMA to the host interface;
9. Host interface performs the DMA and returns the data to the host input queue;
10. The packet processor complex receives the data from the host input queue;
11. The packet processor complex forms a valid PDU and packet around the data, updates the appropriate session entry and transfers the packet to the output queue; and
12. The packet is transferred to the output network media interface block which transmits the data packet to the destination.

The flow in FIG. 41 illustrates clear text data transfer. If the data transfer needs to be secure, the flow is similar to that illustrated in FIG. 43, where the output data packet is routed through the secure packet as illustrated by arrows labeled 11a and 11b. The input R2T packet, if secure would also be routed through the security engine (this is not illustrated in the figure).

FIG. 42 illustrates the read packet flow when the packet is in cipher text or is secure. This flow is illustrated in more details in FIG. 32 with its associated description earlier. The primary difference between the secure read flow and the clear read flow is that the packet is initially classified as secure packet by the classifier, and hence is routed to the security engine. These steps are illustrated by arrows labeled 2a, 2b, and 2c. The security engine decrypts the packet and performs the message authentication, and transfers the clear packet to the input queue for further processing as illustrated by arrow labeled 2d. The clear packet is then retrieved by the scheduler and provided to the classification engine as illustrated by arrows labeled 2e and 3 in FIG. 42. The rest of the steps and operations are the same as that in FIG. 40, described above.

FIG. 44 illustrates the RDMA buffer advertisement flow. This flow is illustrated to be very similar to any other storage command flow as illustrated in the FIG. 39. The detailed actions taken in the major steps are different depending on the command. For RDMA buffer advertisement and registration, the RDMA region id is created and recorded along with the address translation mechanism for this region is recorded. The RDMA registration also includes the protection key for the access control and may include other fields necessary for RDMA transfer. The steps to create the packet for the command are similar to those of FIG. 39.

FIG. 45 illustrates the RDMA write flow in more details. The RDMA writes appear like normal read PDUs to the initiator receiving the RDMA write. The RDMA write packet follows the same major flow steps as a read PDU illustrated in FIG. 40. The RDMA transfer involves the RDMA address translation and region access control key checks, and updating the RDMA database entry, beside the other session entries. The major flow steps are the same as the regular Read response PDU.

FIG. 46 illustrates the RDMA Read data flow in more details. This diagram illustrates the RDMA read request being received by the initiator from the target and the RDMA Read data being written out from the initiator to the target. This flow is very similar to the R2T response followed by the storage write command. In this flow the storage write command is accomplished using RDMA Read. The major steps that the packet follows are primarily the same as the R2T/write data flow illustrated in FIG. 41.

FIG. 47 illustrates the major steps of session creation flow. This figure illustrates the use of the control plane processor for this slow path operation required at the session initiation between an initiator and a target. This functionality is possible to implement through the packet processor complex. However, it is illustrated here as being implemented using the control plane processor. Both approaches are acceptable. Following are the major steps during session creation:

1. The command is scheduled by the host driver;
2. The host driver is informed that the command is scheduled and any control information required by the host is passed;
3. The storage flow/RDMA controller detects a request to send the command to a target for which a session is not existing, and hence it passes the request to the control plane processor to establish the transport session;
4. Control plane processor sends a TCP SYN packet to the output queue;
5. The SYN packet is transmitted to the network media interface from which is transmitted to the destination;
6. The destination, after receiving the SYN packet, responds with the SYN-ACK response, which packet is queued in the input queue on receipt from the network media interface;
7. The packet is retrieved by the packet scheduler;
8. The packet is passed to the classification engine;
9. The tagged classified packet is returned to the scheduler;
10. The scheduler, based on the classification, forwards this packet to control plane processor;
11. The processor then responds with an ACK packet to the output queue;
12. The packet is then transmitted to the end destination thus finishing the session establishment handshake; and
13. Once the session is established, this state is provided to the storage flow controller. The session entry is thus created which is then passed to the session memory controller (this part not illustrated in the figure).

Prior to getting the session in the established state as in step 13, the control plane processor may be required to perform a full login phase of the storage protocol, exchanging parameters and recording them for the specific connection if this is a storage data transfer connection. Once the login is authenticated and parameter exchange complete, does the session enter the session establishment state shown in step 13 above.

FIG. 48 illustrates major steps in the session tear down flow. The steps in this flow are very similar to those in FIG. 47. Primary difference between the two flows is that, instead of the SYN, SYN-ACK and ACK packets for session creation, FIN, FIN-ACK and ACK packets are transferred between the initiator and the target. The major steps are otherwise very similar. Another major difference here is that the appropriate session entry is not created but removed from the session cache and the session memory. The operating statistics of the connection are recorded and may be provided to the host driver, although this is not illustrated in the figure.

FIG. 49 illustrates the session creation and session teardown steps from a target perspective. Following are the steps followed for the session creation:

1. The SYN request from the initiator is received on the network media interface;
2. The scheduler retrieves the SYN packet from the input queue;
3. The scheduler sends this packet for classification to the classification engine;
4. The classification engine returns the classified packet with appropriate tags;
5. The scheduler, based on the classification as a SYN packet, transfers this packet to the control plane processor;
6. Control plane processor responds with a SYN-ACK acknowledgement packet. It also requests the host to allocate appropriate buffer space for unsolicited data transfers from the initiator (this part is not illustrated);
7. The SYN-ACK packet is sent to the initiator;
8. The initiator then acknowledges the SYN-ACK packet with an ACK packet, completing the three-way handshake. This packet is received at the network media interface and queued to the input queue after layer 2 processing;
9. The scheduler retrieves this packet;
10. The packet is sent to the classifier;
11. Classified packet is returned to the scheduler and is scheduled to be provided to the control processor to complete the three way handshake;
12. The controller gets the ACK packet;
13. The control plane processor now has the connection in an established state and it passes the to the storage flow controller which creates the entry in the session cache; and
14. The host driver is informed of the completed session creation.

The session establishment may also involve the login phase, which is not illustrated in the FIG. 49. However, the login phase and the parameter exchange occur before the session enters the fully configured and established state. These data transfers and handshake may primarily be done by the control processor. Once these steps are taken the remaining steps in the flow above may be executed.

FIGS. 50 and 51 illustrate write data flow in a target subsystem. The FIG. 50 illustrates an R2T command flow, which is used by the target to inform the initiator that it is ready to accept a data write from the initiator. The initiator then sends the write which is received at the target and the internal data flow is illustrated in FIG. 51. The two figures together illustrate one R2T and data write pairs. Following are the major steps that are followed as illustrated in FIGS. 50 and 51 together:
1. The target host system in response to receiving a write request like that illustrated in FIG. 33, prepares the appropriate buffers to accept the write data and informs the storage flow controller when it is ready, to send the ready to transfer request to the initiator;
2. The flow controller acknowledges the receipt of the request and the buffer pointers for DMA to the host driver;
3. The flow controller then schedules the R2T command to be executed to the scheduler;
4. The scheduler issues the command to one of the packet processor complexes that is ready to execute this command;
5. The packet processor requests the session entry from the session cache controller;
6. The session entry is returned to the packet processor;
7. The packet processor forms a TCP packet and encapsulates the R2T command and sends it to the output queue;
8. The packet is then sent out to network media interface which then sends the packet to the initiator. The security engine could be involved, if the transfer needed to be secure transfer;
9. Then as illustrated in FIG. 51, the initiator responds to R2T by sending the write data to the target. The network media interface receives the packet and queues it to the input queue;
10. The packet scheduler retrieves the packet from the input queue;
11. The packet is scheduled to the classification engine;
12. The classification engine provides the classified packet to the scheduler with the classification tag. The flow illustrated is for unencrypted packet and hence the security engine is not exercised;
13. The scheduler assigns the packet based on the flow based resource assignment queue to packet processor queue. The packet is then transferred to the packet processor complex when the packet processor is ready to execute this packet;
14. The packet processor requests the session cache entry (if it does not already have it in its local cache);
15. The session entry is returned to the requesting packet processor;
16. The packet processor performs all the TCP/IP functions, updates the session entry and the storage engine extracts the PDU as the write command in response to the previous R2T. It updates the storage session entry and routes the packet to the host output queue for it to be transferred to the host buffer. The packet may be tagged with the memory descriptor or the memory descriptor list that may be used to perform the DMA of this packet into the host allocated destination buffer; and
17. The host interface block performs the DMA, to complete this segment of the Write data command.

FIG. 52 illustrates the target read data flow. This flow is very similar to the initiator R2T and write data flow illustrated in FIG. 41. The major steps followed in this flow are as follows:
1. Input packet is received from the network media interface block;
2. Packet scheduler retrieves the packet from the input queue;
3. Packet is scheduled for classification;
4. Classified packet returns from the classifier with a classification tag;
   a. Depending on the classification and flow based resource allocation, the packet is assigned to a packet processor complex which operates on the packet
5. Packet processor complex looks-up session entry in the session cache (if not present locally);
6. Session cache entry is returned to the packet processor complex;
7. The packet processor determines the Read Command PDU and requests the read data with a request to the flow controller;
8. The flow controller starts the DMA to the host interface;
9. Host interface performs the DMA and returns the data to the host input queue;
10. The packet processor complex receives the data from the host input queue;
11. The packet processor complex forms a valid PDU and packet around the data, updates the appropriate session entry and transfers the packet to the output queue; and
12. The packet is transferred to the output network media interface block which transmits the data packet to the destination.

The discussion above of the flows is an illustration of some the major flows involved in high bandwidth data transfers. There are several flows like fragmented data flow, error flows with multiple different types of errors, name resolution service flow, address resolution flows, login and logout flows, and the like are not illustrated, but are supported by the IP processor of this invention.

The IP processor of this invention may be manufactured into hardware products in the chosen embodiment of various possible embodiments using a manufacturing process, without limitation, broadly outlined below. The processor may be designed and verified at various levels of chip design abstractions like RTL level, circuit/schematic/gate level, layout level etc. for functionality, timing and other design and manufacturability constraints for specific target manufacturing process technology. The processor design at the appropriate physical/layout level may be used to create mask sets to be used for manufacturing the chip in the target process technology. The mask sets are then used to build the processor chip through the steps used for the selected process technology. The processor chip then may go through testing/packaging process as appropriate to assure the quality of the manufactured processor product.

While the foregoing has been with reference to particular embodiments of the invention, it will be appreciated by those skilled in the art that changes in these embodiments may be made without departing from the principles and spirit of the invention.

What is claimed is:

1. A programmable TCP/IP processor engine, said processor having RDMA capability and used for processing Internet Protocol packets, said TCP/IP processor engine comprising:
   a checksum component for TCP/IP checksum verification and for new checksum generation;
   a data memory for storing said packets;
   an execution resource;
   a packet look-up interface for assisting an execution resource and an instruction sequencer for providing access to said data packets or predetermined data packet fields thereof;
   an instruction decoder to direct said TCP/IP processor engine operation based on the results of a classification processor;
   a sequence and window operation manager providing specific segmenting, sequencing and windowing operations for use in TCP/IP data sequencing calculations;
   and further comprising:
      a hash engine used to perform hash operations against predetermined fields of the packet to perform a hash table walk to determine the correct session entry for said packet;
      a register file for extracting predetermined header fields from said packets for TCP processing;
      pointer registers for indicating data source and destination;
      context register sets for holding multiple contexts for packet execution;
         said multiple contexts allowing, in response to a given packet execution stalling, another context to be invoked to enable said TCP/IP processor engine to continue the execution of another packet stream;
         said TCP/IP processor engine having a cache for holding recently or frequently used session entries, including connection IDs, for local use;
         and further having an interface for informing a packet scheduler of the connection IDs that are cached for each TCP/IP processor engine resource.

2. The TCP/IP processor engine of claim 1 further comprising a session database lookup engine and a session manager which, in response to an indication that the packet processor does not hold the session entry for the specific connection required for said session, work with said hash engine to retrieve said session entry from a global session memory through a memory controller interface and to replace said session entry in said packet processor.

3. The combination of claim 2 wherein the session manager includes means, operative upon fetching of a session entry or its fields corresponding to a packet being processed by said TCP/IP processor engine, said means working with said hash engine to generate a session identifier for retrieving the corresponding session entry or its fields from a session database cache.

4. The combination of claim 2 wherein the session manager includes means, operative upon storing of a session entry or its fields corresponding to the packet being processed by said TCP/IP processor engine, said means acting with the said hash engine to generate a session identifier, for storing the corresponding session entry or its fields to the session database cache to replace a session entry as a result of packet processing.

5. The session database look-up engine of claim 2 further comprising means operative upon the fetching of a new session entry from said global session memory, said means storing the replaced session entry in said global session memory.

6. The TCP/IP processor engine of claim 2 wherein said session entry in said cache is exclusively cached to one of a plurality of processors so that request for access to said cache by more than one of said plurality does not cause any race conditions by non-exclusive access.

7. The TCP/IP processor engine of claim 6 wherein when a session entry is exclusively cached to one processor, and another processor requests said session entry, said entry is transferred to the requesting processor with exclusive access to said session entry.

8. The TCP/IP processor engine of claim 2 further comprising a programmable frame controller and out of order manager used for extracting frame information from said packets and performing operations for execution of packets received out of order from the expected sequence for their session or flow.

9. The TCP/IP processor engine of claim 8 operating on an upper layer and having an upper layer framing mechanism used by said programmable frame controller and out of order manager to extract the embedded PDUs from packets arriving out of order and allowing said PDUs to be directed to an end buffer destination.

10. The TCP/IP processor engine of claim 9 wherein said programmable frame controller operates on retransmitted packets.

11. The combination of claim 9 wherein the frame controller and out of order manager includes a cyclic redundancy check generator for identifying, verifying and delineating markers in the upper layer frames from the received network packets or generating the upper layer frame markers using CRC codes for packets directed to the network.

12. The TCP/IP processor engine of claim 1 further comprising a TCP state machine capable of state transitions and capable of having a current state and generating a next state, said state machine receiving
   a state information stored in the session entry; and
   appropriate fields affecting said state information from a fetched or newly received packet being processed for allowing the state machine to generate said next state if there is a state transition, and updating information in said session entry in cache to indicate said next state.

13. The TCP/IP processor engine of claim 1 including a storage engine queue which, if a packet belongs to a storage data transfer, receives one of said packets having a storage payload, or the storage payload of said packet, for processing by a storage engine.

14. The TCP/IP processor engine of claim 1 including a segmentation controller for segmenting data to be sent on the IP Network to create valid packets to transport said segmented data on the IP network.

15. The TCP/IP processor engine of claim 1 including a DMA engine for retrieving packets or commands or combinations thereof from a scheduler or a host, and storing said packets or commands or data to internal memory of a packet processor for further processing by the packet processor.

16. The TCP/IP processor engine of claim 15 including a processor for processing the said packets having packet data and extracting the packet data for transfer to an end buffer destination in a host processor.

17. The TCP/IP processor engine of claim 15 including at least one processor for processing the said host commands or retrieving outgoing host data or a combination of any of the foregoing using the said DMA engine, for additional processing by the TCP/IP processor engine to form an outgoing packet for transfer onto the IP network.

18. The TCP/IP processor engine of claim 1 further comprising means in a packet processor engine for additional processing of said packet by execution of additional processing application code.

19. The TCP/IP processor engine of claim 18 wherein said additional processing application code can be executed on said packet before or after processing by the TCP/IP, processor engine or an IP Storage processor engine or a combination thereof.

20. The TCP/IP processor engine of claim 1 wherein said session entry in cache is cached using the Modified Exclusive Shared Invalid algorithm.

* * * * *